United States Patent
Higashihara et al.

(10) Patent No.: US 6,473,126 B1
(45) Date of Patent: Oct. 29, 2002

(54) FOCUSING INFORMATION DETECTING DEVICE, FOCUS DETECTING DEVICE AND CAMERA UTILIZING THE SAME

(75) Inventors: Masaki Higashihara, Yokohama; Masato Ikeda, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/985,212

(22) Filed: Dec. 4, 1997

(30) Foreign Application Priority Data

| Dec. 9, 1996 | (JP) | 8-328320 |
| Dec. 17, 1996 | (JP) | 8-353380 |
| Dec. 17, 1996 | (JP) | 8-353382 |
| Dec. 27, 1996 | (JP) | 8-356703 |

(51) Int. Cl.$^7$ .................. H04N 13/00; H04N 5/228; G02B 7/28
(52) U.S. Cl. .................. 348/345; 348/352; 348/208; 396/114
(58) Field of Search .............. 348/345, 352, 348/208; 396/125, 126, 127, 128, 52, 111, 114, 119, 120

(56) References Cited

U.S. PATENT DOCUMENTS

| 4,543,476 A | 9/1985 | Horikawa | 250/201 |
| 4,740,678 A | 4/1988 | Horikawa | 250/201 |
| 4,855,777 A | 8/1989 | Suda et al. | 354/402 |
| 4,908,645 A | 3/1990 | Higashihara et al. | 354/402 |
| 4,969,003 A | 11/1990 | Ohnuki et al. | 354/402 |
| 4,972,221 A | 11/1990 | Ohnuki et al. | 354/402 |
| 4,974,002 A | 11/1990 | Ohnuki et al. | 354/400 |
| 4,974,003 A | 11/1990 | Ohnuki et al. | 354/400 |
| 5,005,037 A | 4/1991 | Akashi et al. | 354/400 |
| 5,012,267 A | 4/1991 | Higashihara | 354/402 |
| 5,060,002 A | 10/1991 | Ohnuki et al. | 354/402 |
| 5,061,951 A | 10/1991 | Higashihara et al. | 354/400 |
| 5,061,953 A | 10/1991 | Higashihara et al. | 354/402 |
| 5,079,581 A | 1/1992 | Kadohara et al. | 354/400 |
| 5,081,479 A | 1/1992 | Kadohara et al. | 354/402 |
| 5,089,843 A | 2/1992 | Higashihara et al. | 354/402 |
| 5,091,742 A | 2/1992 | Fukahori et al. | 354/402 |
| 5,166,722 A | 11/1992 | Kusaka | 354/408 |
| 5,189,465 A | 2/1993 | Akashi et al. | 354/408 |
| 5,311,241 A | 5/1994 | Akashi et al. | 354/402 |
| 5,526,044 A | * 6/1996 | Tokumitsu et al. | 348/208 |
| 5,732,292 A | * 3/1998 | Yaji | 396/114 |

FOREIGN PATENT DOCUMENTS

| JP | 56-162709 | 12/1981 |
| JP | 8-94923 | 4/1996 |
| JP | 9-181954 | 7/1997 |

OTHER PUBLICATIONS

Patent Abstracts of Japan, vol. 6, No. 46 (P–107) (JP 56–162709, Dec. 14, 1981), Mar. 24, 1982.
Patent Abstracts of Japan, vol. 1996, No. 8 (JP 8–94923, Apr. 12, 1996), Aug. 30, 1996.
Patent Abstracts of Japan, vol. 1997, No. 11 (JP 9–181954, Jul. 11, 1997), Nov. 28, 1997.
Patent Abstracts of Japan, vol. 96, No. 8, Aug. 1996 for No. 08–094923 filed Apr. 1996.

* cited by examiner

*Primary Examiner*—Wendy R. Garber
*Assistant Examiner*—Rashawn N. Tillery
(74) *Attorney, Agent, or Firm*—Fitzpatrick, Cella, Harper & Scinto

(57) ABSTRACT

A focus detecting device for detecting images from different pupil areas on time-shared basis, and detecting the phase difference of the images from the different areas, thereby detecting the defocus amount, is described. The focus detecting device of this type is incapable of exact defocus amount detection, because of the influence of the relative movement between the object and the photographing optical system. The exact defocus amount can be determined by detecting images from a same pupil area on time-shared basis, determining the phase difference between such images and effecting correction corresponding to the phase difference between the images from the same pupil area.

3 Claims, 53 Drawing Sheets

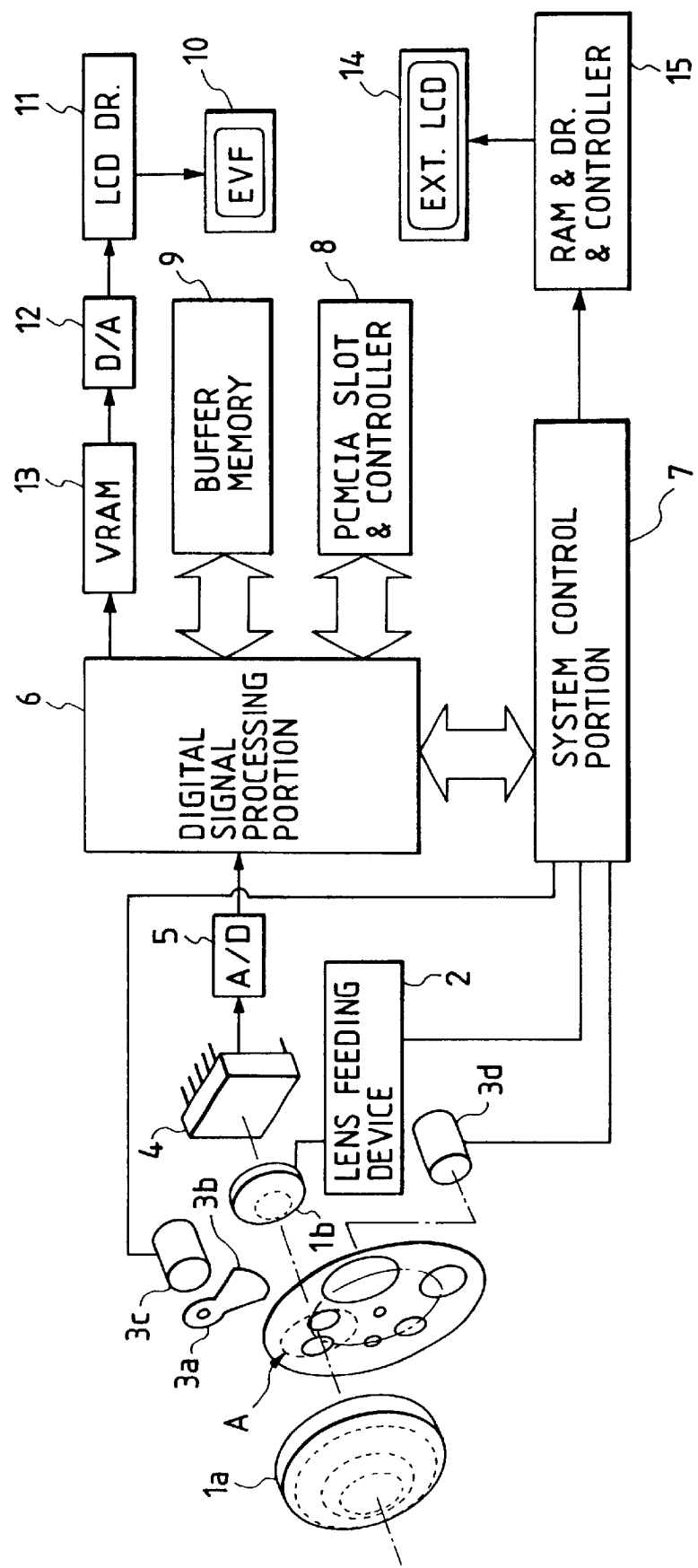

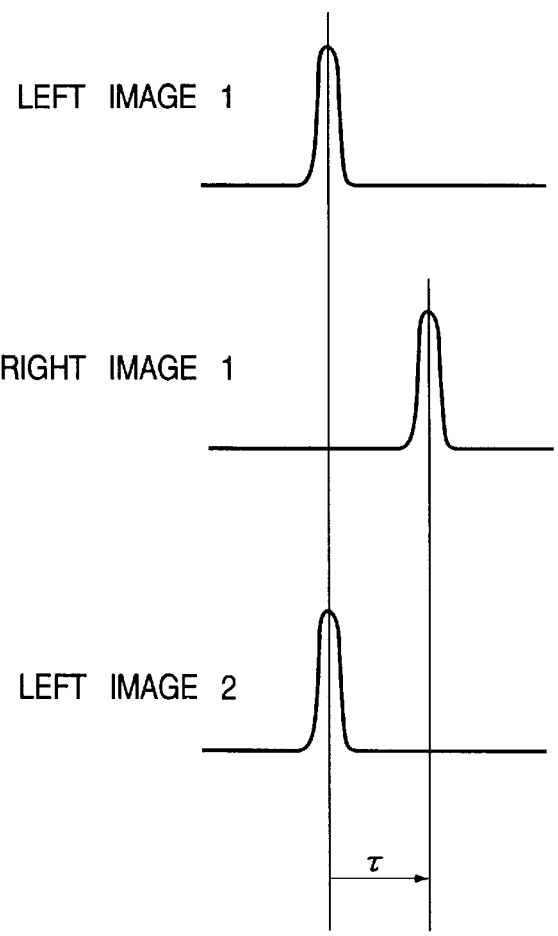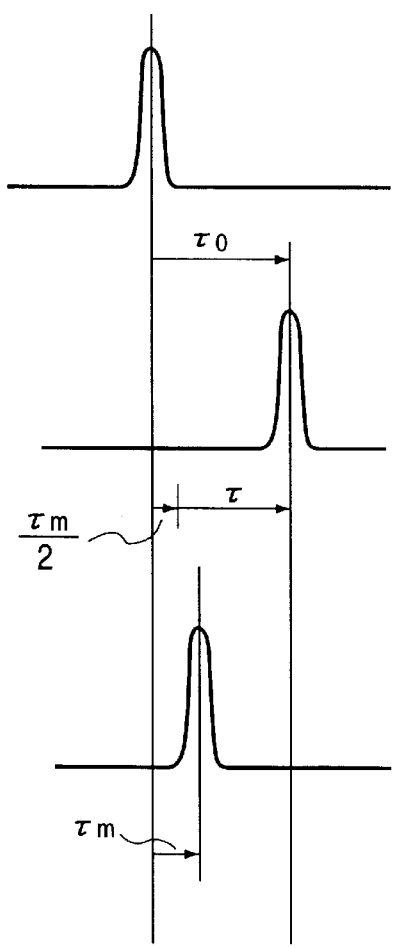
FIG. 8A
FIG. 8B

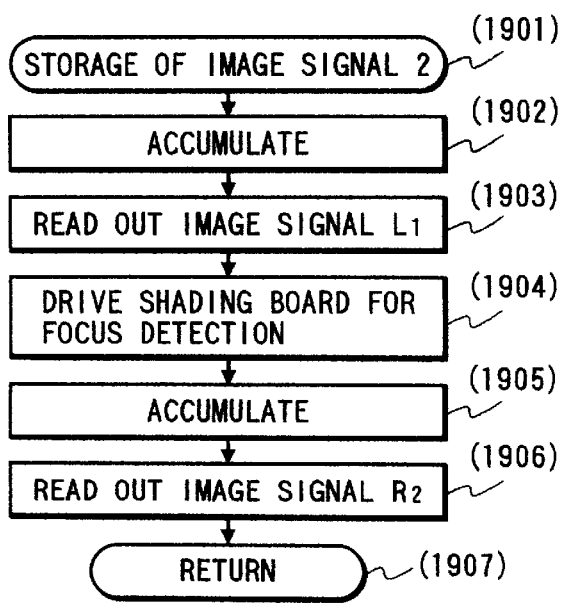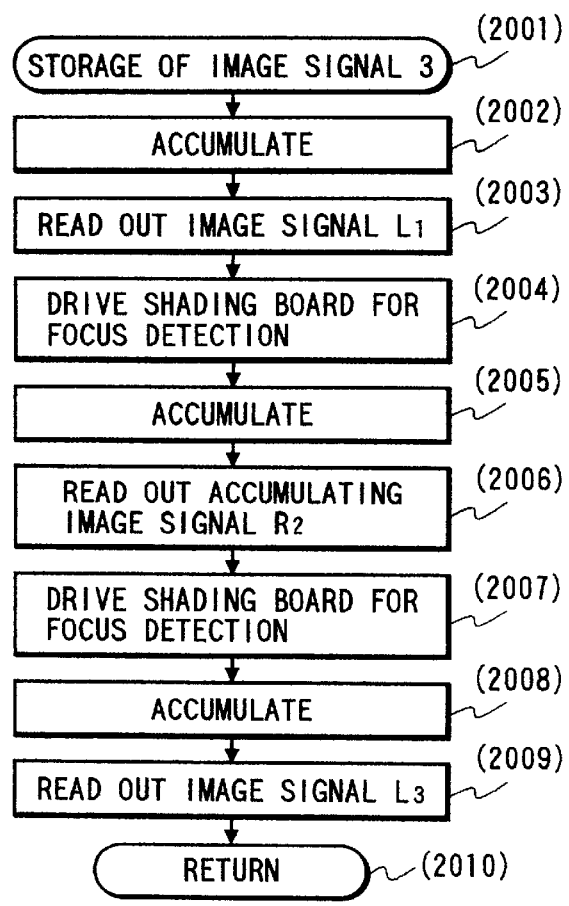

FOCUSING INFORMATION DETECTING DEVICE, FOCUS DETECTING DEVICE AND CAMERA UTILIZING THE SAME

BACKGROUND OF THE INVENTION

1. Field of the Invention

The present invention relates to an improvement on a focus detecting device which is adapted to be equipped on a digital camera or the like and which time-sequentially divides the photographing light beam passing through an optical system into at least two different areas, converts optical images, time-sequentially focused on image sensor means through respective areas, into image signals and detects the phase difference of the image signals thereby calculating the focus state of the optical system.

2. Related Background Art

Among the automatic focusing devices employed in the conventional camera which uses silver halide-based film of the single lens reflex type, those based on the phase difference detecting system are widely employed.

FIG. 56 is a view showing the arrangement of the optical system of a single lens reflex type, provided with a conventional focus detecting device of the phase difference detecting system, wherein a light beam 9 a emerging from a photographing lens 1 is partly reflected by a main mirror 2, consisting of a half mirror, as a light beam 9b toward a focusing screen 3 and focuses an image of the object on a matted face thereof. The photographer observes the object image on the focusing screen, through eyepiece lenses 5a, 5b and a pentagonal roof prism 4.

On the other hand, among the light beam 9a, a part 9e transmitted by the main mirror 2 is reflected by a sub mirror 6 and is guided as a light beam 9f to a focus detecting device 7, which detects, by means of the light beam 9f, the focus state (defocus amount) of the photographing lens 1 relative to a silver halide-based photographic film 8.

When the detected defocus amount is larger than a predetermined range of focus so that the photographing lens is judged as being in an out-of-focus state, an unrepresented control circuit so drives a focusing lens of the photographing lens 1 as to cancel the defocus amount, thereby achieving the focusing operation.

In the following there will be explained, with reference to FIGS. 57A to 57C, the focus detecting principle of the conventional focus detecting device.

FIG. 57A shows an in-focus state, wherein light beams 16a, 16b passing respectively through two different pupils of a photographing lens 10 are focused on a primary focal plane 14, and images of the object on such primary focal plane are refocused by secondary imaging lenses 12a, 12b on a sensor plane 13 having two line sensors for each of the refocused images. A field lens 11 is provided in the vicinity of the primary image plane of the photographing lens 10, thus efficiently guiding the light beam of a predetermined image height to the sensor plane 13 and preventing the loss in the amount of light resulting form the increase in the image height. The two light beams 16a, 16b passing through the different pupils of the photographing lens 10 are in general limited by unrepresented diaphragms positioned immediately in front of or immediately behind the secondary imaging lenses 12a, 12b, and the photographing lens 10 is not provided with a member for dividing the pupil. Assuming that $\delta_0$ is the relative distance (phase difference) of the positions of the two images in the in-focus state, the amount of defocus in the current state and the direction thereof can be known from the difference between $\delta_0$ and the actually given phase difference.

FIG. 57B shows a state in which the lens is focused in front by a defocus amount d1, wherein the phase difference $\delta$ of the two images becomes smaller than $\delta_0$, and the difference ($\delta_0-\delta_1$) increases with the increase of d1.

FIG. 57C shows a state in which the lens is focused in the back by a defocus amount d2, wherein the phase difference $\delta_2$ of the two images becomes larger than $\delta_0$, and the difference ($\delta_2-\delta_0$) increases with the increase of d1. In this manner the detection of the phase difference of the two images focused on the sensor plane 13 allows to detect the focus state of the photographing lens, or the magnitude and the direction of the defocus amount.

However, in the prior art, the single lens reflex camera becomes inevitably bulky for securing the space for the focus detecting device and becomes expensive by the cost required therefor. Also the accuracy of focusing is deteriorated as the relative positional relationship between the photographic film and the focus detecting device is varied by a change in the temperature or by a time-dependent variation in the quick return mirror.

The image taking apparatus such as a digital camera employ a solid-state image pickup device as the image sensor and can avoid the above-mentioned drawbacks by employing such solid-state image pickup device as the focus detecting sensor. A method for utilizing the solid-state image pickup device for the focus detecting sensor, for example employed in video cameras, consists of effecting the focusing operation, based on the detected contrast of the object image on the solid-state image pickup device, but such method is incapable of high-speed and highly precise focusing, as the exact defocus amount cannot be detected.

The highly precise high-speed focusing, without the above-mentioned drawbacks, can however be achieved by providing the photographing lens with pupil dividing means for rendering transmissive either one of the two different pupil areas, and detecting the relative positional difference, or the phase difference, between the object image obtained by the light beam transmitted by such transmissive pupil area and an object image obtained by the light beam transmitted by the other pupil area, thereby detecting the defocus amount.

However, in such conventional configuration, the image signal of the object image formed by the light beam transmitted by a pupil area is stored at first and then that of the object image formed by the light beam transmitted by the other pupil area is stored later, so that the two image signal storage operations are mutually different in-time.

FIGS. 58A and 58B are views showing the phase differences in the focus detecting operation respectively for a still object which is in a constant positional relationship relative to the camera and a moving object of which positional relationship varied relative to the camera, wherein L indicates an image signal corresponding to an object image formed by a light beam transmitted through a left pupil of the photographing lens, while R indicates an image signal corresponding to an object image formed by a light beam transmitted through a right pupil of the photographing lens.

In case of a still object as shown in FIG. 58A, the phase difference $\delta_{12}$ between an image signal $L_1$ stored first and an image signal $R_2$ stored later is same as the true phase difference $\delta_{11}$ corresponding to the defocus amount, so that the exact focus detection is possible.

On the other hand, in case of a moving object as shown in FIG. 58B, the object image moves on the solid-state image pickup device by $\delta_m$ between the storage of the image signal $L_1$ and that of the image signal $R_2$, so that the phase difference $\delta_{12}$ obtained by the image signals $L_1$ and $R_2$ corresponds to the sum of the true phase difference $\delta_{11}$ and the moving amount $\delta_m$. Consequently the result of the focus detection includes an error corresponding to the moving amount $\delta_m$ whereby the precision of the focus detection is correspondingly deteriorated.

A representative example of the change in the relative positional relationship between the camera and the object is in case of hand vibration in a hand-held photographing operation. The error in the focus detection, caused by such hand vibration, increases with the photographing lens of a longer focal length and with a longer time difference between the storage of the two image signals.

SUMMARY OF THE INVENTION

One aspect of the application is to provide a focus detecting device capable of compensating the relative movement between the object and the photographing optical system, even in case the object moves relative to the optical system in the course of the photographing operation.

One aspect of the application is to provide a focus detecting device capable of compensating the relative movement between the object and the photographing optical system, by storage, for obtaining plural images for focus detection, at least twice the image formed by the light beam transmitted by at least a pupil area, in addition to the storage of the respective images formed by the light beams transmitted by the different pupil areas.

One aspect of the application is to provide a focus detecting device capable of eliminating the error in the focus detection, resulting from an optical image moving at a constant velocity, utilizing two sets of the phase difference information obtained from three image signals.

One aspect of the application is to provide a focus detecting device capable of eliminating the error in the focus detection, resulting from an optical image moving at a constant velocity or at a constant acceleration, utilizing two sets of the phase difference information obtained from three image signals.

One aspect of the application is to provide a focus detecting device capable of eliminating the error in the focus detection, resulting from an optical image moving at a constant velocity or at a constant acceleration, utilizing at least three sets of the phase difference information obtained from at least four image signals.

One aspect of the application is to provide a focus detecting device capable of eliminating the error in the focus detection utilizing plural phase difference information, wherein a suitable number of phase difference information are selected according to the conditions such as the focal length of the photographing lens and the time interval of the storage of the image signals, thereby improving the accuracy of the focus detection and reducing the time required therefor.

Still other aspects of the application, and the features thereof, will become fully apparent from the following description of the embodiments.

BRIEF DESCRIPTION OF THE DRAWINGS

FIG. 1 is a block diagram showing the configuration of a camera provided with a focus detecting device of the present invention;

FIGS. 8A and 8B are schematic views for explaining the correcting operation of the present invention, in combination with FIG. 7;

FIG. 51 is a flow chart showing the details of the operation "image signal storage 2" in FIG. 48;

FIG. 52 is a flow chart showing the details of the operation "image signal storage 3" in FIG. 48;

DESCRIPTION OF THE PREFERRED EMBODIMENTS

Figure 2A:
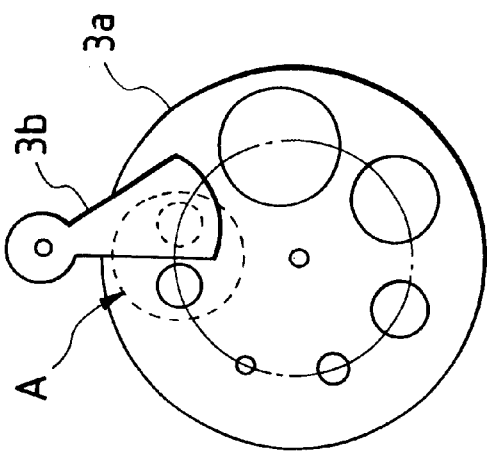
FIGS. 2A, 2B and 2C are views showing a diaphragm system constituting a pupil position moving mechanism shown in FIG. 1.

FIG. 1 is a view showing a focus detecting device constituting a first embodiment of the present invention and a camera utilizing the same, wherein shown are a focusing lens group 1b of a photographing lens; another lens group 1a thereof; a lens driving mechanism 2 for advancing the focusing lens group 1b, including a lens moving motor and a driver therefore; a shutter-diaphragm system 3 including a pupil position moving mechanism; a CCD and a signal processing system 4 for effecting photoelectric conversion of an optical image for obtaining an image signal; an A/D converter 5 for digitizing the image signal; a digital signal processing unit 6 for effecting various digital signal processing on the digital image signal obtained in the A/D converter 5; a system control unit 7 for the entire camera; a PCMCIA-based slot 8 to be connected to a recording medium or a function card and a controller therefor; a buffer memory 9 composed for example of a DRAM for temporary storage of the digital image signal; an electronic view finder (EVF) 10; a driver 11 therefor; a D/A converter 12 for supplying the driver with an analog signal; a VRAM 13 for storing the image to be displayed on the EVF and sending a digital signal to the D/A converter; an external monochromatic liquid crystal display (EXT. LCD) 14 for displaying, for example, the mode data of the camera; and a controller and a driver 15 for the EXT. LCD.

In the following there will be given an explanation on the embodiment shown in FIG. 1, principally on the focus detecting method and the focus detecting device, which relate directly to the present invention. It is assumed that the power supply of the camera is turned on whereby the camera is rendered capable of the photographing operation. The shutter-diaphragm system is provided with a diaphragm disk 3a having plural photographing diaphragm apertures of different sizes and a pupil time-dividing phase difference diaphragm having two apertures in the horizontal direction for determining the phase difference (hereinafter an aperture at the left-hand side seen from the side of the CCD 4 being called the left pupil, and an aperture at the right-hand side being called the right pupil), a motor 3d for rotating the diaphragm disk 3a to select the diaphragms provided concentrically and to bring a desired diaphragm into the optical path, a light shading board 3b for closing either of the left and right pupils at the time-divided auto focusing operation based on the phase difference, and a motor 3c for moving the light shading board 3b.

Figure 2B:
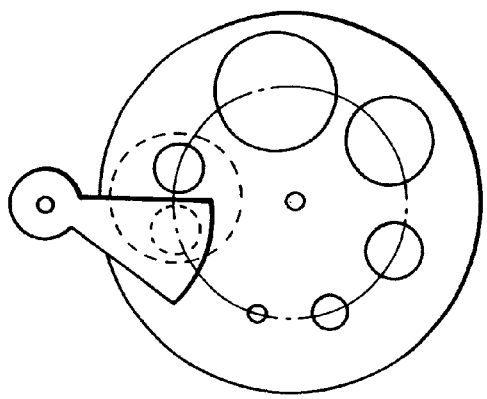
Figure 2C:
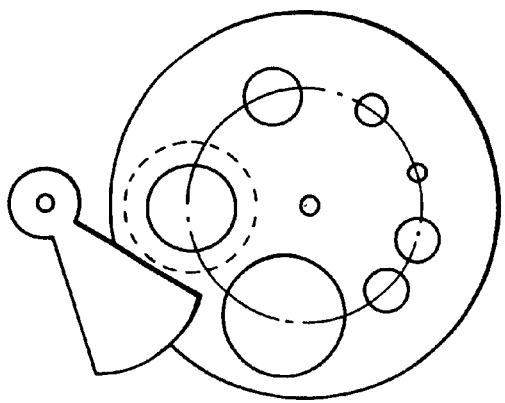

For effecting the time-divided phase difference auto focusing operation, the system control unit 7 sends an instruction to rotate the diaphragm disk 3a, thereby bringing the pupil time-dividing phase difference diaphragm into the optical path. FIGS. 2A to 2C show the positional relationship between the diaphragm disk 3a and the light shading board 3b. A broken-lined circle A in FIGS. 1 and 2A to 2C indicates the shape of the pupil when the diaphragm of the photographing optical system is made fully open. At first the right pupil of the pupil time-dividing diaphragm is blocked by the light shading board 3b as shown in FIG. 2A, and an optical image formed by the light beam passing through the pupil area of the left-hand side of the photographing optical system is focused on the CCD and is thus stored. The auto focusing image data, obtained from the light beam passing through the pupil area of the left-hand side, are called a left image 1.

Then, in order to obtain the auto focusing image data, obtained from the light beam passing through the different pupil area, the motor 3c is activated to displace the light shading board 3b as shown in FIG. 2B, and an optical image formed by the light beam passing through the pupil area of the right-hand side of the photographing optical system is focused on the CCD and is thus stored. The auto focusing image data, obtained from the light; beam passing through the pupil area of the right-hand side, are called a right image 1.

Then, in order to obtain the auto focusing image data, obtained from the light beam passing through the same pupil area, the light shading board 3b is moved again as shown in FIG. 2A, and an optical image formed on the CCD is stored. The auto focusing image data, obtained from the light beam passing through the pupil area of the left-hand side, are called a left image 2.

The exposure operation for storage of the auto focusing image data is Executed by an electronic shutter or an unrepresented mechanical shutter, eventually regulated with plural pupil-dividing diaphragms of different aperture areas or with auxiliary illumination.

In the present embodiment, the pupil-dividing diaphragm and the photographing diaphragms are selected by the rotation of a same diaphragm disk 3a, but the pupil-dividing diaphragm and the photographing diaphragms may be constructed separately. In such case, the exposure can be regulated by the photographing diaphragms instead of providing plural pupil-dividing diaphragms of different aperture sizes.

The storage of the auto focusing image data consisting of the left image 1, the right image 1 and the left image 2 and the ensuing photographing operation are desirably executed within as short a time as possible. For this reason, the data read-out for storage of the auto storage image data, which takes a long time if executed from the entire area of the solid-state image pickup device, is executed in a partial area required for the focus detection, thereby achieving a shorter read-out time than in the photographing operation.

Figure 3:
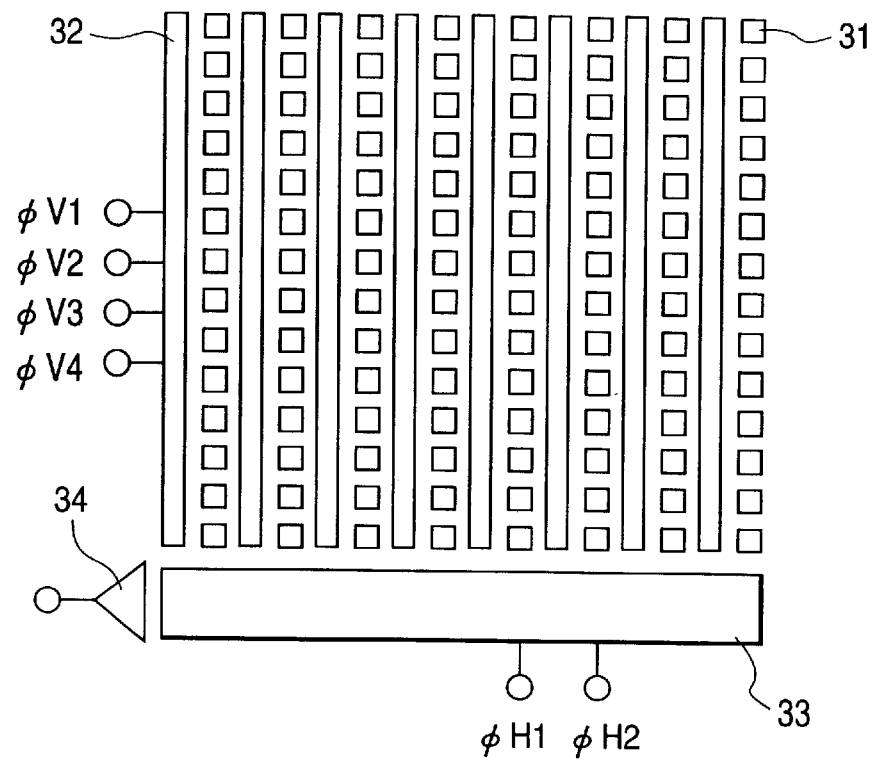
FIG. 3 is a schematic view showing the configuration of an interline CCD.

Such data read-out time will be explained in the following. FIG. 3 is a schematic view of an interline CCD, wherein shown are pixels 31, vertical charge transfer elements 32, a horizontal charge transfer element 33, and an output unit 34. Signal charges, obtained by photoelectric conversion in the pixels, are transferred to the vertical charge transfer elements, and are transferred in-succession toward the horizontal charge transfer element according to 4-phase driving pulses φV1, φV2, φV3, φV4. The horizontal charge transfer element transfers the signal charges of a horizontal row, transferred from the vertical signal transfer elements, in succession toward the output unit according to 2-phase driving pulses φH1, φH2, and the signal charges are converted in the output unit into voltages and outputted.

Figure 4:
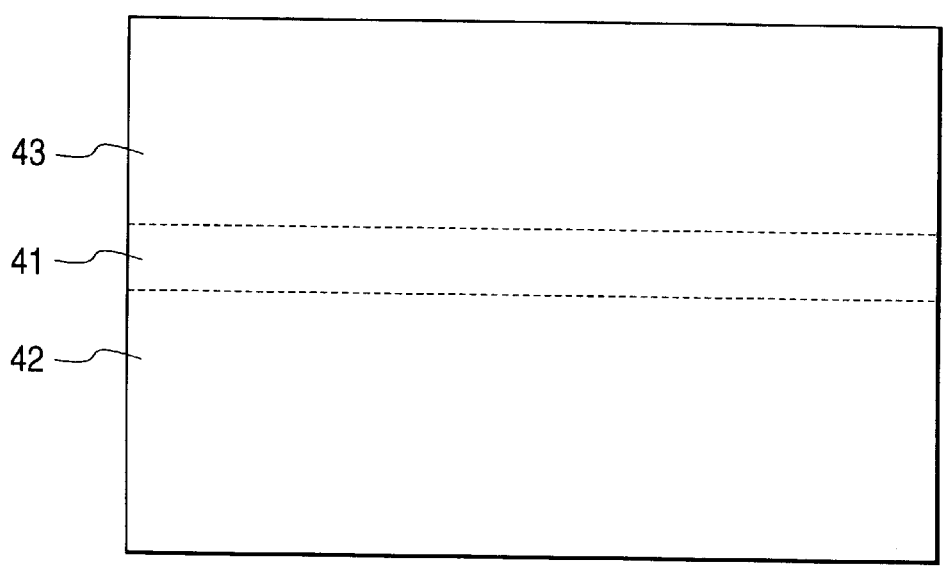
FIG. 4 is a schematic view showing the image taking area of a CCD.

FIG. 4 is a schematic view of the image taking area of the CCD. In the present embodiment, for achieving a high-speed read-out operation, the signal charges are read at a normal speed only in a necessary read-out area, but are sweep transferred in other areas. The ordinary signal read-out is executed in an area 41, while the high-speed sweeping signal transfer is executed in former and latter areas 42, 43.

Figure 5:
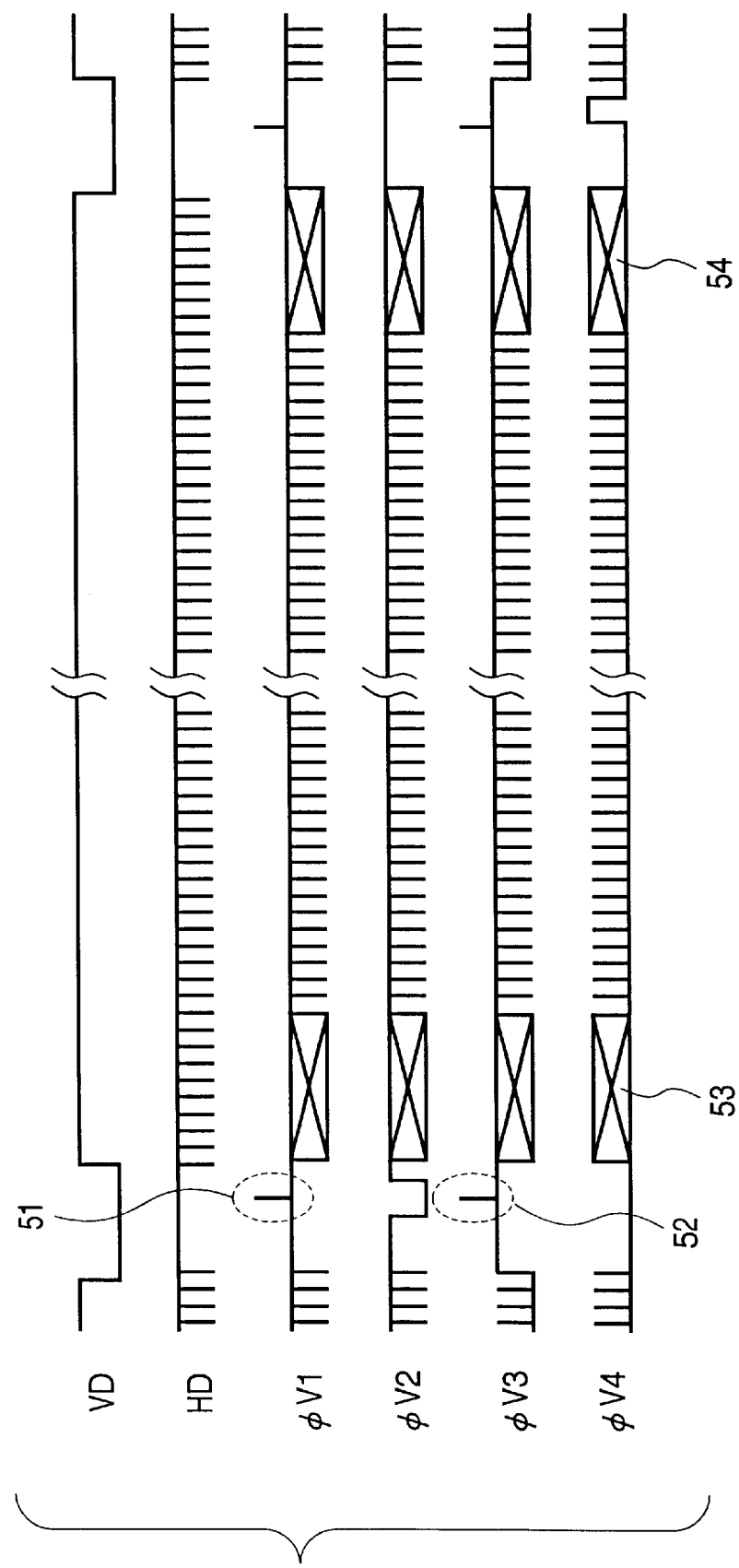
FIG. 5 is a wave form chart showing the driving operation of a CCD.

FIG. 5 is a timing chart of a vertical synchronization period, in case the vertical charge transfer elements of the CCD are 4-phase driven. A vertical synchronization signal VD indicates the vertical blanking period by a low potential state, while a horizonal synchronization signal HD indicates the horizontal blanking period by a low potential state. There are also shown 4-phase drive pulses φV1, φV2, φV3 and φV4, and read-out pulses 51, 52 for transferring the signal charges, obtained by the photoelectric conversion in the pixels, to the vertical charge transfer elements. Among the 4-phase drive pulses, those 53 and 54 are high-speed sweep drive pulses for high-speed transfer of the signal charges in the vertical charge transfer elements in the areas 42, 43 in FIG. 4. The partial signal read-out operation can thus be achieved within a shorter time, by sweeping out the signal charges in other than the necessary read-out area.

The auto focusing image data consisting of the left image 1, the right image 1 and the left image 2, obtained by the above-explained high-speed signal reading, are used in a correlation calculation for determining the defocus amount, of which algorithm will be explained in the following.

For the purpose of simplicity, there will at first be explained a case where the object does not move relative to the photographing optical system.

There are stored image data (left image) formed by the light beam passing through the left pupil area and image data (right image) formed by the light beam passing through the right pupil area, and the correlation is calculated between the two sets of the image data. The correlation is calculated by so-called "max algorithm", wherein the correlation $C(\tau)$ is represented by:

$$C(\tau) = \sum_{i=1}^{m} \max[a(i+\tau), b(i_0+i)]$$

$$(\tau = 0, 1, 2, \ldots, T)$$

wherein a(i) indicates left image data (i=1, 2, . . . , n) and b(i) indicates right image data (i=1, 2, . . . , n). Also max [a(i+τ), b(i)] indicates the larger one of a(i+τ) and b(i), m indicates the number of data extracted from a(i), b(i) of n sets each (m<n) for use in the calculation of correlation, and $i_0$ indicates the number of skippings in extracting m data from the n right image data.

Figure 6:
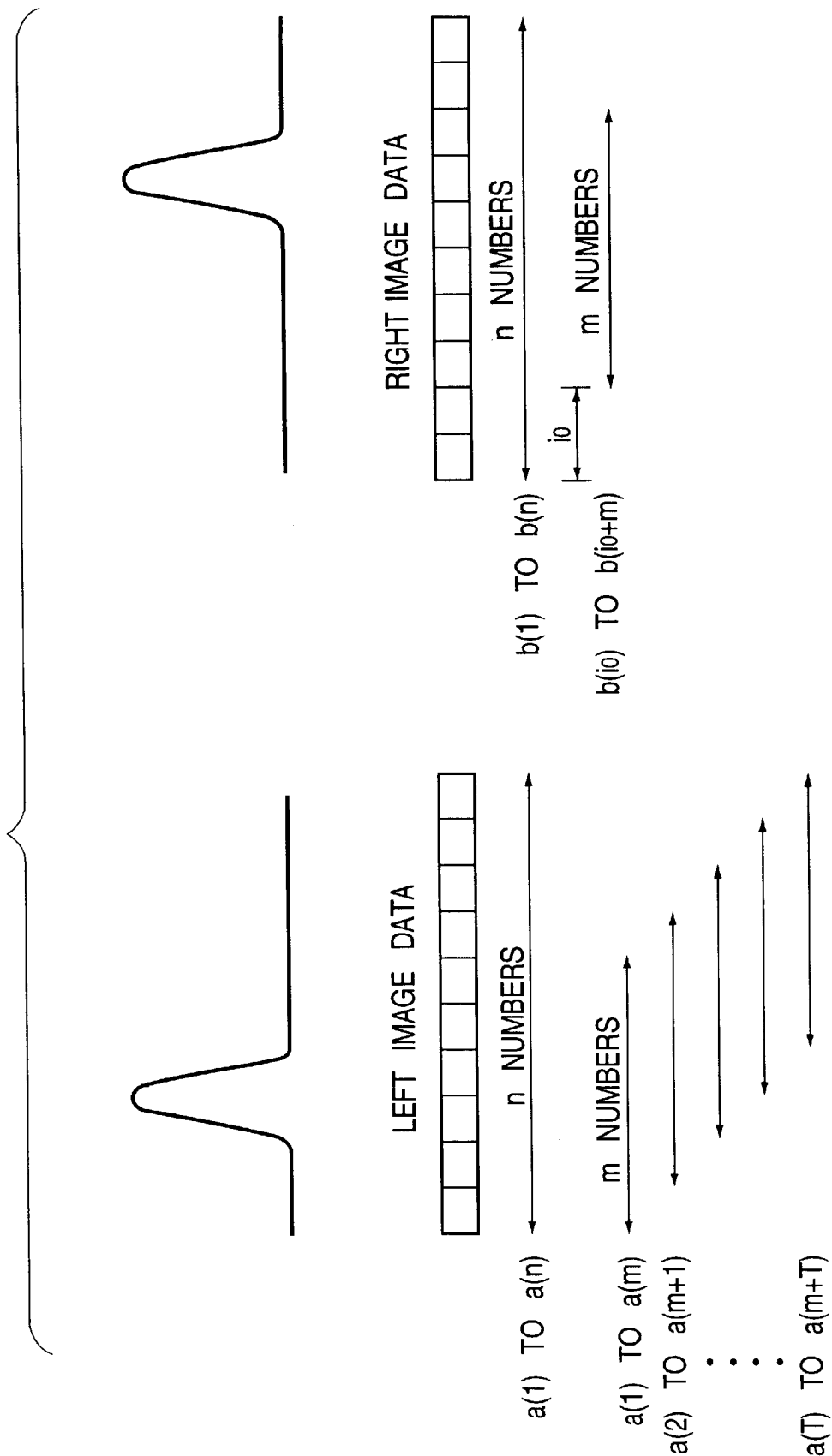
FIG. 6 is a view for explaining a correlation calculating operation.

In practice, at first c(0) at τ=0 is calculated. Then there are extracted m data shifted by τ=1, as shown in FIG. 6, from the left image data a(i) and the correlation c(1) between these data and the right image data is calculated. In this manner the correlation c(τ) is calculated in succession for τ=0, 1, 2, . . . , T. The shift amount T corresponding to the minimum value of thus calculated correlations c(τ) corresponds to the aberration between the left image data a(i) and the right image data b(i). In order to improve the accuracy of detection, the shift amount can be calculated by interpolation, utilizing the minimum value of the correction and an adjacent value thereto (namely the aberration τ being calculated not in an integral value (in the unit of a pixel) but to fractional digits).

The data employed in the calculation of correlation may be taken from plural lines. In such case the aberration may be determined by calculating the correlation in each line and averaging the obtained correlation amounts, or by at first averaging the plural lines in the vertical direction to obtain data of a single line and then calculating the correlation on such data of a single line. It is furthermore possible to calculate the correlation among the plural lines.

Also the correlation may be calculated after applying a filtering process to the output data of the image pickup device, in order to reduce the influence of the pattern or contrast of the object, the influence of a color filter array incorporated in the solid-state image pickup device and the influence of noises. Since the specific calculation method of the correlation is itself not directly related to the present invention, there may naturally be utilized any known calculation method for the correlation instead of the above-explained calculation method.

As the relationship between the amount of shift and the amount of movement of the image plane or the defocus amount is fixed for each optical system, the amount of aberration is used for determining the defocus amount or the amount of lens movement required for focusing and there is executed focusing control on the optical system to attain a focused state.

In the foregoing there has been explained the focus detecting method-utilizing plural images formed by the light beams passing through the different pupil areas, in the absence of relative movement between the object and the optical system.

In the following there will be explained a method for judging whether a relative movement is present between the object and the optical system.

Figure 7:
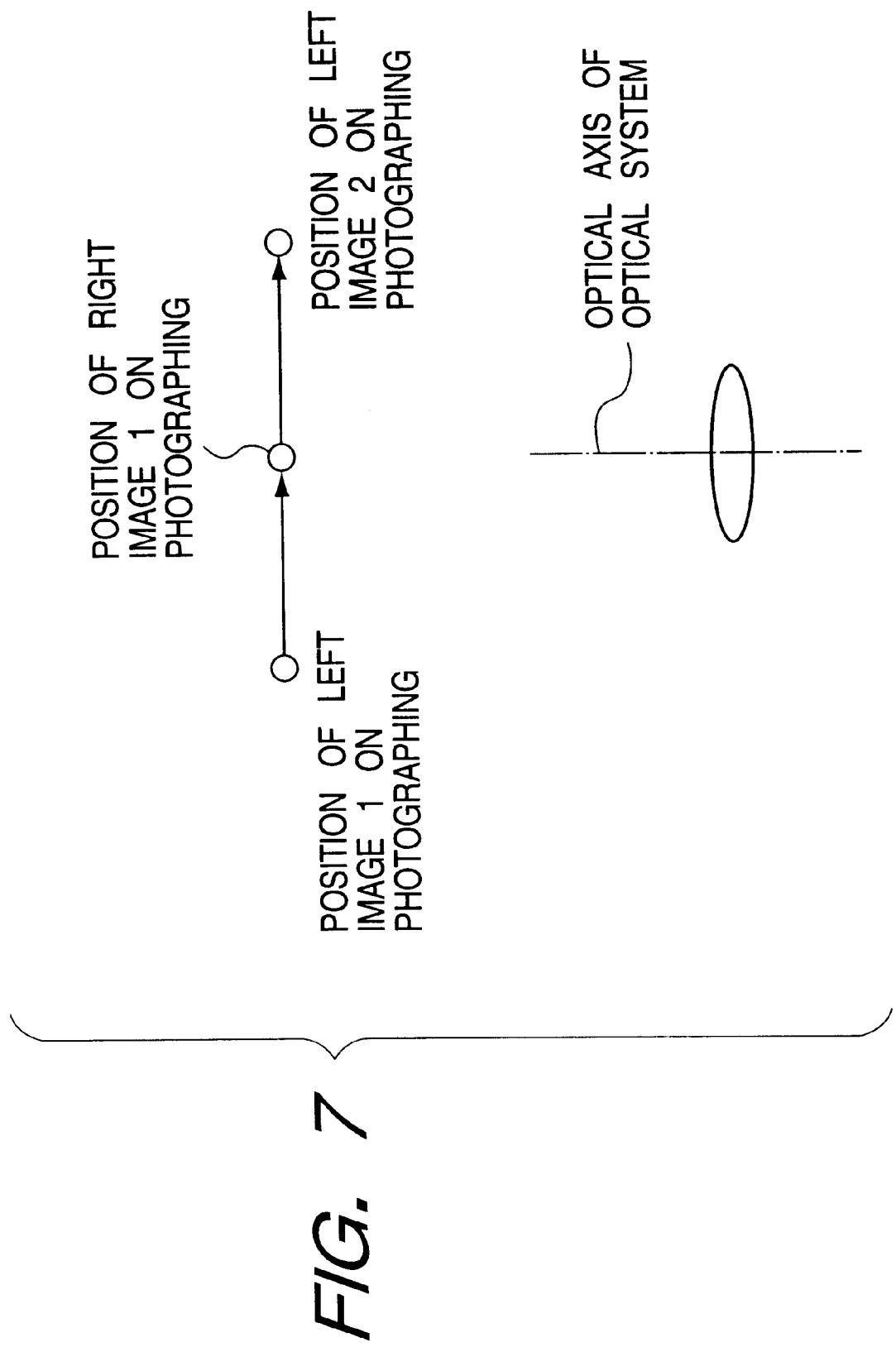
FIG. 7 is a schematic view showing a correcting operation of the present invention.

For the purpose of simplicity, there will be considered a case where, as shown in FIG. 7, the object moves linearly with a constant speed in a plane perpendicular to the optical axis of the optical system. If the intervals of the storage operations of the left image 1, the right image 1 and the left image 2, constituting the auto focusing image data, are short, the relative movement between the object and the optical system can be regarded as of a constant speed unless the change in the speed is particularly significant.

FIGS. 8A and 8B show the left image data 1, the right image data 1 and the left image data 2 respectively in the absence and in the presence of the relative movement between the object and the optical system.

For judging whether the relative movement is present between the object and the optical system, the correlation is calculated between the different image data formed by the light beam passing through the same pupil area, namely the image data of the left image 1 and the left image 2, in a similar manner to the calculation of correlation between the left image and the right image in the case of an absence of the relative movement between the object and the photographing optical system, whereby the shift amount τ is determined between the left image 1 and the left image 2. If such shift amount is zero or within a predetermined threshold range, the relative movement is judged as absent (cf. FIG. 8A). In such case the correlation calculated is executed between the left and right images to determine the aberration therebetween, from which the defocus amount is determined.

On the other hand, if the shift amount τ between the left image 1 and the left image 2 is not zero or not within the predetermined threshold range, the relative movement is judged as present (cf. FIG. 8B). The determined amount of shift is assumed to be $\tau_m$. If the interval from the storage of the left image 1 to that of the right image 1 is equal to the interval from the storage of the right image 1 to that of the left image 2, the object is moving with a constant speed in a plane perpendicular to the optical axis of the optical system, and the amount of aberration of the image caused by the movement of the object in the period from the storage of the left image 1 to that of the right image 1, is represented by $\tau_m/2$. Then the shift amount $\tau_0$ between the left image 1 and the left image 2 is determined by the correlation calculation explained in the foregoing. The shift amount $\tau_0$ contains an aberration caused by the defocus and an aberration caused by the movement. Thus the shift amount caused by the actual defocus can be obtained by subtracting the shift amount caused by the movement. In the present case, the shift amount caused by the defocus is given by $\tau=\tau_0-\tau_m/2$.

Based on this obtained value, there is determined the lens drive amount required for focusing, then the focusing control is executed in consideration of the moving amount of the object within the time the photographing operation attains the focused state. The photographing operation is then executed.

The photographing operation is executed after rotating the diaphragm disk 3a to retract the pupil-dividing diaphragm from the optical path and to select a diaphragm aperture, providing the appropriate exposure, among the plural photographing diaphragm apertures of different sizes. Then the data are read from the solid-state image pickup device, subjected to signal processing in the signal processing unit 6, then subjected for example to data compression, and recorded on a recording medium through the PCMCIA slot 8.

The image data are also subjected, in the signal processing unit 6, to a video processing for display in the view finder, and are displayed through the VRAM 13 on the EVF 10, on which the photographer can confirm the image of the object.

In the foregoing there has been considered the photographing lens of a single focal length, but a zoom lens may also be employed as the photographing lens.

Also in the foregoing there has been explained, for obtaining different pupil areas, a case of dividing the pupil on time-shared basis in the horizontal direction (left and right), but it is also possible to divide the pupil in the vertical direction or in the diagonal direction, or to suitably switch these divisions according to the object, or to effect the focus detection with the images obtained by dividing the pupil into three or more areas on time-shared basis.

Also in the foregoing the switching of the pupil areas is executed in the order of left, right and left, but it may also be executed for example in the order of left, left and right or right, left and left. Also in the foregoing there has been explained a case of storage of the image twice from a same pupil area, but the image storage from a same pupil area three or more times enables to know the amount of movement even in case it is not of a constant speed.

In the present embodiment, the shift amount resulting from the relative movement is determined from the left image 1 and the left image 2, but, in case the speed varies rapidly as in the case of hand vibration, the shift amounts between the left image 1 and the right image 1 and between the right image 1 and the left image 2 are respectively determined and the average value of such shift amounts can be regarded as the aberration resulting from the defocus.

[Second embodiment]

FIGS. 9A to 9C, 10A to 10C and 11A to 11C are views showing the detecting principle of a focus detecting device constituting a second embodiment of the present invention.

Figure 9A:
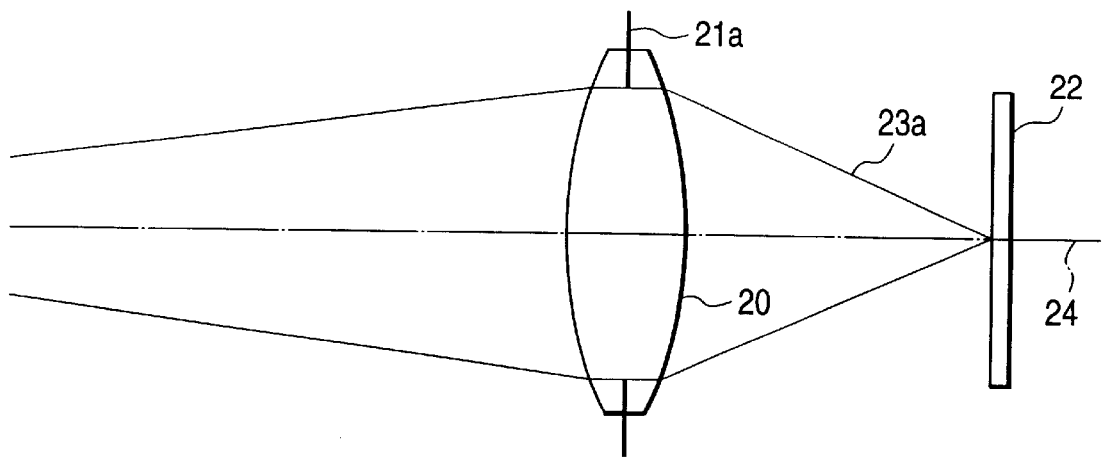
FIGS. 9A, 9B and 9C are views showing light beams passing through different pupil areas and focus states thereof on a CCD surface, in an in-focus state in cameras of second to fifth embodiments of the present invention.
Figure 9B:
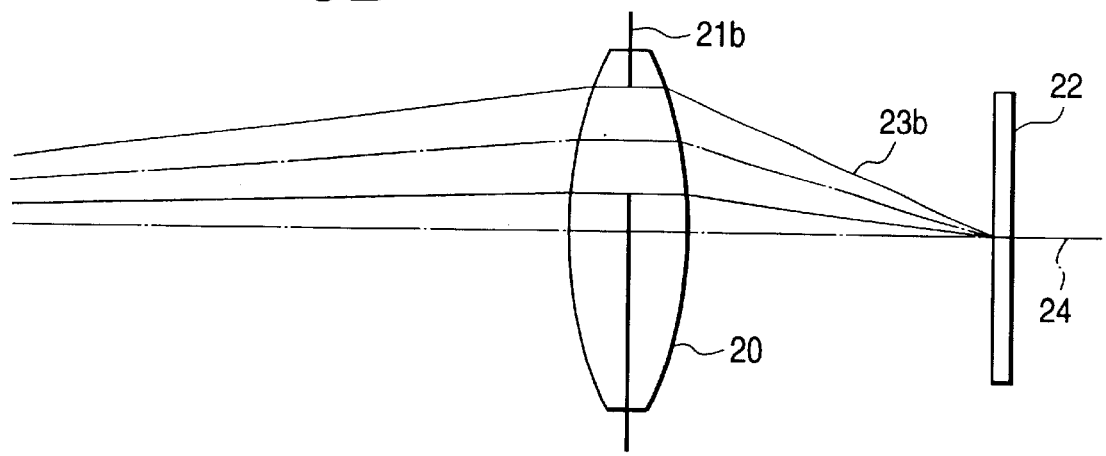
Figure 9C:
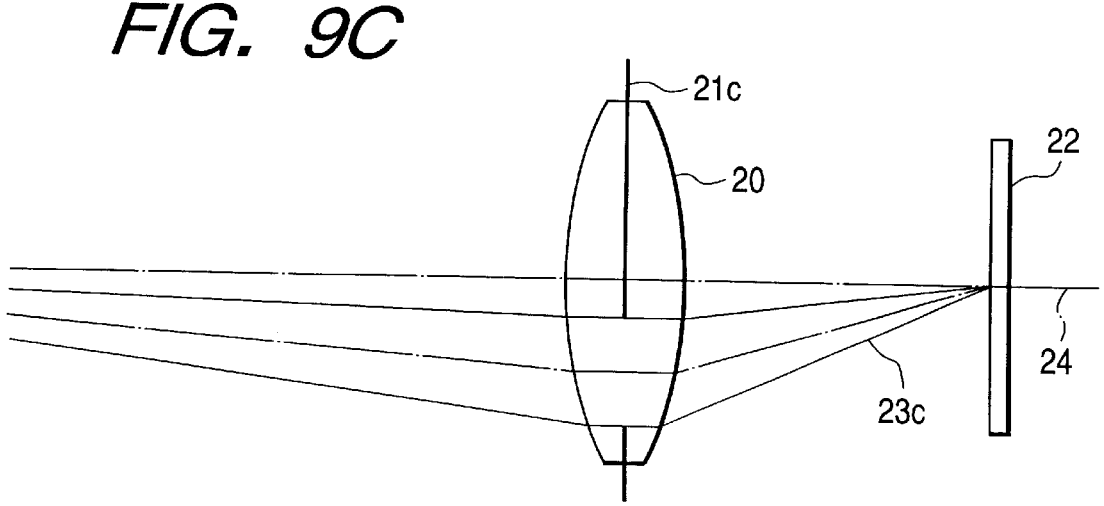

FIGS. 9A to 9C illustrate light beams in an in-focus state. In a state shown in FIG. 9A, the light beam 23 a emerging from a photographing lens 20 is focused, on the optical axis 24 thereof, on the light receiving face of an image pickup device 22, with a zero defocus amount. Also when a diaphragm 21b having an aperture (first pupil area) in the upper part of the photographing lens 20 is inserted as shown in FIG. 9B, the light beam 23b emerging therefrom still enters, on the light receiving face of the image pickup device 22, a position on the optical axis 24 of the photographing lens. Also when a diaphragm 21c having an aperture (second pupil area) in the lower part of the photographing lens 20 is inserted as shown in FIG. 9C, the light beam 23c emerging therefrom still enters, on the light receiving face of the image pickup device 22, a position on the optical axis 24 of the photographing lens.

Thus, in the in-focus state, the light beam transmitted by the first pupil area (hereinafter simply represented as "first pupil") and that transmitted by the second pupil area (hereinafter simply represented as "second pupil") enter a same position on the image pickup device 22, so that the phase difference between. the two images is zero.

Figure 10A:
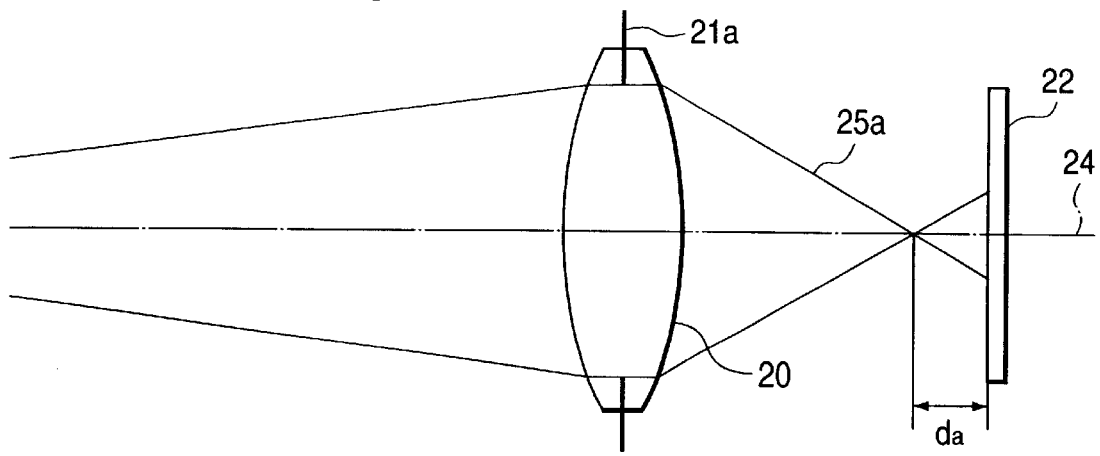
FIGS. 10A, 10B and 10C are views showing light beams passing through different pupil areas and focus states thereof on a CCD surface, in a front-focused state in the cameras of the second to fifth embodiments of the present invention.
Figure 10B:
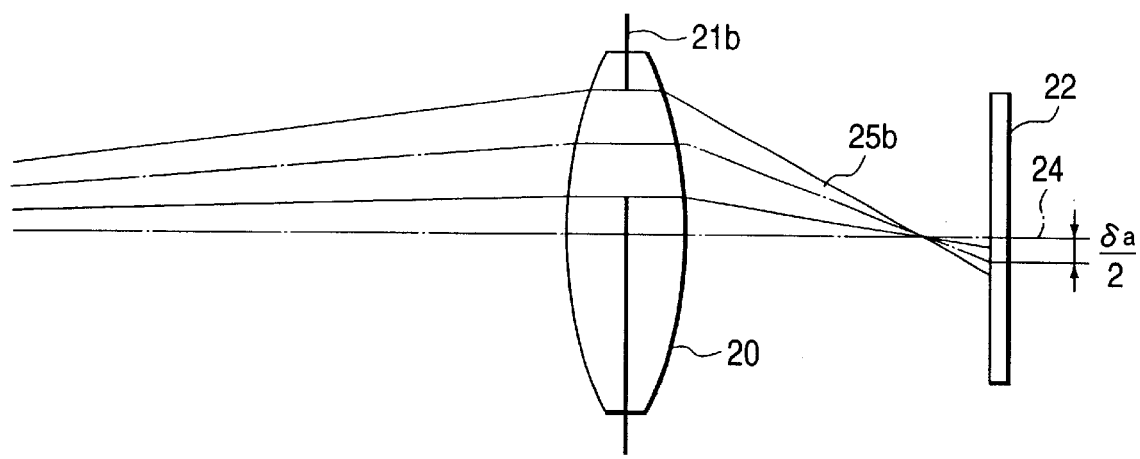
Figure 10C:
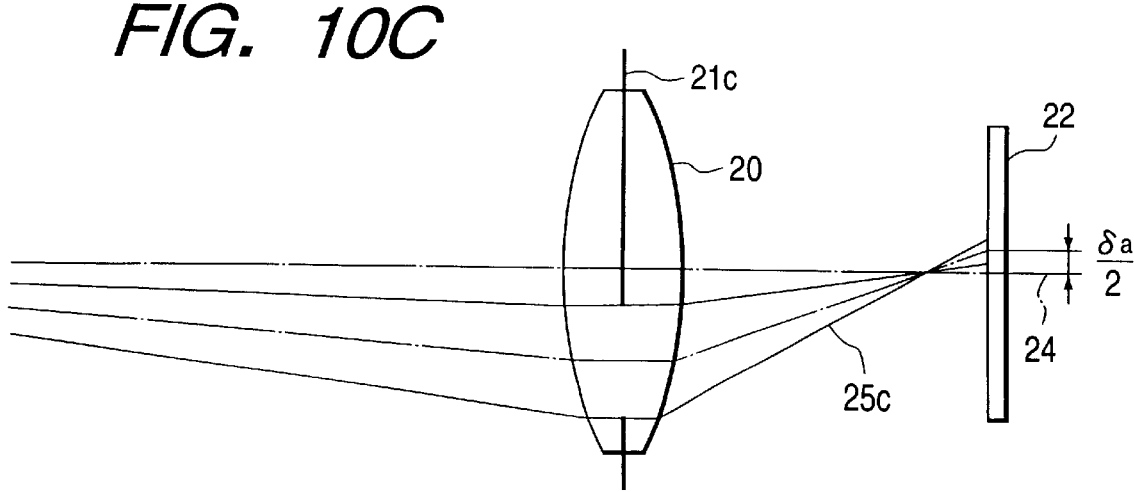

FIGS. 10A to 10C illustrate the light beams in a front-focused state. In a state shown in FIG. 10A, the light beam 25a emerging from the photographing lens 20 is focused at a position which is in front, by $d_a$, of the light receiving face of the image pickup device 22, so that the defocus amount is $d_a$. FIG. 10B shows a state in which a diaphragm 21b having an aperture (first pupil) in the upper part of the photographing lens 20 is inserted. The light beam 25b emerging from the photographing lens 20 enters, on the light receiving face of the image pickup device 22, a position which is below the optical axis 24 of the photographing lens by a distance $\delta_a/2$. Also in case a diaphragm 21c having an aperture (second pupil) in the lower part of the photographing lens 20 is inserted as shown in FIG. 10C, the light beam 25c emerging from the photographing lens 20 enters, on the light receiving face of the image pickup device 22, a position which is above the optical axis 24 of the photographing lens by a distance $\delta_a/2$.

Thus, in such rear-focused state, the light beams respectively transmitted by the first and second pupils generate a phase difference $\delta_a$ on the image pickup device.

Figure 11A:
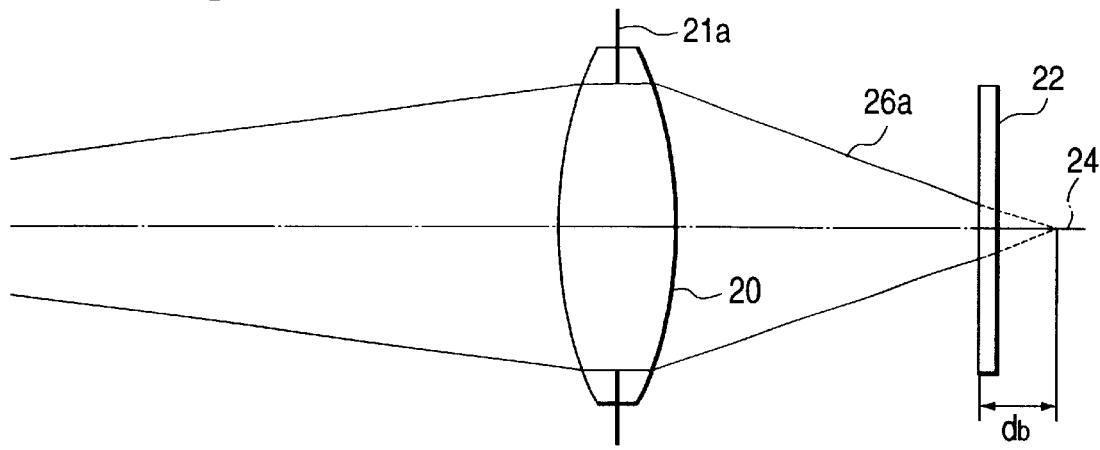
FIGS. 11A, 11B and 11C are views showing light beams passing through different pupil areas and focus states thereof on a CCD surface, in a rear-focused state in the cameras of the second to fifth embodiments of the present invention.
Figure 11B:
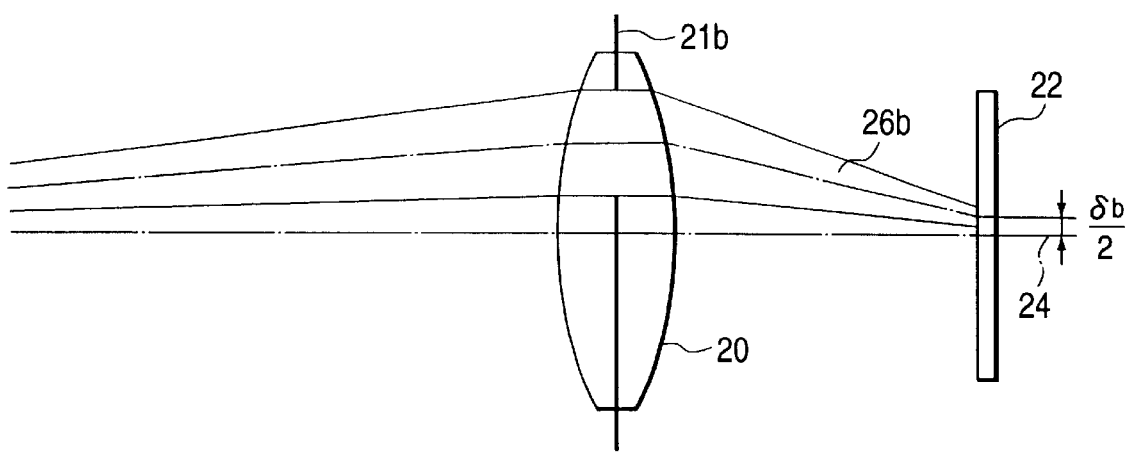
Figure 11C:
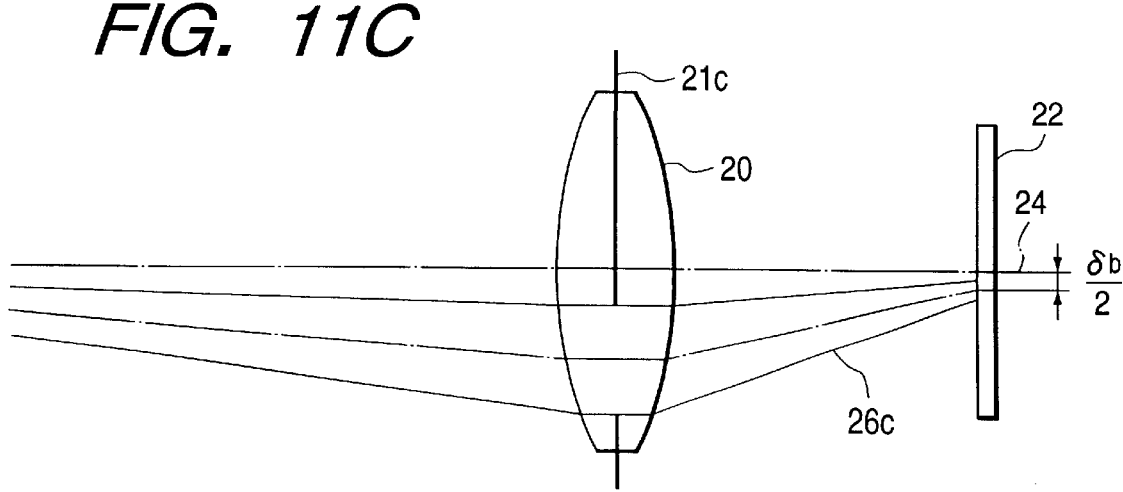

FIGS. 11A to 11C illustrate the light beams in a rear-focused state. In a state shown in FIG. 11A, the light beam 26a emerging from the photographing lens 20 is focused at a position which is behind, by $d_b$, the light receiving face of the image pickup device 22, so that the defocus amount is $d_b$. FIG. 11B shows a state in which a diaphragm 21b having an aperture (first pupil) in the upper part of the photographing lens 20 is inserted. The light beam 26b emerging from the photographing lens 20 enters, on the light receiving face of the image pickup device 22, a position which is above the optical axis 24 of the photographing lens by a distance $\delta_b/2$. Also in case a diaphragm 21c having an aperture (second pupil) in the lower part of the photographing lens 20 is inserted as shown in FIG. 11C, the light beam 26c emerging from the photographing lens 20 enters, on the light receiving face of the image pickup device 22, a position which is below the optical axis 24 of the photographing lens by a distance $\delta_b/2$.

Thus, in such rear-focused state, the light beams respectively transmitted by the first and second pupils generate a phase difference $\delta_b$ on the image pickup device.

By taking the phase difference as positive in case the object image formed by the light beam transmitted by the second pupil is positioned above that formed by the light beam transmitted by the first pupil, the phase difference in the front-focused state shown in FIGS. 10A to 10C is represented by "$+\delta_a$" while that in the rear-focused state shown in FIGS. 11A to 11C is represented by "$-\delta_b$". Thus the magnitude and the direction of the defocus amount can be known from the magnitude and the sign of the phase difference.

Figure 12:
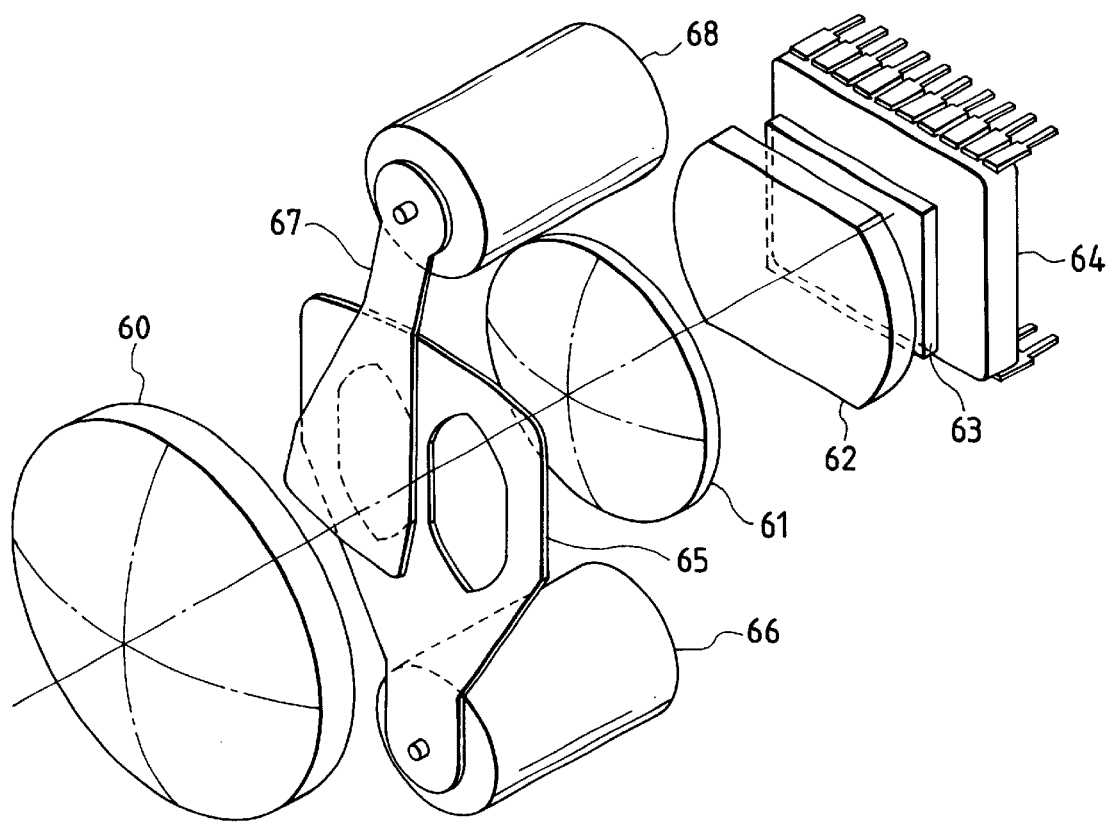
FIG. 12 is a perspective view showing a portion for changing the pupil area, equipped in the cameras of the second to fifth embodiments of the present invention.
Figure 13:
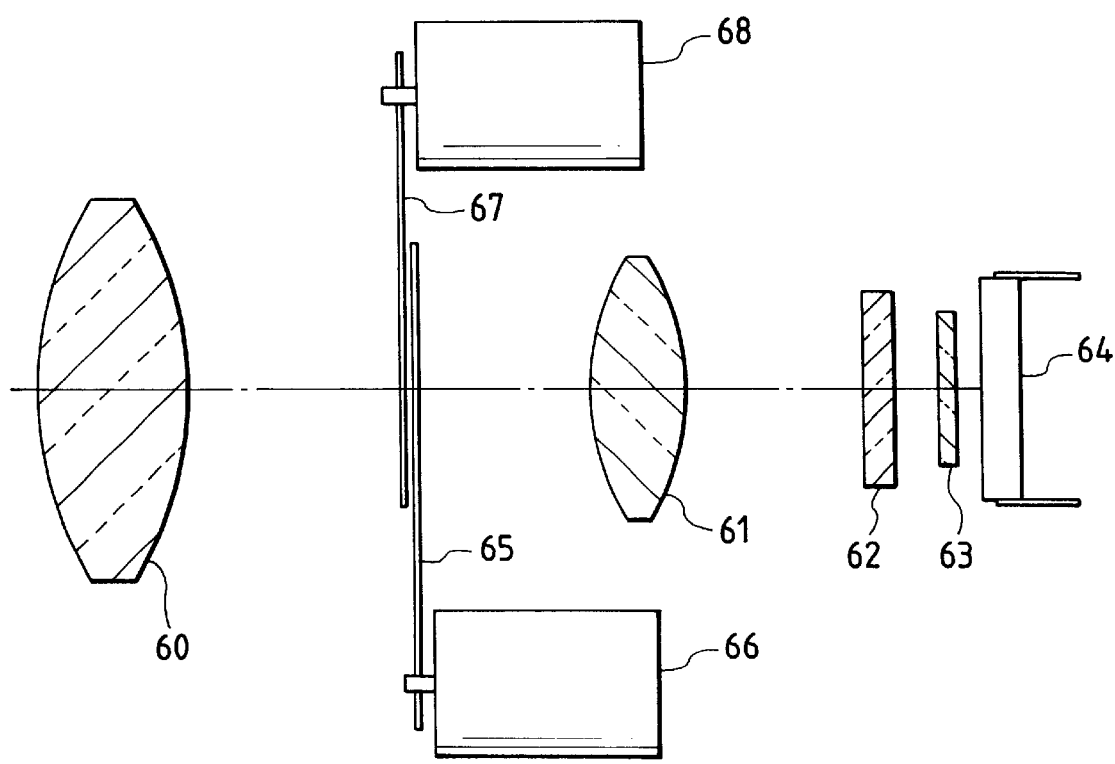
FIG. 13 is a longitudinal cross-sectional view of the configuration shown in FIG. 12.

FIG. 12 is a perspective view showing a part of the optical system of a camera employing a focus detecting device constituting an embodiment of the present invention, and FIG. 13 is a longitudinal cross-sectional view of the optical system shown in FIG. 12.

In these drawings, numerals 60, 61 indicate a photographing lens, in which a focusing lens 61 is driven by an unrepresented lens driving motor to effect focusing. There are also shown an optical low-pass filter 62, an infrared cut-off filter 63, a solid-state image pickup device 64, composed of a CCD, for converting an optical image into an image signal, a focus detecting diaphragm 65 which can be inserted into and retracted from the optical path of the photographing lens by a motor 66, and a focus detecting light shading board 67 which can be inserted into and retracted from the optical path of the photographing lens by a motor 68.

Figure 14:
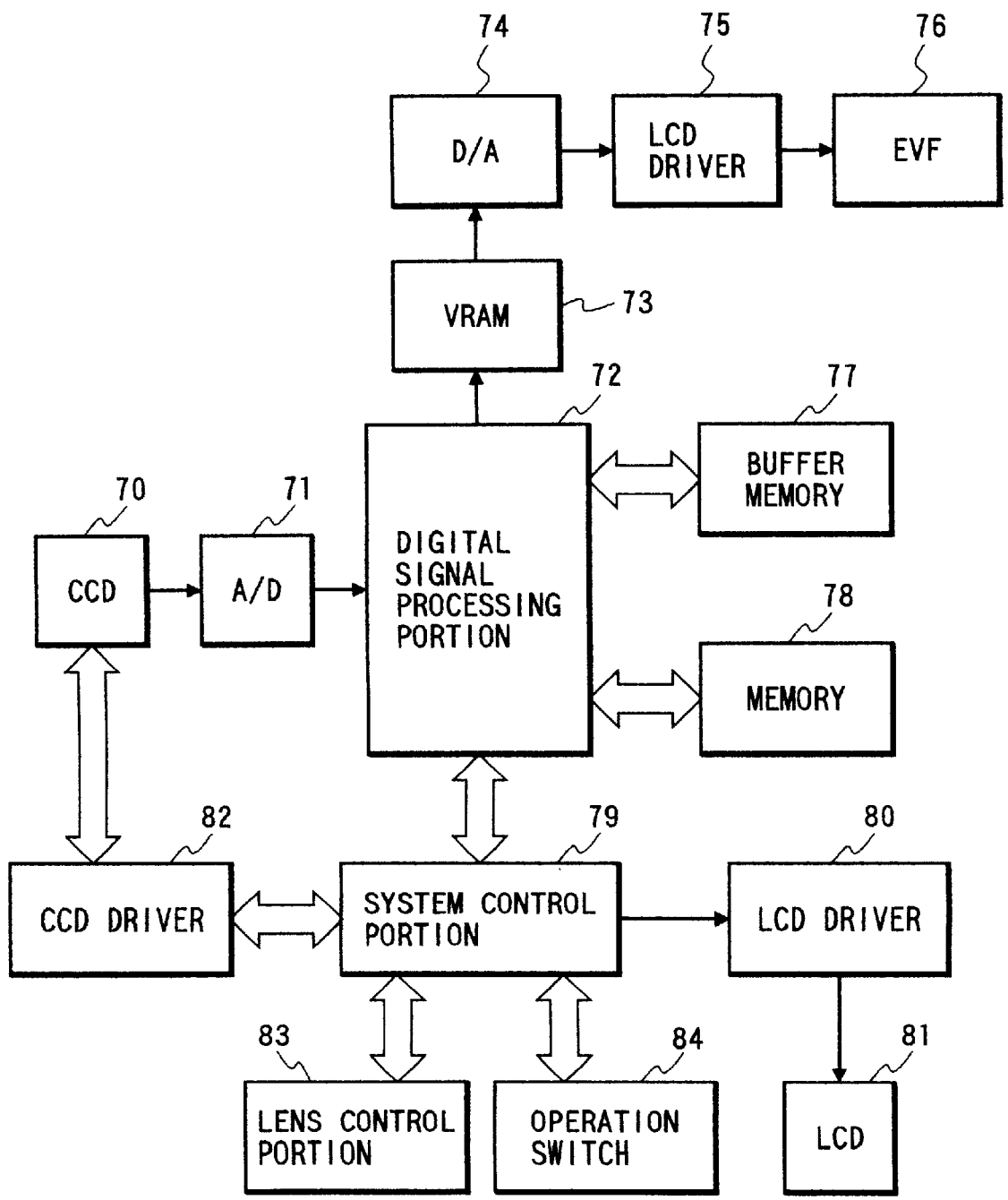
FIG. 14 is a block diagram showing the principal electrical configuration of the cameras of the second to fifth embodiments of the present invention.

FIG. 14 is a schematic block diagram showing the electrical configuration of the camera with the focus detecting device of the present embodiment.

Referring to FIG. 14, a solid-state image pickup device 70, composed of a CCD (corresponding to the CCD 64 shown in FIG. 12) releases an analog image signal, which is converted by an A/D converter 71 into a digital signal and sent to a digital signal processing unit 72. There are also provided a VRAM 73 constituting memory means for storing image data to be displayed on an electronic view finder (EVF) 76; a D/A converter 74 for converting the image data from the VRAM 73 into an analog signal; and an LCD driver 75 for controlling the electronic view finder (EVF) 76 for displaying therein the image released from the VRAM 73.

There are also provided a buffer memory 77 composed for example of a DRAM for temporarily storing the digital image signal and various data; a memory 78 for storing the photographed image data; a system control unit 79 for controlling the entire camera; a display member 80 for displaying the setting of the camera and the control state thereof; an LCD driver 81 for driving the display member 80; a CCD driver 82 for driving the CCD 70; a lens control unit 83 for controlling the diaphragm and the light shading board for focus detection, the diaphragm for photographing and the focusing lens; and an operation switch 84 for setting the photographing mode and for detecting the shutter releasing operation.

The foregoing represents the principal configuration of the camera of the present embodiment.

Figure 15A:
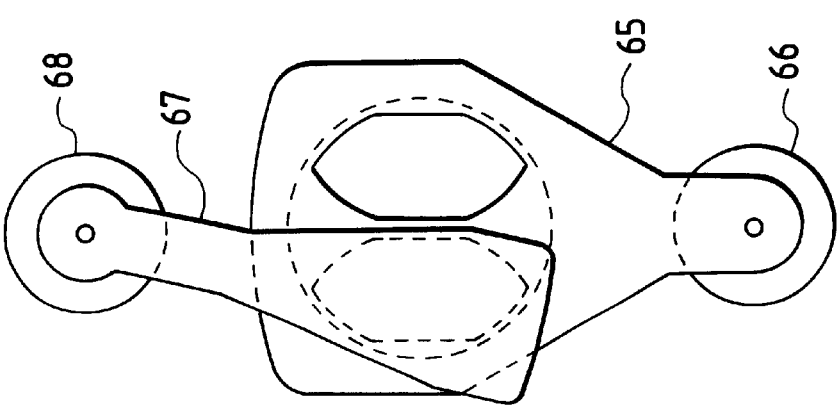
FIGS. 15A, 15B and 15C are views showing a pupil area varying operation in the cameras of the second to fifth embodiments of the present invention.
Figure 15B:
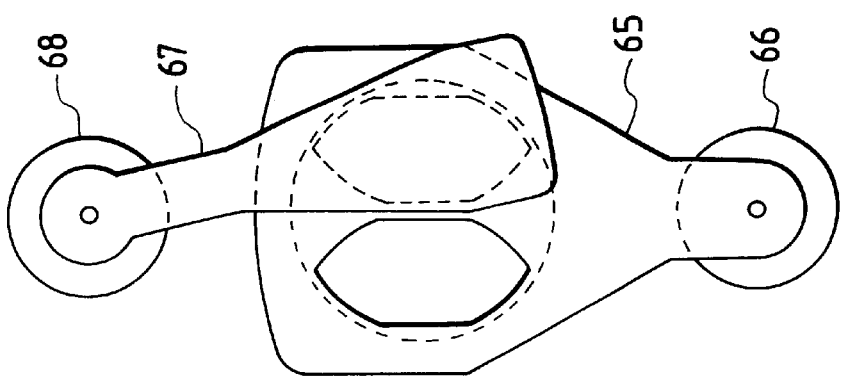
Figure 15C:
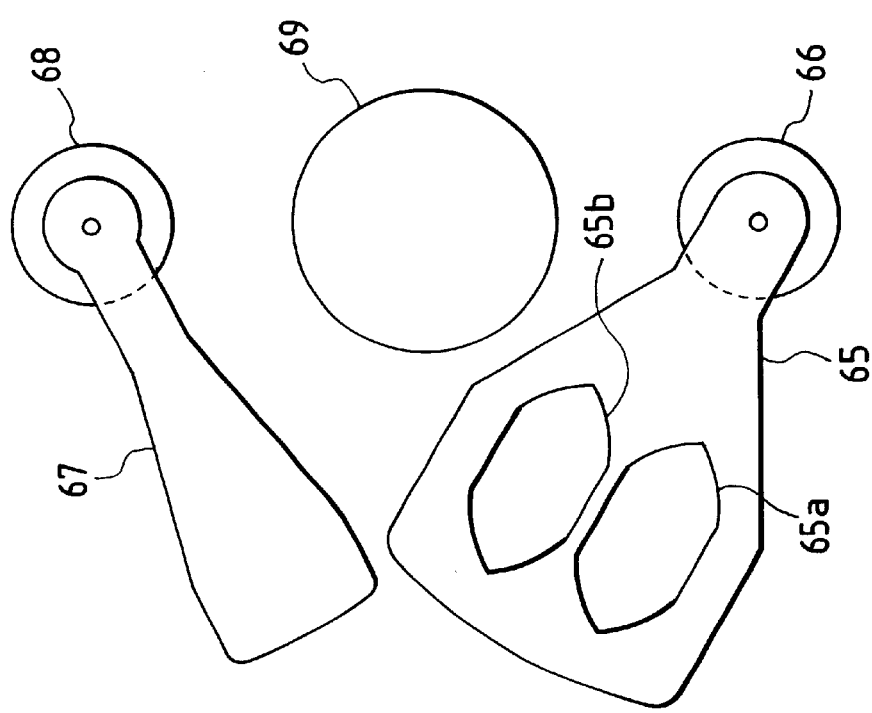

FIGS. 15A to 15C illustrate the function of the focus detecting diaphragm 65 and the focus detecting light shading board 67 shown in FIGS. 12 and 13. When the focus detecting operation is not conducted, the focus detecting diaphragm 65 and the light shading board 67 are retracted, as shown in FIG. 15A, from a pupil area 69 corresponding to the full-open photographing diaphragm (passing area of the effective light beam). When the focus detecting operation is conducted, the focus detecting diaphragm 65 is inserted, by the motor 66, into the optical path of the photographing lens as shown in FIGS. 15B and 15C, while the focus detecting light shading board 67 is moved by the motor 68 to cover either an aperture 65a or 65b of the diaphragm 65.

An image signal obtained by the light beam transmitted by the left pupil, in the state shown in FIG. 15B, is represented by L, while an image signal obtained by the light beam transmitted by the right pupil, in the state shown in FIG. 15C, is represented by R.

In the following there will be explained the driving method for the solid-state image pickup device or CCD, with reference to FIGS. 16, 17 and 18.

In the focus detecting device of the present embodiment, utilizing the pupil division on time-shared basis, the image signal L formed by the light beam transmitted by the left pupil is stored at first and then the image signal R formed by the light beam transmitted by the right pupil is stored, and the time interval of the storage of the image signals L and R is desirably as short as possible since a shorter interval reduces the error in the focus detection, resulting from the movement of the object image caused for example by hand vibration.

The read-out of the pixel data, if executed on the entire area of the CCD as in the photographing operation, will take a long time, thus prolonging the time interval between the storage of the image signals. For this reason, the storage of the image signal for focus detection is executed by the pixel read-out of a higher speed, as will be explained in the following.

Figure 16:
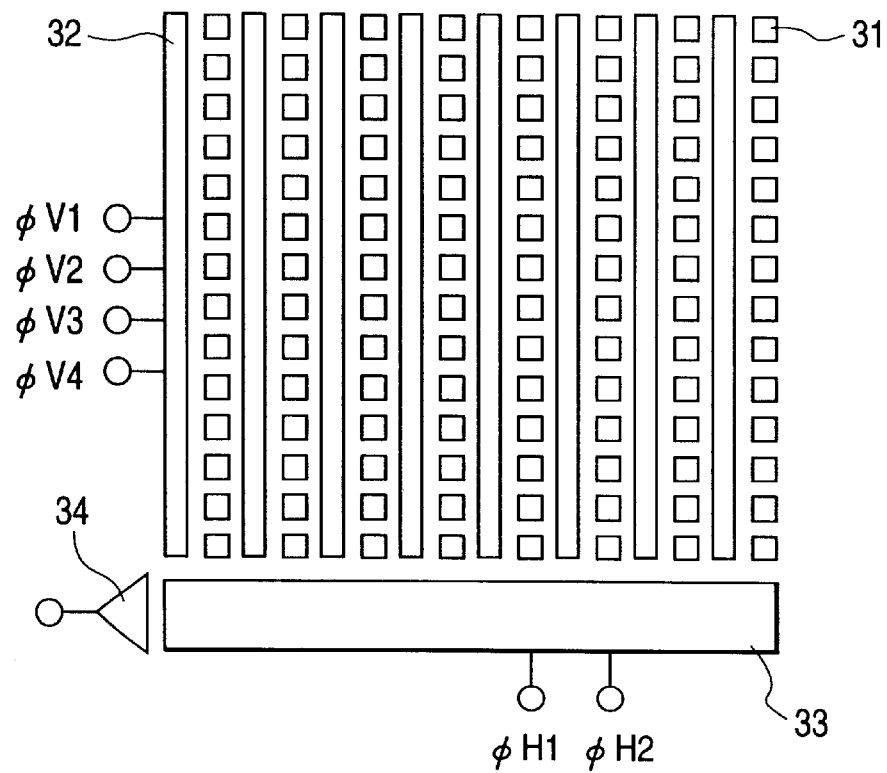
FIGS. 16, 17 and 18 are views for explaining the driving method for the CCD shown in FIG. 14.

FIG. 16 is a schematic view of an interline CCD, wherein shown are pixels 31, vertical charge transfer elements 32, a horizonal charge transfer element 33, and an output unit 34.

Signal charges, obtained by photoelectric conversion in the pixels, are transferred to the vertical charge transfer elements 32, and are transferred in succession toward the horizontal charge transfer element 33 according to 4-phase driving pulses φV1, φV2, φV3, φV4. The horizontal charge transfer element 33 transfers the signal charges of a horizontal row, transferred from the vertical signal transfer elements 32, in succession toward the output unit 34 according to 2-phase driving pulses φH1, φH2, and the signal charges are converted in the output unit 34 into voltages and outputted.

Figure 17:
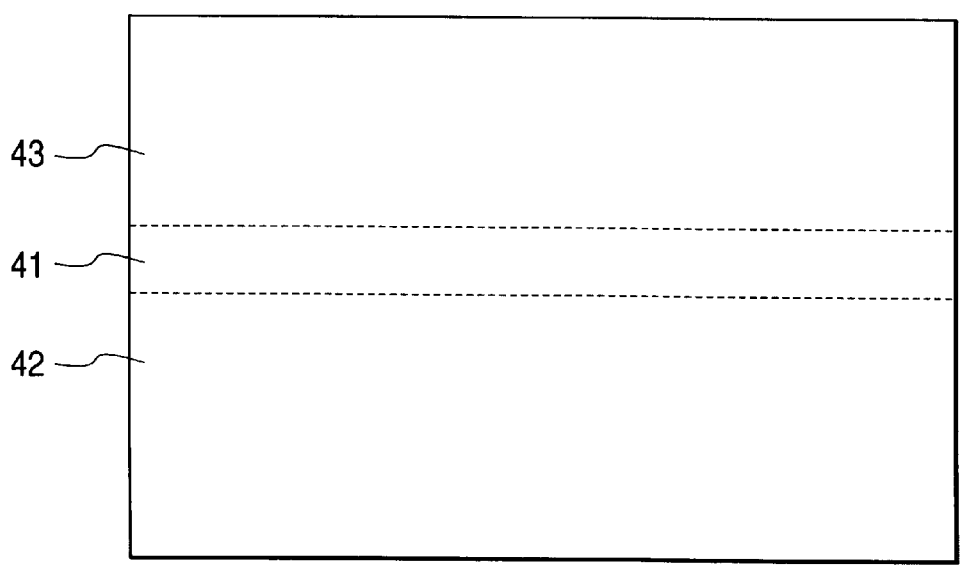

FIG. 17 is a schematic view of the image taking area of the CCD. In the present embodiment, for achieving a high-speed read-out operation, the signal charges are read at a normal speed only in an area 41 used for the focus detection, but are sweep transferred at a higher speed in other areas 42, 43.

Figure 18:
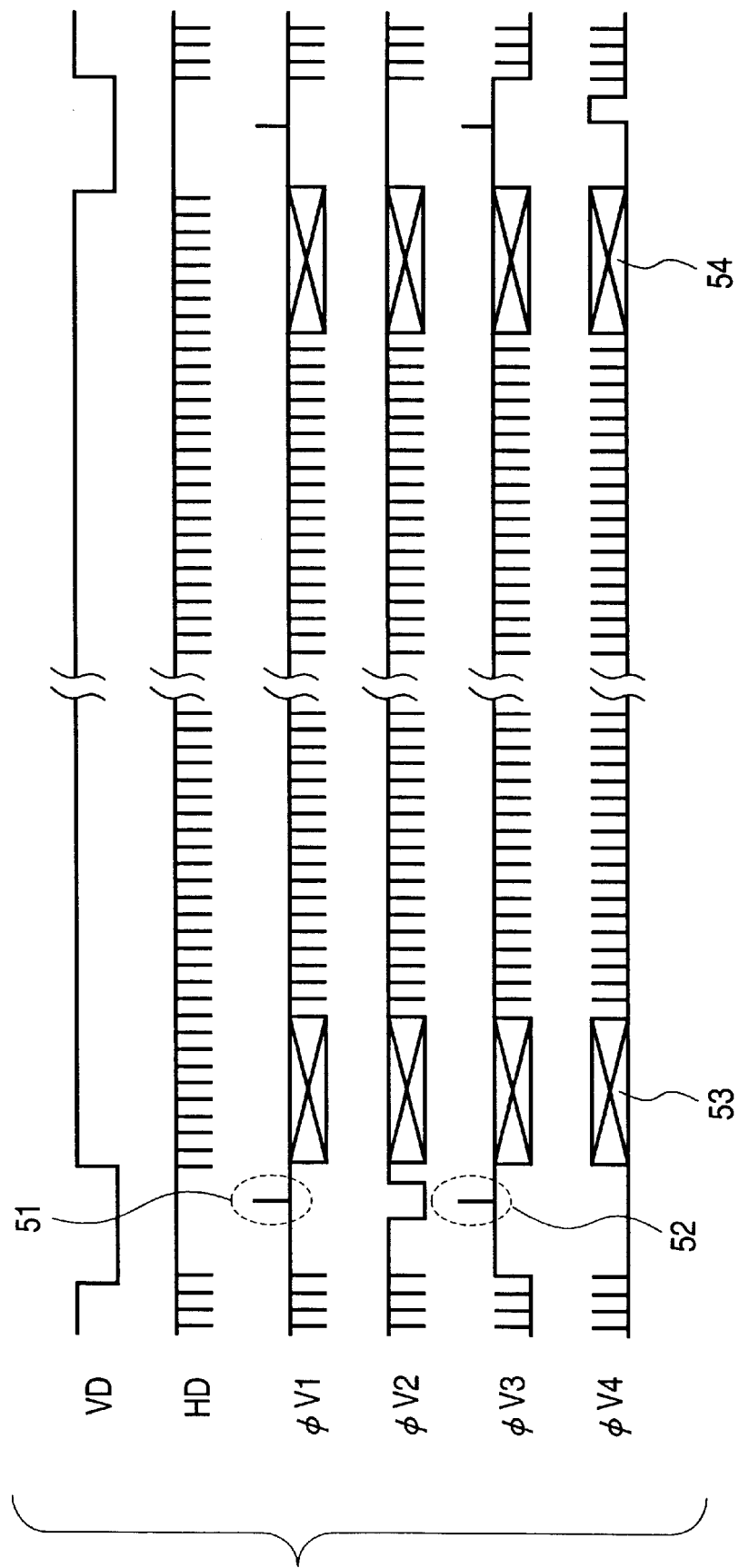

FIG. 18 is a timing chart of a vertical synchronization period, in case the vertical charge transfer elements 32 of the aforementioned CCD are 4-phase driven.

A vertical synchronization signal VD indicates the vertical blanking period by a low potential state, while a horizontal synchronization signal HD indicates the horizontal blanking period by a low potential state. There are also shown 4-phase drive pulses φV1, φV2, φV3 and φV4, for the vertical charge transfer elements 32, and read-out pulses 51, 52 for transferring the signal charges, obtained by the photoelectric conversion in the pixels 31, to the vertical charge transfer elements 32. Among the 4-phase drive pulses, those 53 and 54 are high-speed sweep drive pulses for high-speed transfer of the signal charges in the vertical charge transfer elements 32 in the areas 42, 43 in FIG. 17, and are generated at a higher rate than in the ordinary drive pulses.

By sweeping out the signal charges at a high speed in the areas not used for focus detection, it is rendered possible to reduce the time required for reading out the image signal, thereby preventing the deterioration of the precision of the focus detection and achieving the focus detecting operation at a higher speed.

In the following there will be explained a method for determining the phase difference by correlation calculation, with reference to FIGS. 19 and 20.

Figure 19:
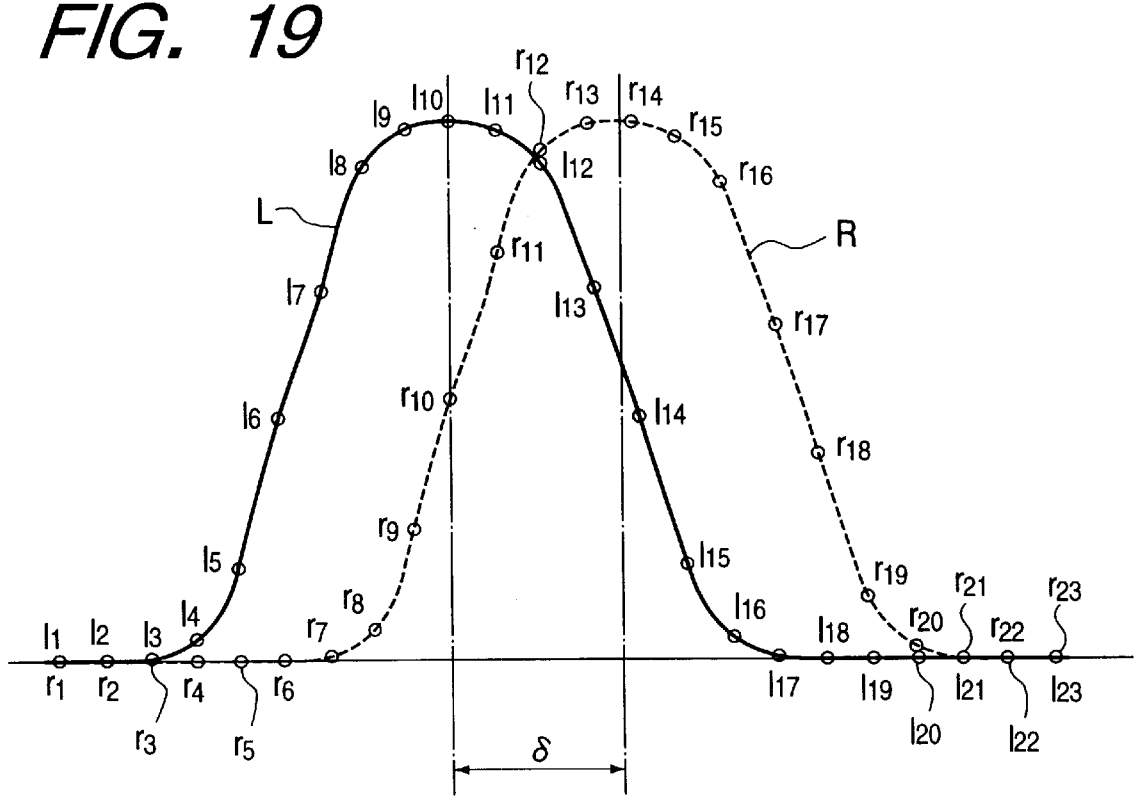
FIGS. 19 and 20 are charts for explaining a phase difference detecting operation by correlation calculation in the cameras of the second to fifth embodiments of the present invention.

FIG. 19 shows the image signal L formed by the light beam transmitted by the left pupil and the image signal R formed by the light beam transmitted by the right pupil, and the two image signals have a phase difference δ. The image signal L is composed of values $l_1$–$l_{23}$, respectively corresponding to the signal charges of the pixels, while the image signal R is similarly composed of values $r_1$–$r_{23}$. At first a correlation C(τ) is calculated from the image signals L and R, according to the following formula:

$$C(\tau) = \sum_{i=1}^{10} \max[l(i+6), r(i+\tau+6)] \quad (1)$$

wherein max[l(i+6), r(i+τ+6)] means to select the larger of l(i+6) and r(i+τ+6), and τ is varied from −6 to +6.

Figure 20:
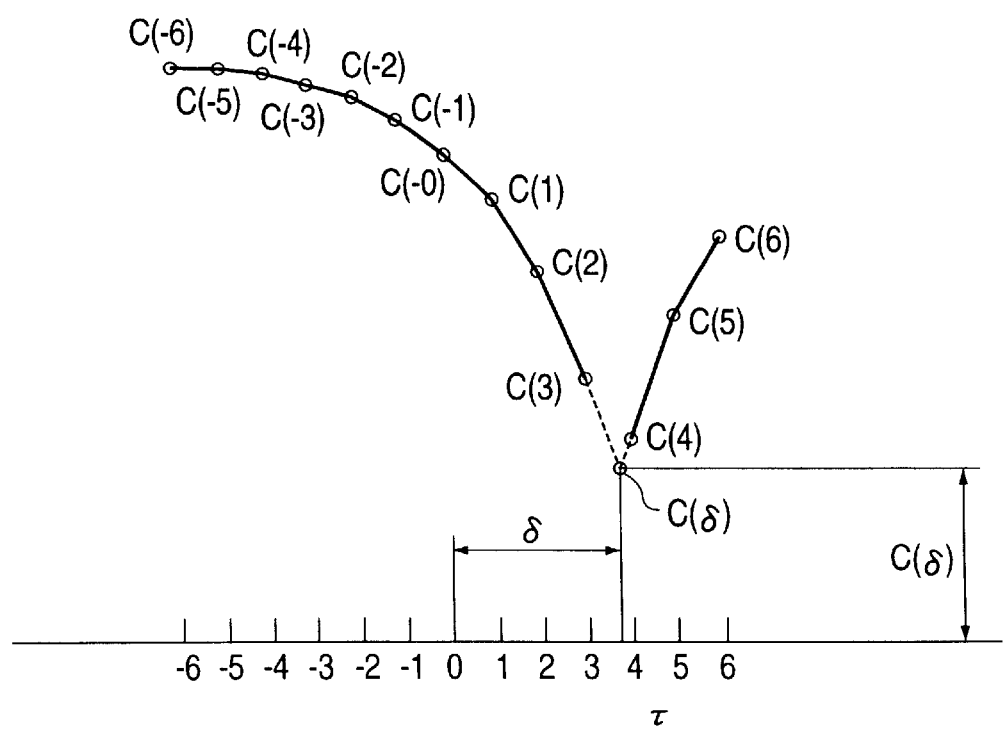

FIG. 20 shows the change of the correlation C(τ), which becomes smaller as the value τ approaches the phase difference δ. An interpolating calculation is made on the correlations C(3), C(4) and C(5) to calculate C(δ) corresponding to the minimum correlation between C(3) and C(4), and a value τ corresponding to C(δ) with the minimum correlation indicates the phase difference δ. In this manner the phase difference of the image signals L and R can be calculated. The maximum and minimum values of τ and the number of the pixel data are not limited to those in the foregoing embodiment.

In the following there will be explained a method for correcting the phase difference, in case the object image moved in the vertical direction on the CCD, by a hand vibration.

Figure 21A:
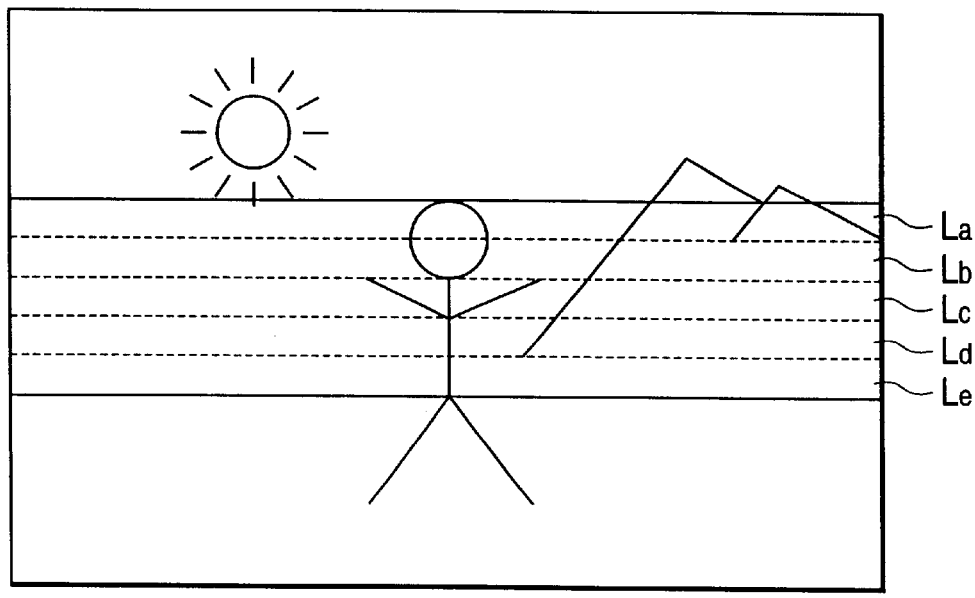
FIGS. 21A and 21B are views showing the situation in case the camera vibrates in the vertical direction at the photographing operation.
Figure 21B:
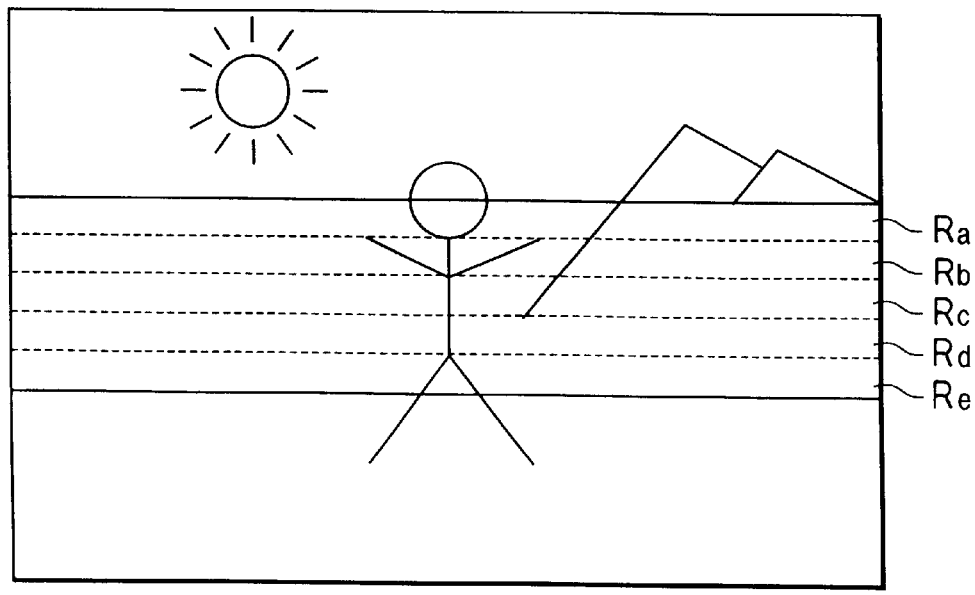

FIGS. 21A and 21B show a case where the camera is inclined downwards by the hand vibration, in a period from the storage of the object image L formed by the light beam transmitted by the left pupil (FIG. 21A) to that of the object image R formed by the light beam transmitted by the right pupil (FIG. 21B), wherein the object image moves upwards as illustrated. In such case, an image signal $R_c$, at a position same as that of the image signal $L_c$, looks at a lower position of the object than in the image signal $L_c$, thus assuming a different shape. The correlation calculation, based on the image signals of such different shapes, will lead to an erroneous phase difference.

Consequently correlation calculations are conducted between the image signal $L_c$ and the image signals $R_a$, $R_b$, $R_c$, $R_d$ and $R_e$ to obtain minimum correlation values $C_a(\delta)$, $C_b(\delta)$, $C_c(\delta)$, $C_d(\delta)$ and $C_e(\delta)$ and phase differences sat $\delta_a$, $\delta_b$, $\delta_c$, $\delta_d$ and $\delta_e$. Among these minimum correlation values $C_a(\delta)$–$C_e(\delta)$, the smallest one indicates highest correspondence of the two images. Thus the image signals providing the smallest one in the minimum correlations are considered to be obtained from a same portion of the object, and the phase difference in such state can be used to minimize the error resulting from the hand vibration in the vertical direction. Consequently the movement of the image signal to be employed in the correlation calculation, based on the above-explained analysis, constitutes the basic principle of the correcting method for reducing the error in the focus detection resulting from the hand vibration in the vertical direction.

Figure 22:
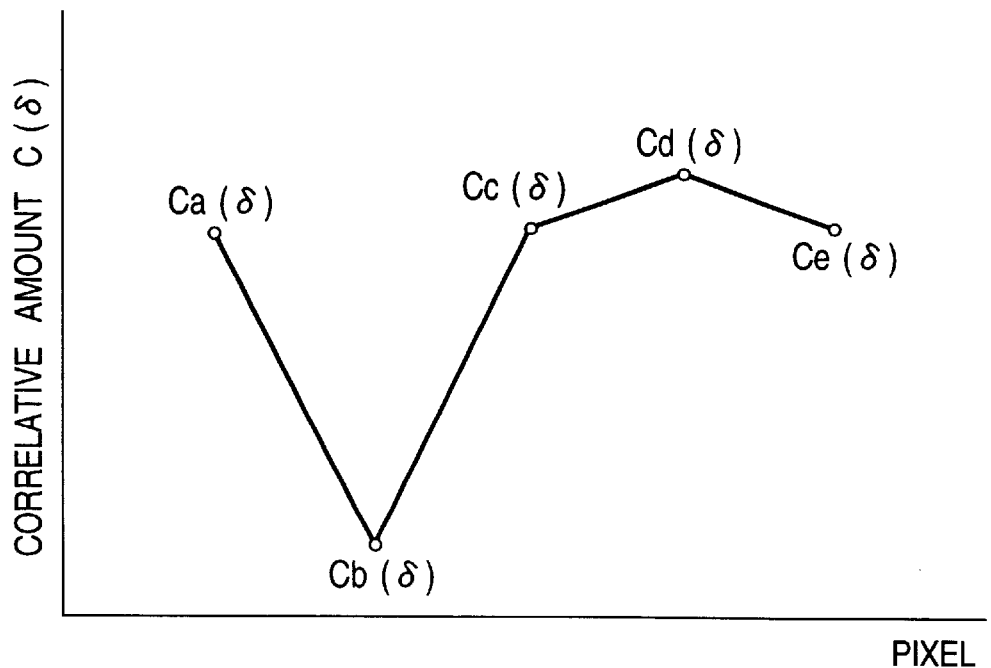
FIGS. 22 and 24 are charts showing the change in the correlation in the cameras of the second to fifth embodiments of the present invention.

FIG. 22 shows the plotting of the minimum values $C_a(\delta)$, $C_b(\delta)$, $C_c(\delta)$, $C_d(\delta)$ and $C_e(\delta)$ of the correlations between the image signal $L_c$ shown in FIG. 21A and the image signals $R_a$, $R_b$, $R_c$, $R_d$ and $R_e$ shown in FIG. 21B, wherein $C_b(\delta)$ is smallest because the image signal $R_b$ looks at a position the same as that of the image signal $L_c$. Consequently, the error caused by the hand vibration in the vertical direction can be significantly reduced by employing the phase difference $\delta_b$ between the image signals $L_c$ and $R_b$ for calculating the defocus amount.

In the foregoing embodiment, the correction is made in the pitch of a pixel line of the CCD, but the actual image movement by the hand vibration does not occur in such pitch. Thus, for the correction of a higher precision, image signals of a pitch for example of 0.5 lines may be generated by interpolation.

Figure 23:
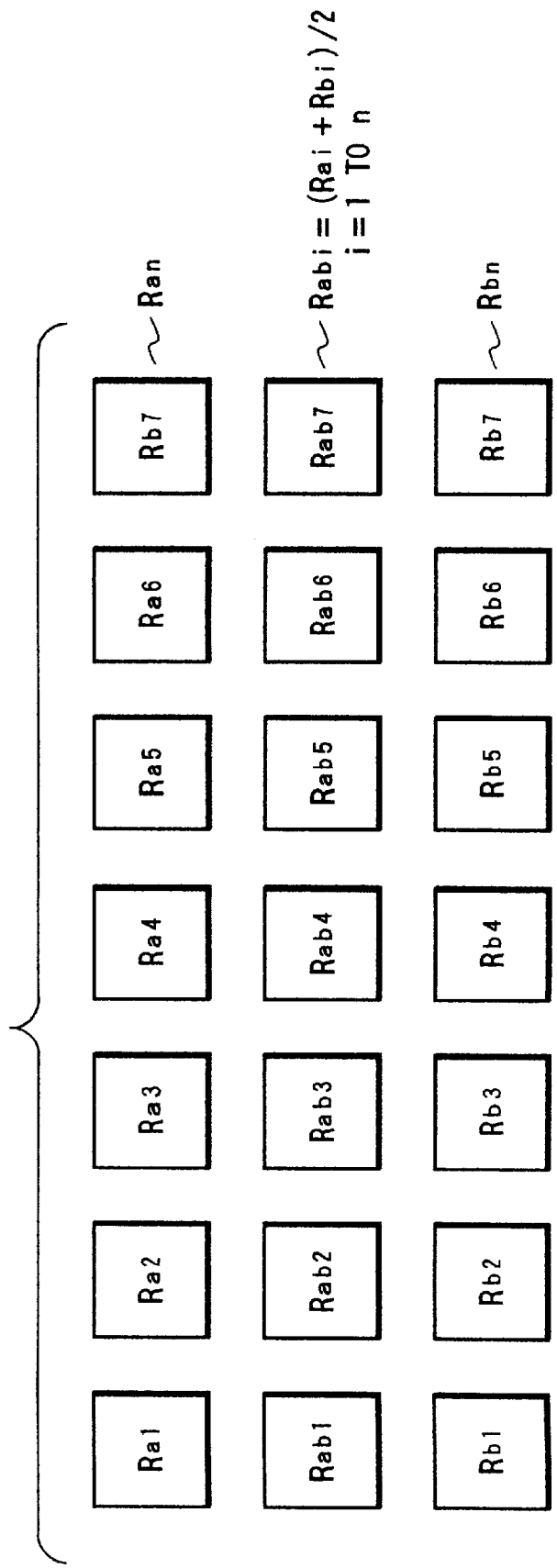
FIG. 23 is a chart showing the method of interpolation in the cameras of the second to fifth embodiments of the present invention.

FIG. 23 shows a method of generating an image signal $R_{ab}$ of a pitch of 0.5 lines from the image signals $R_a$ and $R_b$.

The pixel outputs $R_{a1}$–$R_{an}$ of the image signal $R_a$ and those $R_{b1}$–$R_{bn}$ of the image signal $R_b$ are respectively averaged as $R_{ab1}$–$R_{abn}$ as represented by:

$$R_{ab1}=(R_{a1}+R_{b1})/2$$

and $$R_{abi}=(R_{ai}+R_{bi})/2 \quad i=1 \text{ to } n$$

For a finer interpolation with a pitch smaller than 0.5 lines, the above-mentioned averaging can be replaced by a weighted averaging. In this manner it is rendered possible to achieve finer correction in the vertical direction, thereby improving the accuracy of focus detection.

However, in an object showing small change in shape in the vertical direction (object with a low spatial frequency), the minimum value $C(\delta)$ of the correlation does not vary much by the position of the image signal. Also the value of $C(\delta)$ varies to a certain extent by the noise component of the image signal. Consequently, in such case, the image signal at a position where the $C(\delta)$ becomes smallest may be of an erroneous position.

Figure 24:
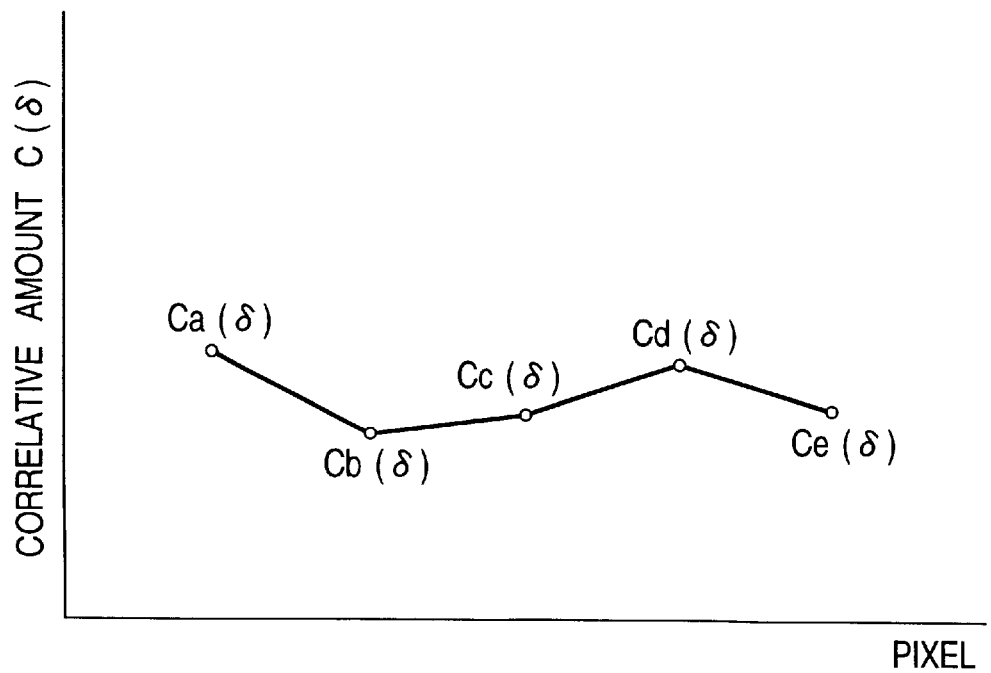

Such erroneous judgment may occur in case the difference between the correlation $C_c(\delta)$ at a position corresponding to the image signal $L_c$ and the smallest $C_b(\delta)$ is smaller than a predetermined value. In such case, as shown in FIG. 24, the image signal $R_c$ is adopted, and such method cannot improve the precision but can prevent further deterioration of the precision by the adverse effect of the erroneous judgment. This method is particularly effective in case the object has a pattern f diagonal lines, because, in such case, the value $C(\delta)$ remains the same irrespective of the position while the phase difference $\delta$ varies significantly depending on the position, whereby the possibility of erroneous judgment is rather high and such erroneous judgment leads to a significant deterioration in the precision of focus detection. Also in such object, the error in the phase difference caused by the vertical movement behaves similarly as that caused by the horizontal movement, and can be corrected similarly by the method for reducing the error in the horizontal direction, to be explained later.

The vertical moving amount of the image signals L and R, caused by the hand vibration, becomes larger with the focal length of the photographing lens and with the interval of the storages of the image signals L and R. Based on these facts, the size of the calculating area, employed for the correction in the vertical direction, can be selected according to the focal length information of the photographing lens and the interval of storage of the image signals, determined from the image accumulating time and the driving time of the focus detecting light shading board, in order to dispense with the calculation in an unnecessarily wide area, thereby reducing the calculation time. Also the amount of the image signal to be read can be reduced, thereby decreasing the required memory capacity and reducing the time required for signal read-out.

Figure 25:
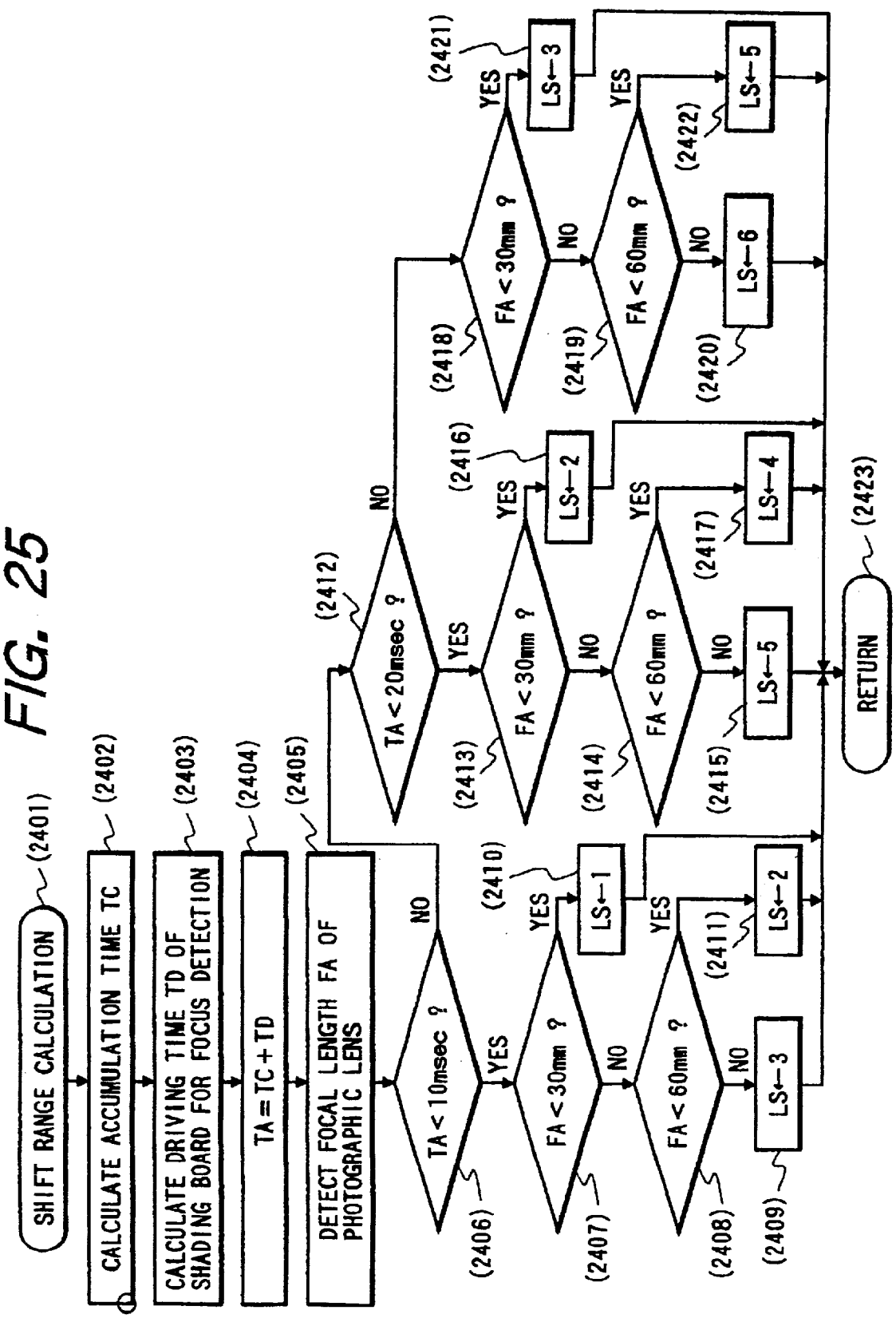
FIG. 25 is a flow chart showing the process for calculating the shift range in the cameras of the second to fifth embodiments of the present invention.

FIG. 25 is a flow chart of a "shift range calculation" subroutine for setting the calculation area, which is activated at a step 2402 through a step 2401.

At first a step 2402 calculates the image accumulation time TC from the luminance information of the object, then a step 2403 calculates the driving time TD of the focus detecting light shading board 67, and a next step 2404 calculates the interval TA of storage of the image signals as the sum of the above-mentioned accumulation time TC and the drive time TD. A step 2405 detects the focal length FA of the photographing zoom lens by reading a zoom encoder thereof.

A step 2406 discriminates whether the storage interval TA of the image signals is smaller than 10 msec, and, if smaller, the sequence proceeds to a step 2407, but, if not, the sequence proceeds to a step 2412. The step 2407 discriminates whether the focal length FA is smaller than 30 mm, and, if smaller, the sequence proceeds t o a step 2410, but, if not, the sequence proceeds to a step 2408. The step 2410 enters 1 as LS in order to set the calculation area so as to include an upper line and a lower line. Then a step 2808 discriminates whether FA is smaller than 60 mm, and, if smaller, the sequence proceeds to a step 2411, but, if not the sequence proceeds to a step 2409. The step 2411 enters 2 as LS in order to set the calculation area so as to include two upper lines and two lower lines, and the step 2409 enters 3 as LS.

Therefore, if TA is 10 msec and FA<30 mm, there is selected LS=1. If 30 mm≦FA<60 mm, there is selected LS=2, and, if FA≧60 mm, there is selected LS=3. Similarly, in steps 2412 to 2417, if 10 msec≦TA≦20 msec and FA<30 mm, there is selected LS=2. If 30 mm≦FA<60 mm, there is selected LS=4, and, if FA≧60 mm, there is selected LS=5. Similarly, in steps 2418 to 2422, if TA≧20 msec and FA<30 mm, there is selected LS=3. If 30 mm≦FA<60 mm, there is selected LS=5, and, if FA≧60 mm, there is selected LS=6.

The variation of the calculation area LS according to the focal length of the photographing lens and the storage interval of the image signals allows to dispense with the unnecessary calculation and the unnecessary image signal read-out. The calculation area LS is naturally made smaller (with fewer number of lines) in case of a shorter focal length of the photographing lens or a shorter storage interval of the image signals, which reduce the influence of the hand vibration.

Figure 26:
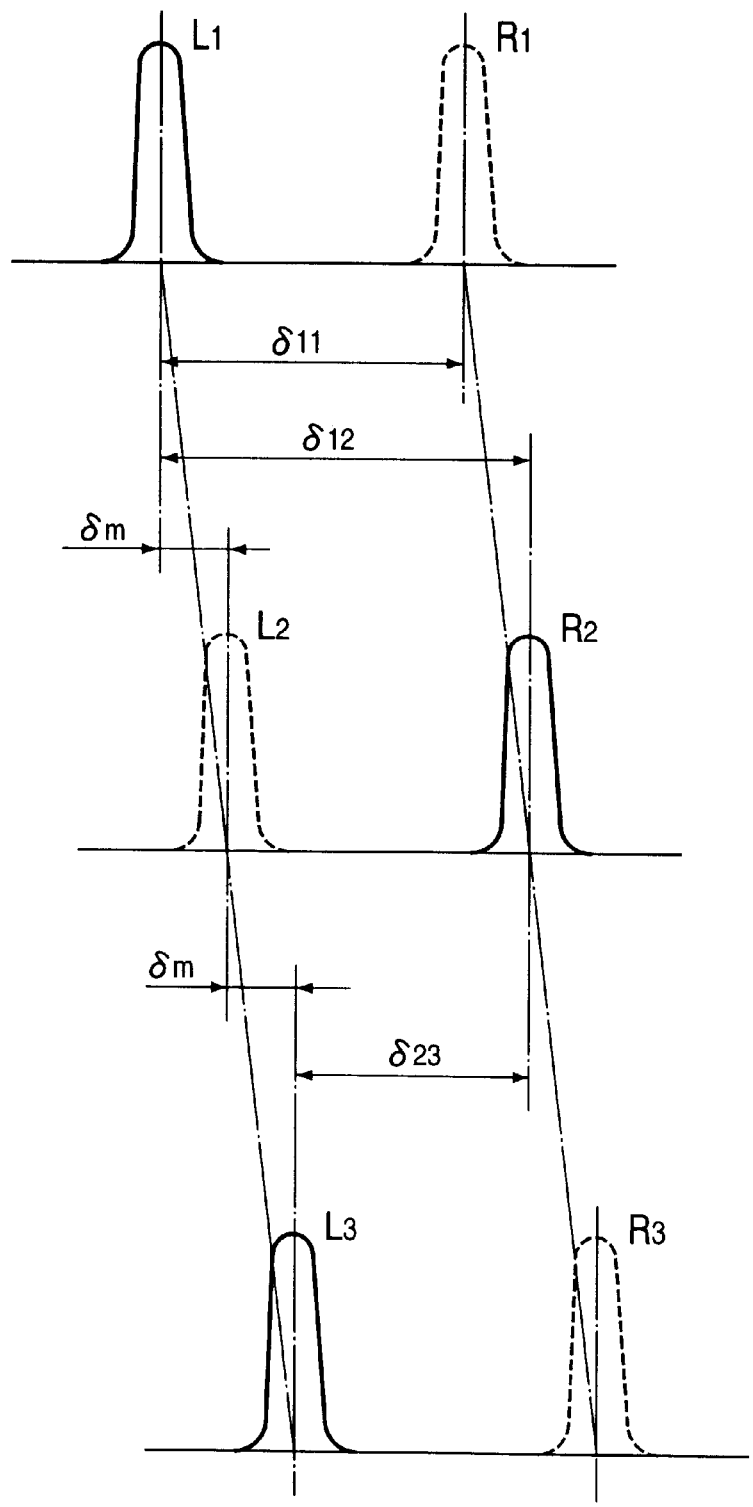
FIGS. 26 and 27 are charts showing the method for detecting the hand vibration in the camera of the second embodiment of the present invention.

FIG. 26 is a chart showing the principle of eliminating the detection error, caused by the hand vibration, in an assumed case in which the object image moves from left to right at a constant speed because of the hand vibration. It is assumed that the image signals are stored at a constant interval. $L_1$, $R_2$ and $L_3$ indicate the actually stored image signals, and $R_1$, $L_2$ and $R_3$ indicate the other image signals if they are stored at the same timings.

As the object image moves by a distance $\delta_m$ in the period from the storage of the image signal $L_1$ to that of the image signal $R_2$, the phase difference $\delta_{12}$ between the image signals $L_1$ and $R_2$ becomes larger than the true phase difference $\delta_{11}$ by $\delta_m$, so that:

$$\delta_{12}=\delta_{11}+\delta_m \qquad (2)$$

Also the object image similarly moves by a distance $\delta_m$ in the period from the storage of the image signal $R_2$ to that of the image signal $L_3$, so that the phase difference $\delta_{23}$ between the image signals $R_2$ and $L_3$ becomes smaller than the true phase difference $\delta_{11}$ by $\delta_m$, so that:

$$\delta_{23} = \delta_{11} - \delta_m \quad (3)$$

The true phase difference $\delta_{11}$, can be determined from $\delta_{12}$ and $\delta_{23}$ according to the following equation:

$$\delta = (\delta_{12} + \delta_{23})/2 = (\delta_{11} + \delta_m + \delta_{11} - \delta_m)/2 = \delta_{11} \quad (4)$$

The calculation of the phase difference $\delta$ in this manner allows to eliminate the error in focus detection, resulting from the object movement of a constant speed, caused by the hand vibration. Since the aforementioned condition stands in case the interval of image signal storages is sufficiently short, this method is very effective when the driving speed of the focus detecting light shading board 67 is fast and the image accumulation time is short.

In the foregoing description it is assumed that the time required for driving the focus detecting light shading board 67 from the right pupil to the left pupil of the focus detecting diaphragm 65 is equal to that from the left pupil to the right pupil and that the image accumulation time of the CCD remains the same for all three image signals, so that the storage of the image signals is realized with a same interval, but there may be a fluctuation in the driving time of the focus detecting light shading board 67 or in the image accumulation time. In the following there will be explained, therefore, a calculation method in case the interval of the storage of the image signals is varied.

Figure 27:
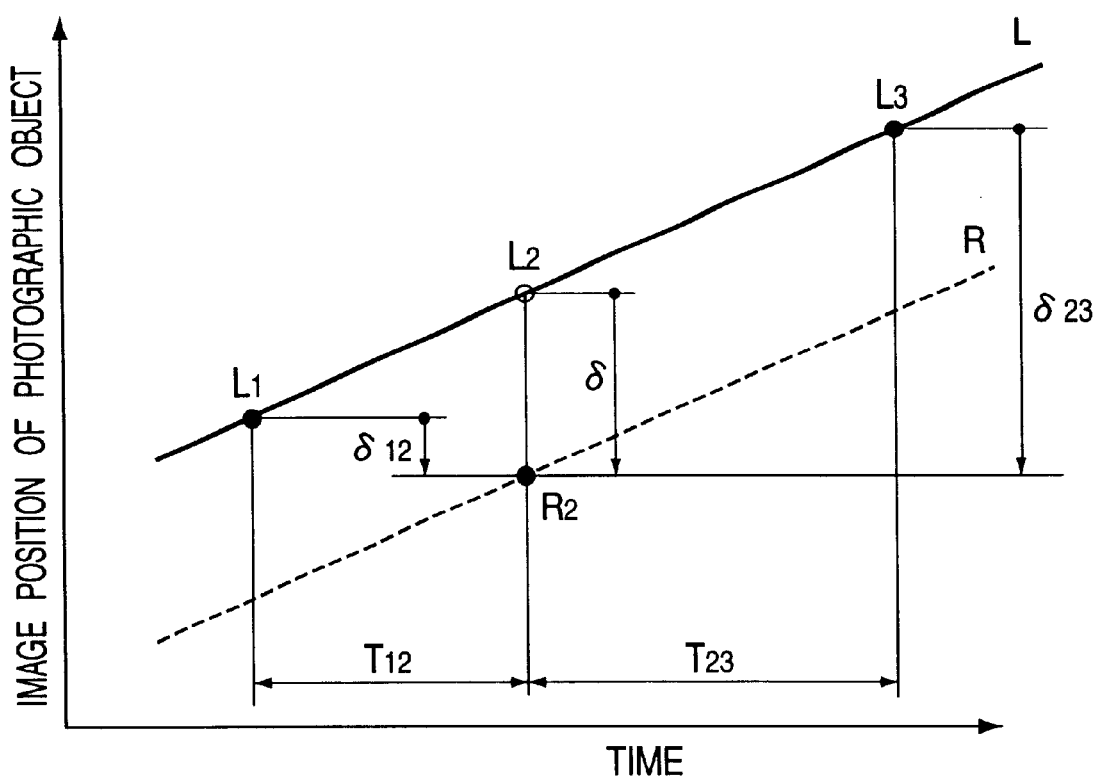

FIG. 27 shows the relationship between the image signal storage time and the position of the object image, wherein $T_{12}$ is the interval of the storage of the image signals $L_1$ and $R_2$, $T_{23}$ is the interval of the storage of the image signals $R_2$ and $L_3$, and $\delta_{12}$ and $\delta_{23}$ are respective the phase differences between $L_1$ and $R_2$ and between $R_2$ and $L_3$.

The inclination of a solid line, representing the image signals L is indicated by:

$$(\delta_{23} - \delta_{12})/(T_{12} + T_{23})$$

and the phase difference between $L_1$ and $L_2$ is represented by:

$$T_{12}(\delta_{23} - \delta_{12})/(T_{12} + T_{23})$$

Also the phase difference $\delta$ between $L_2$ and $R_2$ is represented by:

$$\delta = \frac{T_{12}(\delta_{23} - \delta_{12})}{T_{12} + T_{23}} + \delta_{12} = \frac{T_{12} \cdot \delta_{23} + T_{23} \cdot \delta_{12}}{T_{12} + T_{23}} \quad (5)$$

corresponding to a weighted average by the intervals $T_{12}$ and $T_{23}$.

In the following there will be explained the function of the auto focusing device of the camera of the above-explained configuration, with reference to the appended flow charts.

Figure 28:
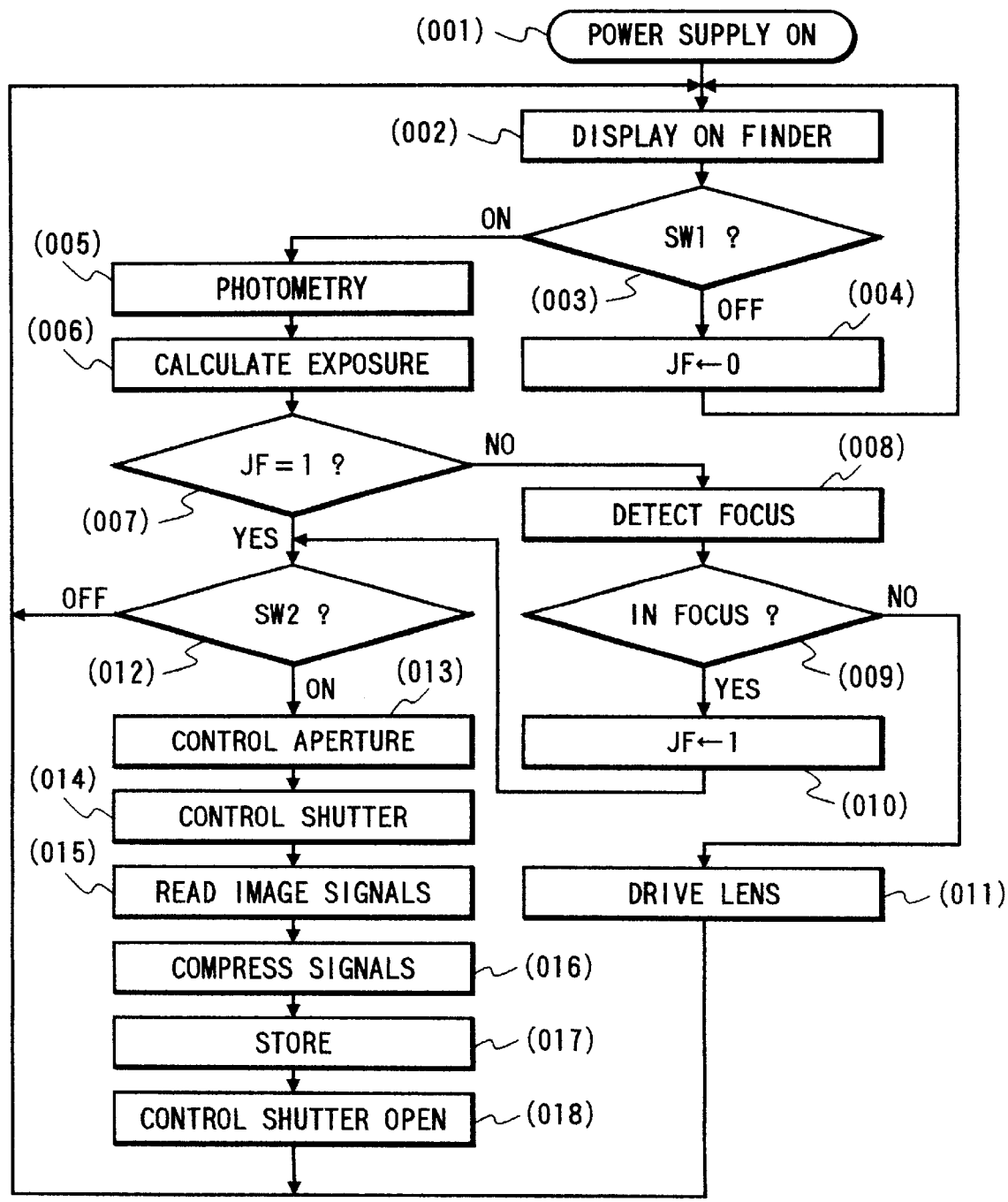
FIG. 28 is a flow chart showing the control sequence in the camera of the second embodiment of the present invention.

FIG. 28 is a flow chart showing the main control sequence of the entire camera. When a power switch is turned on to activate the various circuits, the sequence proceeds from a step 001 to a step 002 to execute display on the view finder. More specifically, the image signal is stored by the CCD and displayed on the electronic view finder (EVF) after various signal processings. A next step 003 detects the state of a switch SW1 which is to be turned on by the depression by a first stroke of a shutter release button, and, if it is off, the sequence proceeds to a step 004 to initialize a flag JF for detecting the state of the focusing. If the switch SW1 is on, the sequence proceeds to a step 005.

A step 005 calculates the luminance of the object, based on the output of the image signal stored by the CCD, the gain of the signal processing circuit, the image accumulation time of the CCD and the F-number of the photographing lens. A next step 006 calculates appropriate shutter speed (exposure time) and aperture stop (F-value), based on the calculated object luminance, the photographing mode of the camera and the exposure correcting information, and stores these calculated values in a predetermined memory area. At the shutter releasing operation to be explained later, the shutter and the diaphragm are controlled according to the data stored in the memory area.

A next step 007 discriminates the state of the flag JF for detecting the state of focusing. If JF=1, indicating that the focusing is already completed and the photographing lens is in the in-focus state, the sequence proceeds to a step 012, but, if JF=0, indicating that the in-focus state is not yet reached, the sequence proceeds to a step 008 for effecting the focusing operation.

A step 008 is a "focus detection" subroutine for detecting the defocus amount of the photographing lens, which will be explained later in detail. A next step 009 compares the defocus amount detected in the step 008 with a permissible defocus amount determined from the diameter of a permissible fluctuation circle and the F-number of the photographing lens, and, if the former is smaller, indicating an in-focus state, the sequence proceeds to a step 010 to enter 1 in the flag JF thereby memorizing the in-focus state, and then the sequence proceeds to a step 012.

On the other hand, if the step 009 identifies that the in-focus state has not been reached, a step 011 executes the focusing operation by driving the focusing lens group of the photographing lens so as to cancel the defocus amount detected in the foregoing step 008, and then the sequence returns to the step 002.

In this manner the focusing operation is repeated until the in-focus state is reached or the switch SW1 is turned off.

When the in-focus state is reached, a step 012 discriminates the state of a switch SW2 which is to be turned on by the depression of the shutter release button by a second stroke, and, if it is off, the sequence returns to the step 002, but, if it is on, the sequence proceeds to a step 013 for effecting the shutter releasing operation.

A step 013 controls the lens diaphragm to a diaphragm value calculated in the step 006, and a next step 014 closes the shutter, resets the charges in the CCD and controls the shutter with the shutter time calculated in the step 006, thereby executing the exposure operation of the CCD. A next step 015 drives the CCD to release the image signal and applies a predetermined signal processing thereon. A next step 016 executes a compression process, and the compressed image signal is stored in the memory medium in a step 017.

A step 018 opens the shutter to restore the initial state, and then the sequence returns to the step 002.

In the following there will be given an explanation on the "focus detection" subroutine, with reference to a flow chart shown in FIG. 29.

When the focus detection subroutine is called in the step 008 in FIG. 28, the sequence proceeds, through a step 101, to a step 102.

A step 102 moves the focus detecting diaphragm 65, which has been in a state shown in FIG. 15A, into the optical path of the photographing lens, and a next step 103 moves the focus detecting light shading board 67, which has been in a state shown in FIG. 15A, into the optical path of the photographing lens. After the steps 102 and 103, the focus detecting diaphragm 65 and the focus detecting light shading board 67 are shifted to a state shown in FIG. 15B, whereby the light beam transmitted by the left aperture 65a of the diaphragm 65 alone is focused on the CCD.

A step 104 executes the image accumulation in the CCD, and a next step 105 reads the image signal $L_1$ accumulated in the step 104 and stores it in a predetermined memory area. Different from the ordinary read-out operation, the read-out operation of the image signal $L_1$ is executed only in an area necessary for the focus detection and the image signal in the unnecessary areas is discarded at a high speed as explained in the foregoing, whereby the reduction in the image signal read-out time can be realized.

A next step 106 moves again the focus detecting light shading board 67 to a state shown in FIG. 15C, whereby the light beam transmitted by the right aperture 65b of the diaphragm 65 alone is focused on the CCD. A next step 107 executes the image accumulation as in the foregoing step 104, and a step 108 reads and stores the image signal $R_2$ in a predetermined memory area, as in the foregoing step 105.

A next step 109 moves again the focus detecting light shading board 67 to a state shown in FIG. 15B, whereby the light beam transmitted by the left aperture 65a of the diaphragm 65 alone is focused on the CCD. Then a next step 110 executes the image accumulation, and a step 111 reads and stores the image signal $L_3$ in a predetermined memory area.

A step 112 retracts the focus detecting diaphragm 65, and a step 113 retracts the focus detecting light shading board 67. After the steps 112 and 113, there is restored the initial state shown in FIG. 15A.

A step 114 is a "defocus amount calculation" subroutine, which calculates the defocus amount of the photographing lens, based on the image signals $L_1$, $R_2$ and $L_3$, as will be explained later in more details. After the step 114, the "focus detection" subroutine is terminated in a step 115.

The image accumulating operations in the aforementioned steps 104, 107 and 110 may be executed with a same accumulation time and a same gain to equalize the output levels of the image signals, thereby increasing the correlation in the correlation calculation and obtaining a high and stable accuracy of detection.

Figure 30:
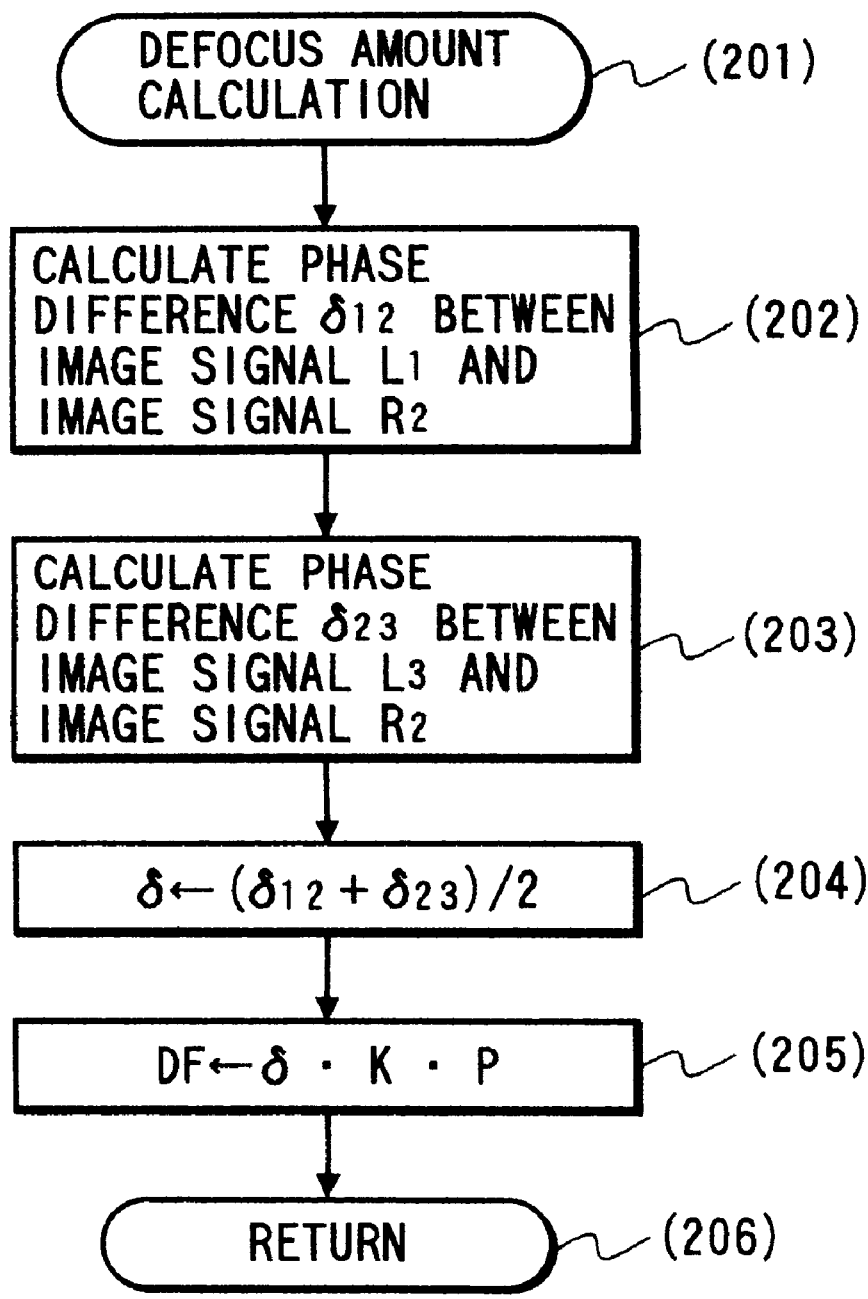
FIG. 30 is a flow chart showing an example of the defocus amount calculating operation in the camera of the second embodiment of the present invention.

In the following there will be explained the details of the "defocus amount calculation" subroutine, with reference to a flow chart shown in FIG. 30.

Figure 29:
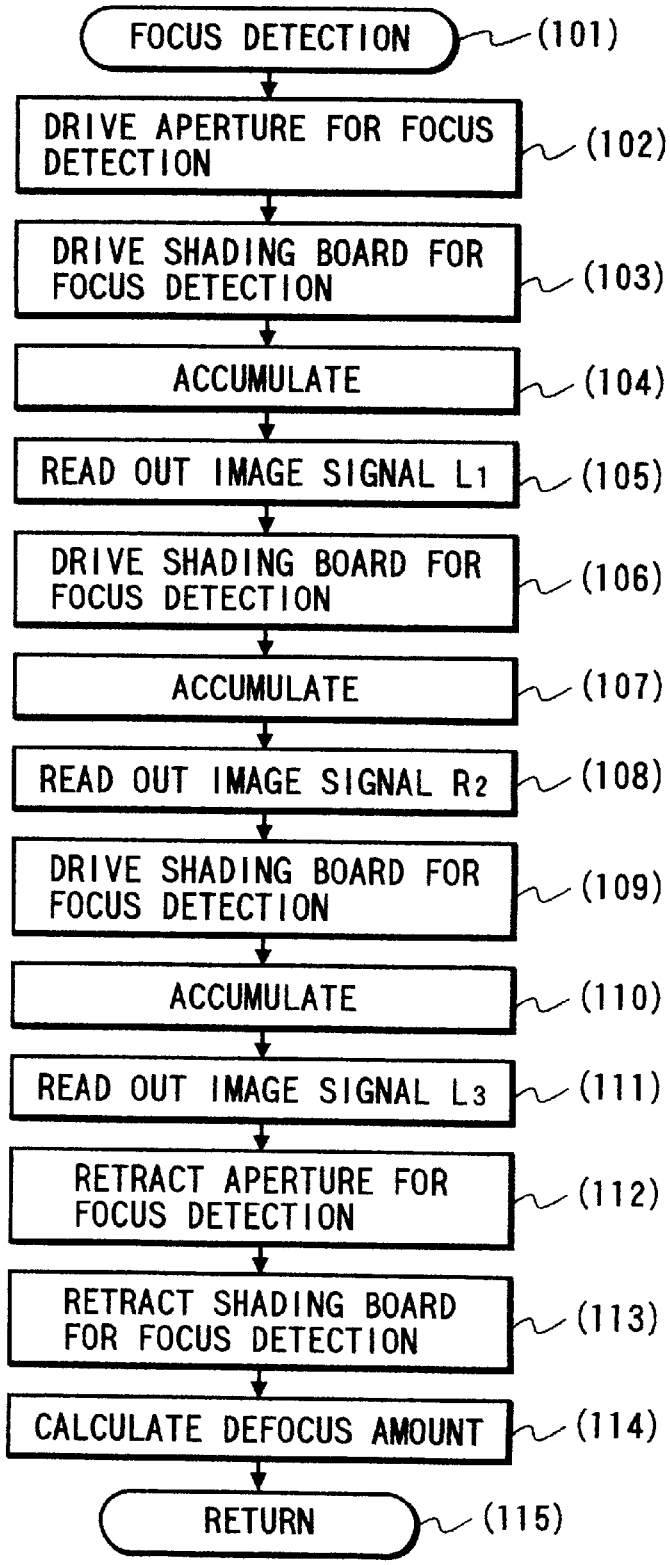
FIG. 29 is a flow chart showing an example of the focus detecting operation in the camera of the second embodiment of the present invention.

When the "defocus amount calculation" subroutine is called in the step 114 in FIG. 29, the sequence proceeds, through a step 201, to a step 202.

A step 202 calculates the phase difference $\delta_{12}$ of the image signals $L_1$ and $R_2$, then a step 203 similarly calculates the phase difference $\delta_{23}$ of the image signals $R_2$ and $L_3$. and a step 204 calculates the final phase difference $\delta$ not containing the detection error resulting from the constant-speed hand vibration component, according to the following calculation:

$$\delta = (\delta_{12} + \delta_{23})/2 \quad (6)$$

A next step 205 calculates the defocus amount DF of the photographing lens, based on the phase difference $\delta$ determined in the foregoing step 204, the sensitivity K of the focus detection system, determined by the focus detecting diaphragm and the Photographing optical system, and the pixel pitch P of the CCD, according to the following formula:

$$DF = \delta \cdot K \cdot P \quad (7)$$

After the step 205, the present subroutine is terminated by a step 206.

In the following there will be explained another case in which the interval of the image signal storage varies because of the variation of the driving time of the focus detecting light shading board 67. The following explanation will be concentrated on the differences in the focus detecting method, as the configuration of the camera and the control sequence therefor are the same as those explained in the foregoing.

Figure 31:
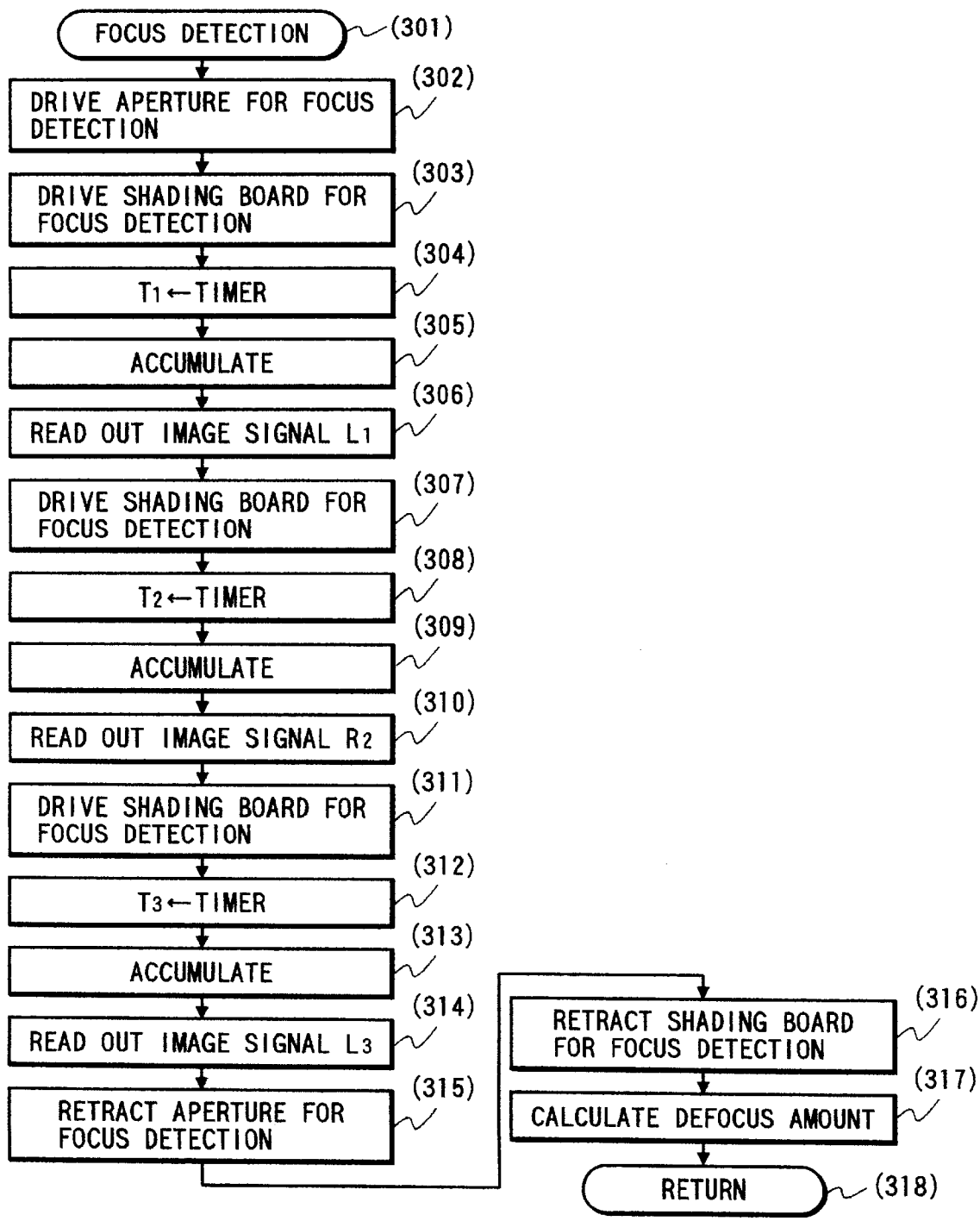
FIG. 31 is a flow chart showing another example of the focus detecting operation in the camera of the second embodiment of the present invention.

FIG. 31 shows a flow chart of the "focus detection" subroutine. When it is called in the step 008 in FIG. 28, the sequence proceeds to a step 302 through a step 301.

Steps 302 and 303 drive the focus detecting diaphragm 65 and the focus detecting light shading board 67 to a state shown in FIG. 15B as in the steps 102 and 103 in FIG. 28, thereby preparing for the focus detecting operation.

A next step 304 memorizes the starting time of the image accumulating operation for the image signal $L_1$, by storing the count TIMER of a self-running timer of the system control unit in a RAM memory area $T_1$. A next step 305 executes the accumulation of the image signal $L_1$, and a step 306 executes the read-out thereof.

Then a step 307 moves the light shading board 67 to a state shown in FIG. 15C, and a next step 308 memorizes the starting time of the accumulation of the image signal $R_2$, by storing the timer count TIMER in a memory area $T_2$. Then steps 309, 310 execute the accumulation and the read-out of the image signal $R_2$.

Then a step 311 moves the light shading board 67 to a state in FIG. 15B, and a next step 312 memorizes the starting time of the accumulation of the image signal $L_3$, by storing the timer count TIMER in a memory area $T_3$. Then steps 313, 314 execute the accumulation and the read-out of the image signal $L_3$.

Steps 315 and 316 retract the focus detecting diaphragm 65 and the focus detecting light shading board 67 to a state shown in FIG. 15A, and a step 317 calculates the defocus amount. Then a step 318 terminates the present subroutine.

Figure 32:
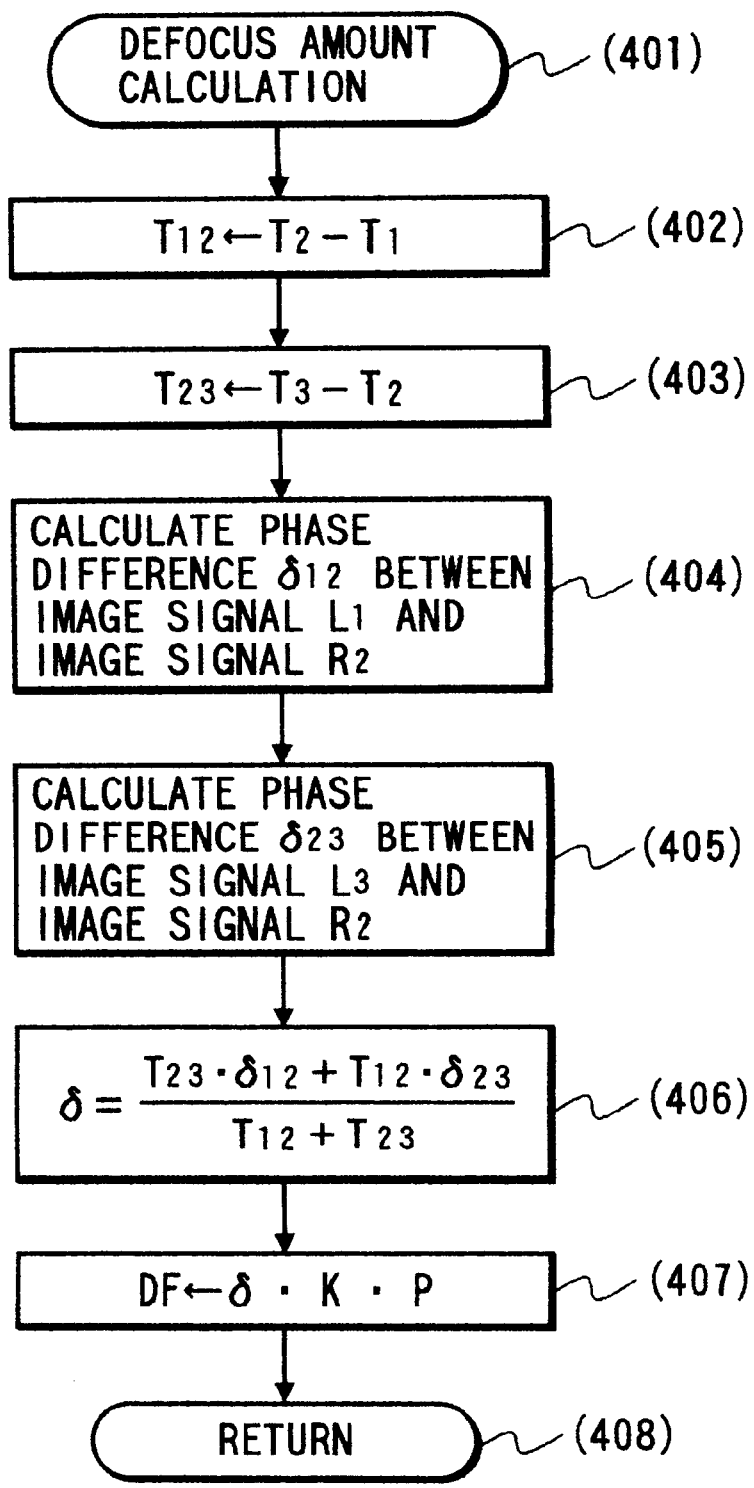
FIG. 32 is a flow chart showing another example of the defocus amount calculating operation in the camera of the second embodiment of the present invention.

Now the calculation method for the defocus amount will be explained with reference to FIG. 32, which shows a "defocus amount calculation" subroutine to be used in case the interval of the image signal storage varies. When this subroutine is called in the step 317 in FIG. 31, the sequence proceeds to a step 402 through a step 401.

A step 402 calculates the interval $T_{12}$ of the starts of accumulations of the image signals $L_1$ and $R_2$, and a step 403 similarly calculates the interval $T_{23}$ of the starts of accumulations of the image signals $R_2$ and $L_3$. Then a step 404 calculates the phase difference $\delta_{12}$ of the image signals $L_1$ and $R_2$ by correlation calculation, and a step 405 similarly calculates the phase difference $\delta_{23}$ of the image signals $R_2$ and $L_3$.

A step 406 calculates the final phase difference $\delta$ by eliminating the detection error resulting from the constant-speed movement of the optical image based on the phase differences $\delta_{12}$, $\delta_{23}$ and the intervals $T_{12}$, $T_{23}$, according to the following formula:

$$\delta = \frac{T_{23} \cdot \delta_{12} + T_{12} \cdot \delta_{23}}{T_{12} + T_{23}} \quad (8)$$

A next step 407 calculates the defocus amount DF of the photographing lens, based on the phase difference $\delta$ determined in the foregoing step 406, the sensitivity K of the focus detection system, and the pixel pitch P of the CCD. After this step, the present subroutine is terminated by a step 408.

In case the interval of the starts of the charge accumulating operations varies, a memory is required for measuring the interval and a complex calculation, as explained above. Consequently it is desirable to maintain a constant interval, whereby the calculation process can be simplified and executed within a shorter time, with a reduced memory capacity.

More specifically, if the driving time for the focus detecting light shading board 67 fluctuates to a certain extent but if the upper limit for such driving time is known, the start of the charge accumulating operation can wait until the lapse of such upper limit time even after the driving of the light shading board is completed, as long as the driving time is sufficiently short. It is therefore possible to maintain a constant interval of the starts of the accumulating operations, in such case, by employing a same accumulating time, thereby easily simplifying the calculation process. Also, the presence of a timer for stabilizing the interval of the starts of the charge accumulating operations provides an advantage of dispensing with the means for detecting the completion of driving of the focus detecting light shading board 67.

[Third Embodiment]

In a third embodiment of the present invention, four image signals are stored time-sequentially, in order to eliminate the-detection error, caused by a constant-acceleration movement of the optical image resulting from the hand vibration or from the movement of the object.

Figure 33:
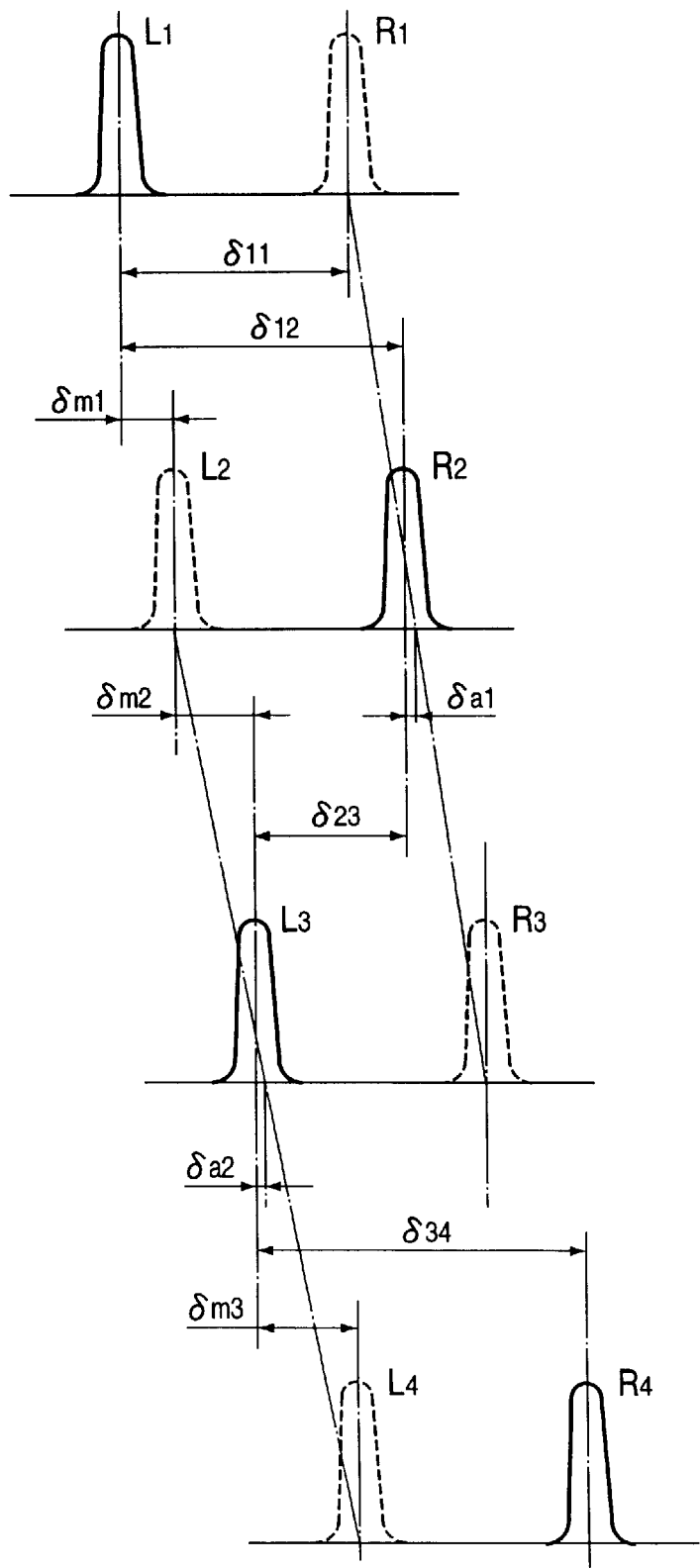
FIG. 33 is a chart showing the method for detecting the hand vibration in a camera of the third embodiment of the present invention.

FIG. 33 shows the principle of elimination, in the present embodiment, of the detection error resulting from the hand vibration, wherein the object image is assumed to move from left to right at a constant acceleration caused by the hand vibration, and it is also assumed that the image signals are stored at a constant interval.

$L_1$, $R_2$, $L_3$ and $R_4$ indicate the actually stored image signals, and $R_1$, $L_2$, $R_3$ and $L_4$ indicate the other image signals if they are stored at the same timings.

The object image moves by a distance $\delta_{m1}$ in the period from the storage of the image signal $L_1$ to that of the image signal $R_2$, and the object image moves by a distance $\delta_{m2}$ in the period from the storage of the image signal $R_2$ to that of the image signal $L_3$, with a relationship $\delta_{m1} < \delta_{m2}$. Therefore, as in the foregoing second embodiment, the phase difference $\delta_1$ determined from the image signals $L_1$, $R_2$ and $L_3$ becomes smaller than the true phase difference $\delta_{11}$ by $\delta_{d1}$, as indicated by:

$$\delta_1 = (\delta_{12} + \delta_{23})/2 = \delta_{11} - \delta_{d1} \tag{9}$$

This error $\delta_{d1}$ results from the variation in the speed, induced by the acceleration.

Also the phase difference $\delta_2$ determined from the image signals $R_2$, $L_3$ and $R_4$ as in the foregoing second embodiment, wherein $\delta_{m2} < \delta_{m3}$, becomes larger than the true phase difference $\delta_{11}$ by $\delta_{d2}$ as indicated by:

$$\delta_2 = (\delta_{23} + \delta_{34})/2 = \delta_{11} + \delta_{d2} \tag{10}$$

In case of the movement with a constant acceleration, there stands a relation:

$$\delta_{d1} \delta_{d2} \tag{1}$$

the phase difference 6 after the elimination of the detection errors $\delta_{d1}$, $\delta_{d2}$ is given by:

$$\delta = (\delta_1 + \delta_2)/2 = (\delta_{11} - \delta_{d1} + \delta_{11} + \delta_{d2})/2$$

$$= \delta_{11} \tag{12}$$

$$= (\delta_{12} + 2\delta_{23} + \delta_{34})/4 \tag{13}$$

In this manner it is rendered possible to eliminate the detection errors caused by the constant-acceleration movement, utilizing the phase differences $\delta_{12}$, $\delta_{23}$ and $\delta_{34}$ determined from the four image signals $L_1$, $R_2$, $L_3$ and $R_4$, thereby significantly improving the precision of the focus detection.

In the following there will be explained a calculation method for the phase difference δ in case the interval of image signal storages fluctuates.

For an interval $T_{12}$ from the storage of the image signal $L_1$ to that of the image signal $R_2$, an interval $T_{23}$ from the storage of the image signal $R_2$ to that of the image signal $L_3$ and an interval $T_{34}$ from the storage of the image signal $L_3$ to that of the image signal $R_4$, the phase differences $\delta_1$, $\delta_2$ are given by the following formulas as in the second embodiment:

$$\delta_1 = \frac{T_{23} \cdot \delta_{12} + T_{12} \cdot \delta_{23}}{T_{12} + T_{23}} \tag{14}$$

$$\delta_2 = \frac{T_{34} \cdot \delta_{23} + T_{23} \cdot \delta_{34}}{T_{23} + T_{34}} \tag{15}$$

Also the phase difference δ is given by:

$$\delta = \frac{(T_{23} + T_{34}) \cdot \delta_1 + (T_{12} + T_{23}) \cdot \delta_2}{T_{12} + 2T_{23} + T_{34}} \tag{16}$$

$$= \frac{\frac{T_{23} \cdot \delta_{12} + T_{12} \cdot \delta_{23}}{T_{12} + T_{23}}(T_{23} + T_{34}) + \frac{T_{34} \cdot \delta_{23} + T_{23} \cdot \delta_{34}}{T_{23} + T_{34}}(T_{12} + T_{23})}{T_{12} + 2T_{23} + T_{34}} \tag{17}$$

Assuming that the time required for moving the focus detecting light shading board 67 is constant and that the charge accumulation time also remains constant within a single focus detecting operation, there stands a relation:

$$T_{12} = T_{34} \tag{18}$$

so that the foregoing formula can be transformed as:

$$\delta = \frac{T_{23}(\delta_{12} + \delta_{23}) + 2 \cdot T_{12} \cdot \delta_{23}}{2(T_{12} + T_{23})} \tag{19}$$

In this manner the calculation can be significantly simplified by giving a regularity to the intervals of the image signal storages.

The configuration of the camera and principal operations thereof in the present third embodiment are the same as those in the foregoing first embodiment and will not, therefore, be explained. In the following there will be given an explanation of the differences, from the foregoing second embodiment, in the focus detecting operation.

Figure 34:
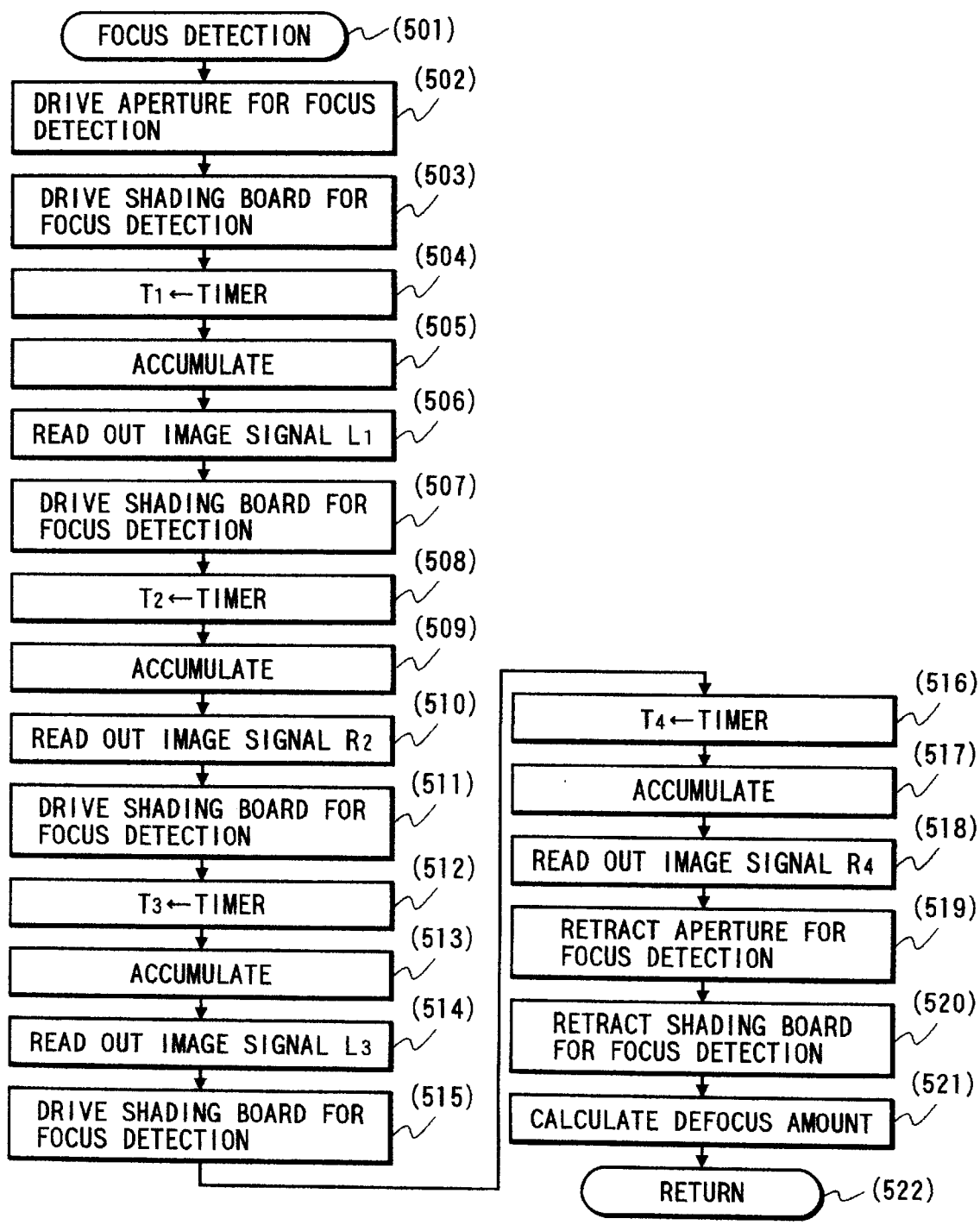
FIG. 34 is a flow chart showing an example of the focus detecting operation in the camera of the third embodiment of the present invention.

FIG. 34 shows a flow chart of a "focus detection" subroutine in case the interval of the image signal storages always varies. When this subroutine is called, the sequence proceeds, through a step 501, to a step 502.

Steps 502 and 503 drive the focus detecting diaphragm 65 and the focus detecting light shading board 67 to a state shown in FIG. 15B, thereby preparing for the focus detecting operation.

A next step 504 memorizes the starting time of the charge accumulating operation for the image signal $L_1$, by storing the count TIMER of a self-running timer of the system control unit in a RAM memory area $T_1$. A next step 505 executes the accumulation of the image signal $L_1$, and a step 506 executes the read-out thereof.

Then a step 507 moves the light shading board 67 to a state shown in FIG. 15C.

A next step 508 memorizes the starting time of the accumulation of the image signal $R_2$, by storing the timer count TIMER in a memory area $T_2$. Then a step 509 executes the accumulation of the image signal $R_2$, and a step 510 executes the read-out of the image signal $R_2$.

Then a step 511 moves the light shading board 67 to a state shown in FIG. 15B, then a step 512 memorizes the starting time of the accumulation of the image signal $L_3$, by storing the timer count TIMER in a memory area $T_3$, a step 513 executes the accumulation of the image signal $L_3$, and a step 514 executes the read-out of the image signal $L_3$.

Then a step 515 moves the light shading board 67 to a state shown in FIG. 15C, then a step 516 memorizes the starting time of the accumulation of the image signal $R_4$, by storing the timer count TIMER in a memory area $T_4$, a step 517 executes the accumulation of the image signal $R_4$, and a step 518 executes the read-out of the image signal $R_4$.

Then steps 519, 520 drive the focus detecting diaphragm 65 and the focus detecting light shading board 67 to a state shown in FIG. 15C. A next step 521 calculates the defocus amount, and a step 522 terminates the present subroutine.

Figure 35:
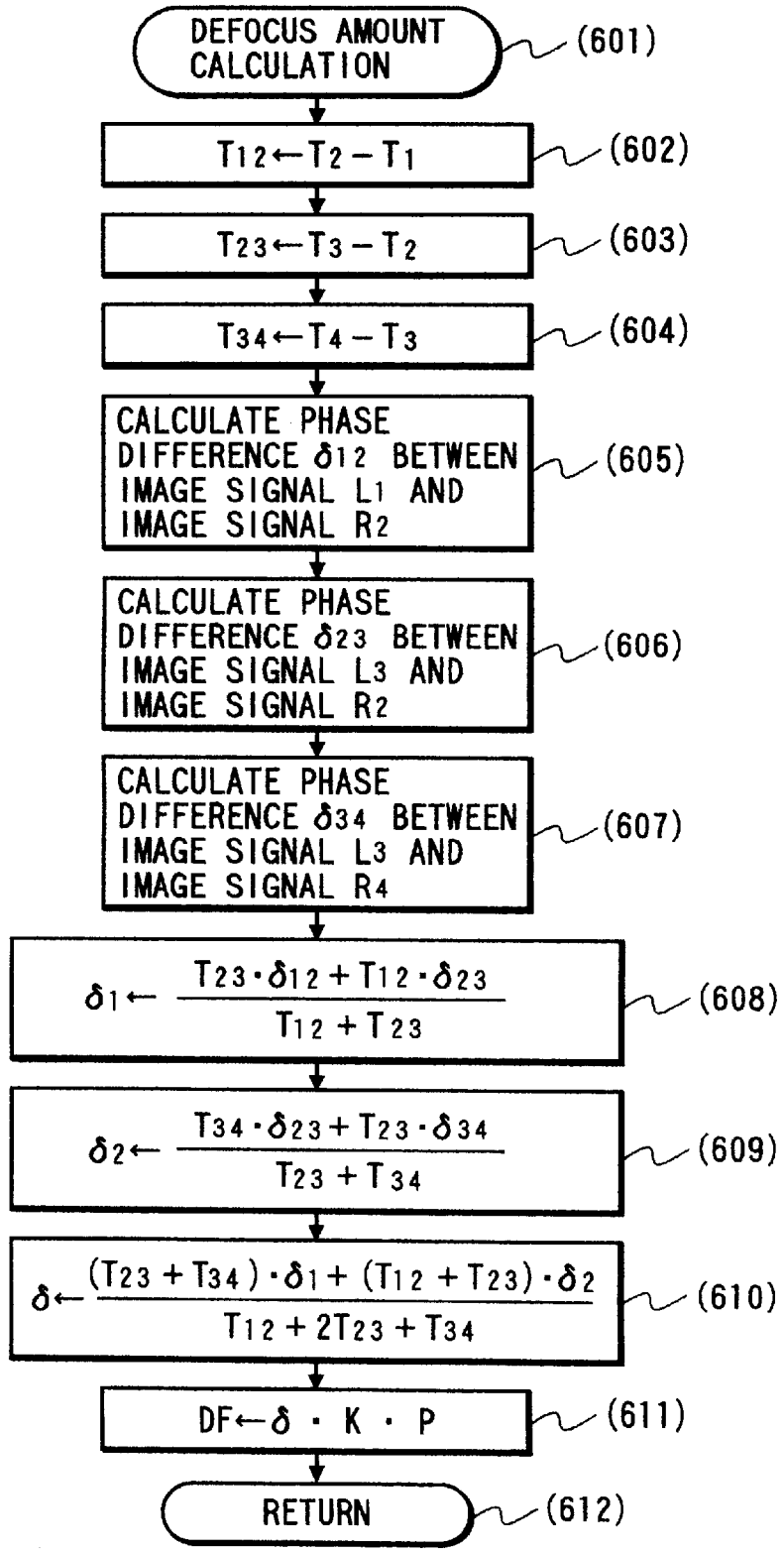
FIG. 35 is a flow chart showing an example of the defocus amount calculating operation in the camera of the third embodiment of the present invention.

Now the calculation method for the defocus amount will be explained in detail with reference to FIG. 35, which shows a "defocus amount calculation" subroutine. When this subroutine is called in the step 521 in FIG. 34, the sequence proceeds to a step 602 through a step 601.

A step 602 calculates the interval $T_{12}$ of the starts of accumulations of the image signals $L_1$ and $R_2$, then a step 603 similarly calculates the interval $T_{23}$ of the starts of accumulations of the image signals $R_2$ and $L_3$. and a step 604 calculates the interval $T_{34}$ of the starts of accumulations of the image signals $L_3$ and $R_4$.

Then a step 605 calculates the phase difference 612 of the image signals $L_1$ and $R_2$ by correlation calculation, then a step 606 similarly calculates the phase difference 623 of the image signals $R_2$ and $L_3$, and a step 607 calculates the phase difference 634 of the image signals $L_3$ and $R_4$.

Steps 608, 609 calculate the phase differences $\delta_{d1}$, $\delta_{d2}$ by eliminating the error of the constant-speed component, and a step 610 calculates the phase difference $\delta$ by eliminating the error of the constant-acceleration component. A next step 611 calculates the defocus amount DF of the photographing lens, based on the phase difference $\delta$ after the elimination of the error of the constant-acceleration component, the sensitivity K of the focus detection system, and the pixel pitch P of the CCD. Thereafter, the present subroutine is terminated by a step 612.

In the foregoing, there has been explained the principle of focus detection, in case the interval of the starts of charge accumulating operations varies.

In the following there will be explained a case in which the driving time-required for the focus detecting light shading board 67 is different in the different driving directions but is substantially same in the same driving direction, namely in a situation where the intervals of the starts of the charge accumulating operations have certain regularity in such a manner the interval from the start of accumulation of an image signal L to that of accumulation of an image signal R is constant within a single focus detecting operation and also the interval from the start of accumulation of an image signal R to that of accumulation of an image signal L is constant within a single focus detecting operation but, with a single focus detecting operation, the interval from the start of accumulation of an image signal L to that of accumulation of an image signal R is different from the interval from the start of accumulation of an image signal R to that of accumulation of an image signal L, as represented by:

$$T_{12}=T_{34}, T_{12} \neq T_{23} \tag{20}$$

according to the form of the foregoing embodiments.

Figure 36:
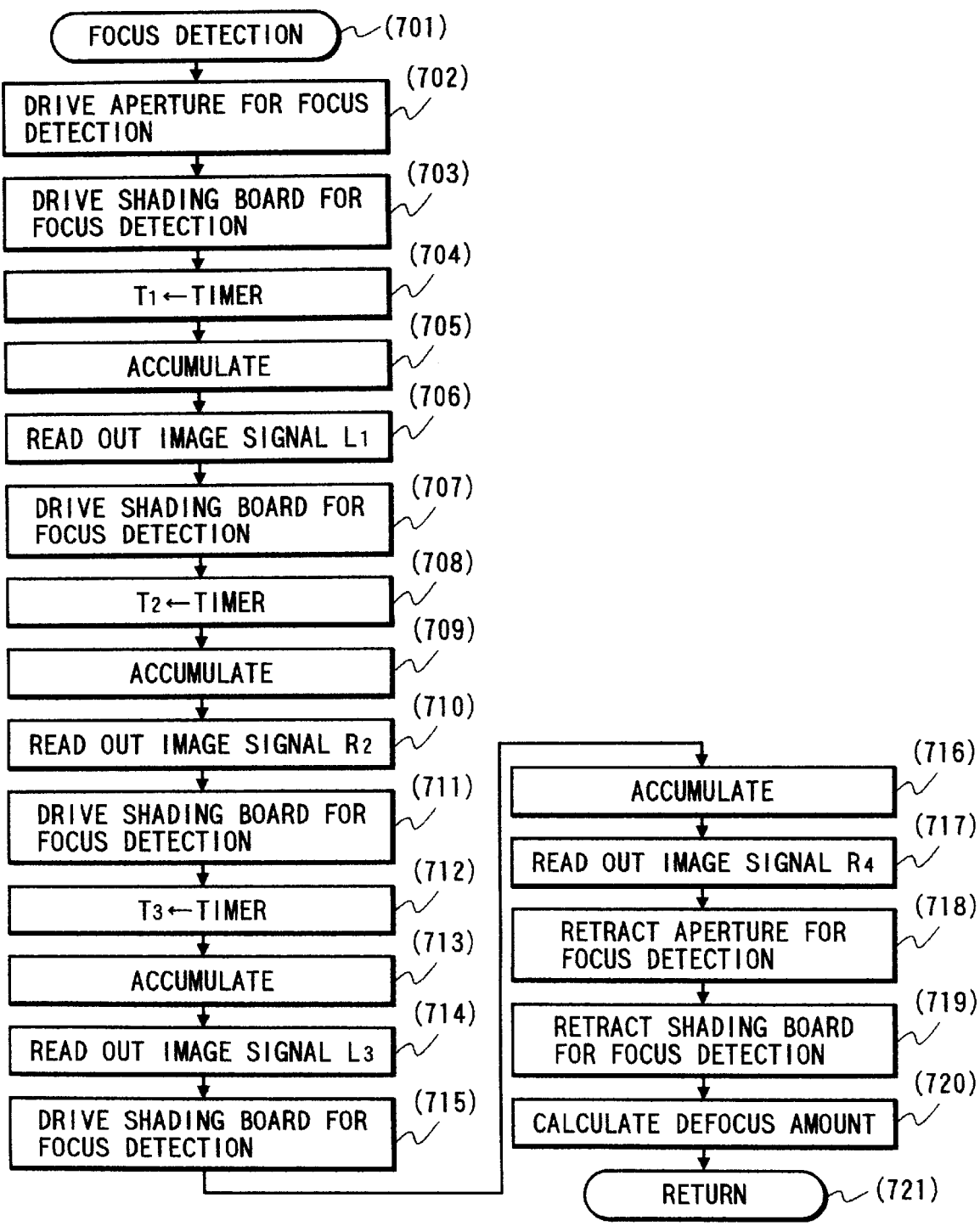
FIG. 36 is a flow chart showing another example of the focus detecting operation in the camera of the third embodiment of the present invention.
Figure 37:
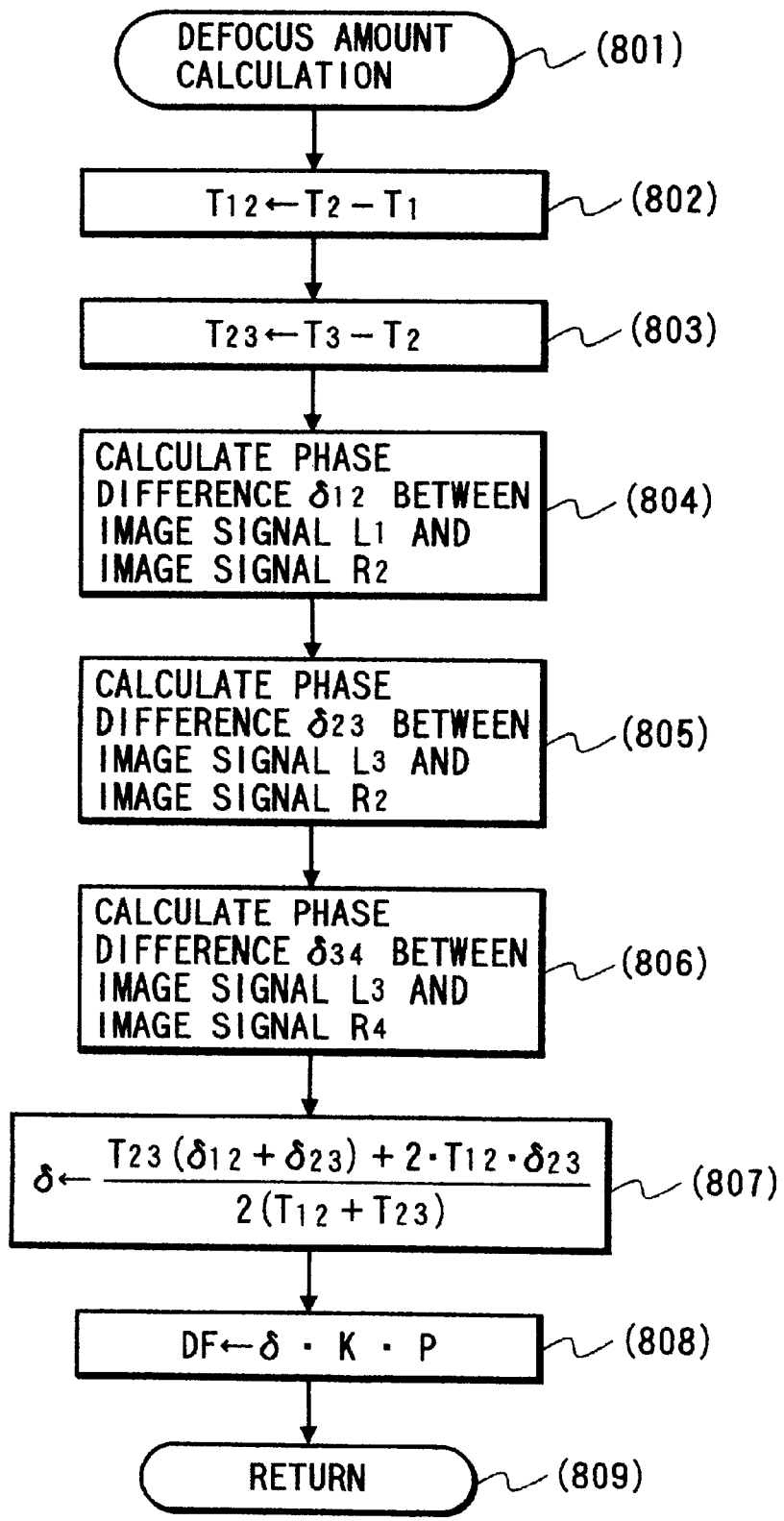
FIG. 37 is a flow chart showing another example of the defocus amount calculating operation in the camera of the third embodiment of the present invention.

FIG. 36 is a flow chart showing the focus detecting subroutine in case the above-explained regularity is present in the intervals of the starts of the charge accumulating operations. This flow chart will not be explained further as it is same as the flow chart shown in FIG. 34, except that the start time $T_4$ for the accumulation of the image signal $R_4$ is unnecessary and is not, therefore, measured.

When a "defocus amount calculation" subroutine is called in a step 720, the sequence proceeds to a step 802 through a step 801.

A step 802 calculates the interval $T_{12}$ of the starts of accumulations of the image signals $L_1$ and $R_2$, and a step 803 calculates the interval $T_{23}$ of the starts of accumulations of the image signals $R_2$ and $L_3$.

Then steps 804 to 806 calculate the phase differences $\delta_{12}$, $\delta_{23}$ and $\delta_{34}$ similarly to the steps 605 to 607 in FIG. 34, then a step 807 calculates the phase difference $\delta$, and a step 808 calculates the defocus amount DF of the photographing lens, based on the phase difference $\delta$, the sensitivity K of the focus detection system, and the pixel pitch P of the CCD. Thereafter, the present subroutine is terminated by a step 809.

In the foregoing, there has been explained the focus detecting operation, in case the intervals of the starts of charge accumulations have certain regularity. Such regularity in the intervals allows to simplify the calculation of the phase difference $\delta$ in comparison with the case of absence of such regularity, with advantages of a reduced memory capacity and a reduced calculation time.

In the following there will be explained the focus detecting operation in case the intervals of the starts of the charge accumulations are constant within a single focus detecting-operation.

Figure 38:
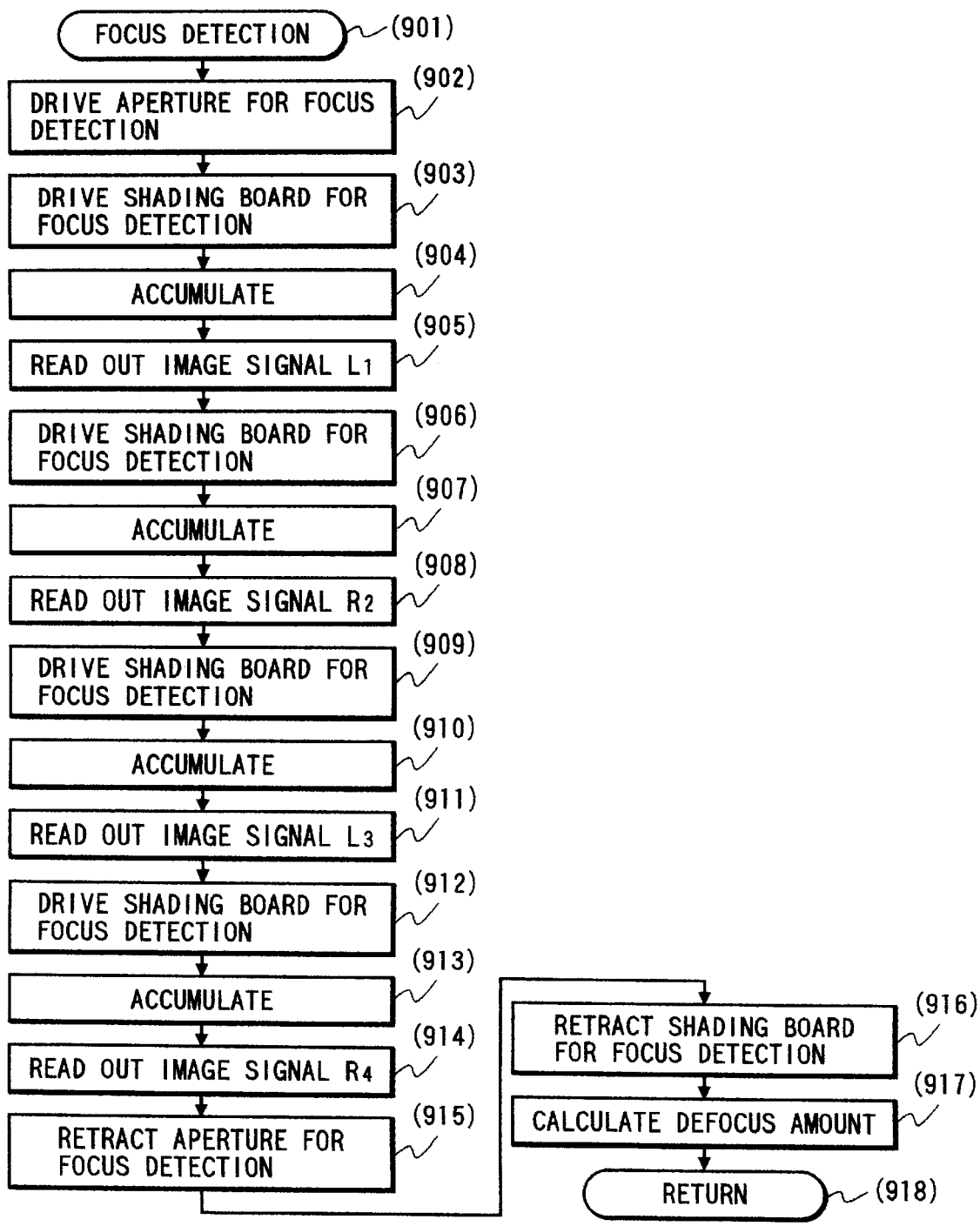
FIG. 38 is a flow chart showing another example of the focus detecting operation in the camera of the third embodiment of the present invention.
Figure 39:
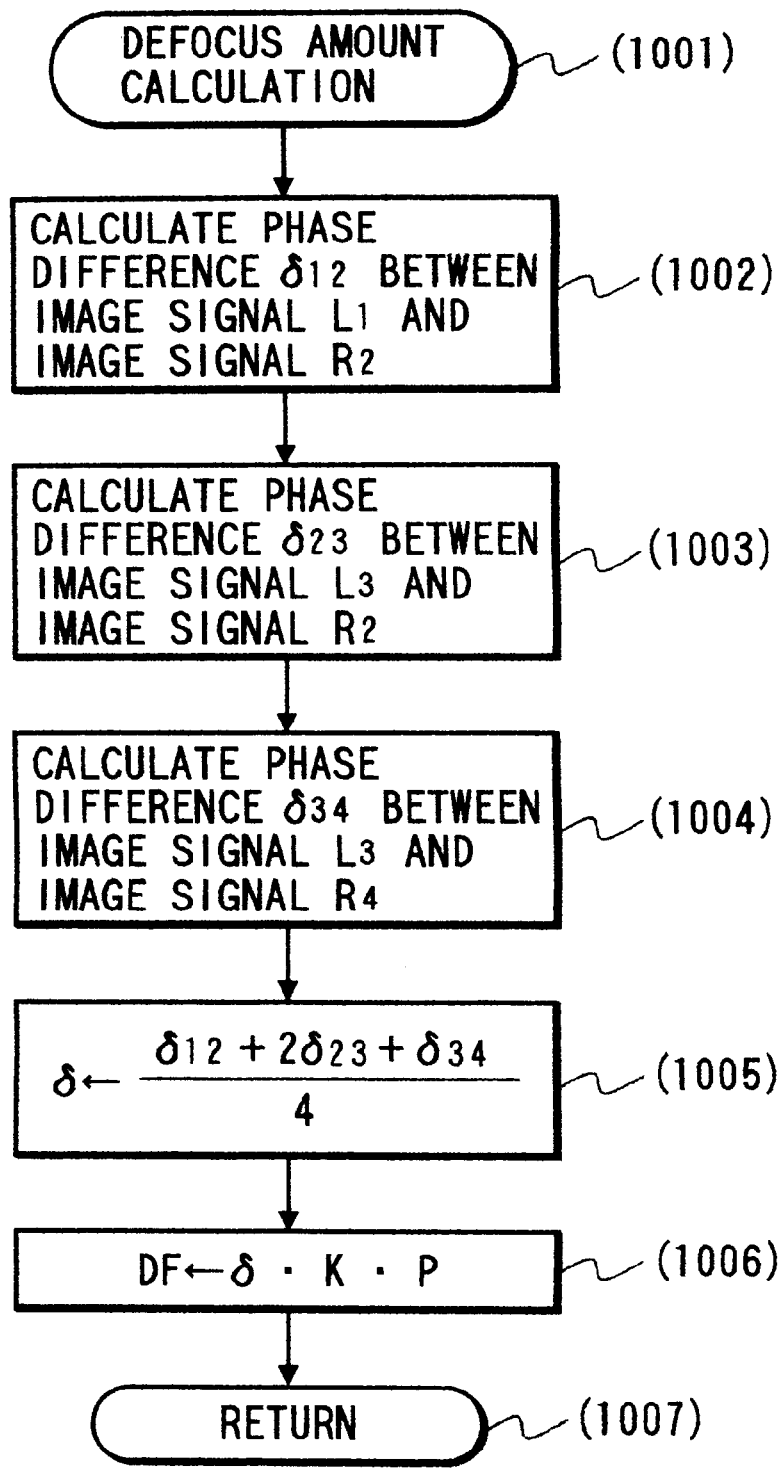
FIG. 39 is a flow chart showing another example of the defocus amount calculating operation in the camera of the third embodiment of the present invention.

FIG. 38 is a flow chart of the focus detection subroutine in case the intervals of the starts of the charge accumulations are constant. This flow chart will not be explained in detail, since it is similar to that shown in FIG. 34, except that the accumulation starting times are not read because the measurement of the intervals is not necessary. In other parts, the driving of the focus detecting diaphragm 65 and the focus detecting light shading board 67 and the accumulation and read-out of the image signals $L_1$, $R_2$, $L_3$ and $R_4$ are executed in a similar manner as in the flow chart shown in FIG. 34.

When a "defocus amount calculation" subroutine is called in a step 917, the sequence proceeds, through a step 1001, to a step 1002 to execute the "defocus amount calculation" subroutine.

Steps 1002 to 1004 calculate the phase differences $\delta_{12}$, $\delta_{23}$ and $\delta_{34}$ by correlation calculations similar to those in the steps 605 to 607 in FIG. 34, then a step 1005 calculates the phase difference $\delta$ by eliminating the error caused by the constant-acceleration movement, and a step 1006 calculates the defocus amount DF, based on the phase difference $\delta$, the sensitivity K of the focus detection system, and the pixel pitch P of the CCD. Thereafter, the present subroutine is terminated by a step 1007.

In the foregoing, there has been explained the focus detecting operation in case the intervals of the starts of charge accumulations are constant. The calculation of the phase difference $\delta$ not including the error resulting from the constant-acceleration movement can be further simplified, with advantages of reducing the memory capacity and the calculation time and dispensing with the necessity of memorizing the starting times of the charge accumulations.

The intervals of the starts of image accumulations can be given a regularity or made constant by providing a stabilizing timer which starts the image accumulating operation after the lapse of a predetermined time even if the driving of the focus detecting light shading board 67 is completed within a short time. The expiration time of such stabilizing timer need only be longer than the maximum driving time.

Also the presence of such stabilizing timer allows to dispense with detection means for detecting the completion of driving of the light shading board 67.

[Fourth Embodiment]

In a fourth embodiment of the present invention, five image signals are time-sequentially stored, and the movement of the optical image, caused by the hand vibration or the movement of the object, is approximated by a second-order function thereby reducing the error in focus detection resulting from such movement.

Figure 40:
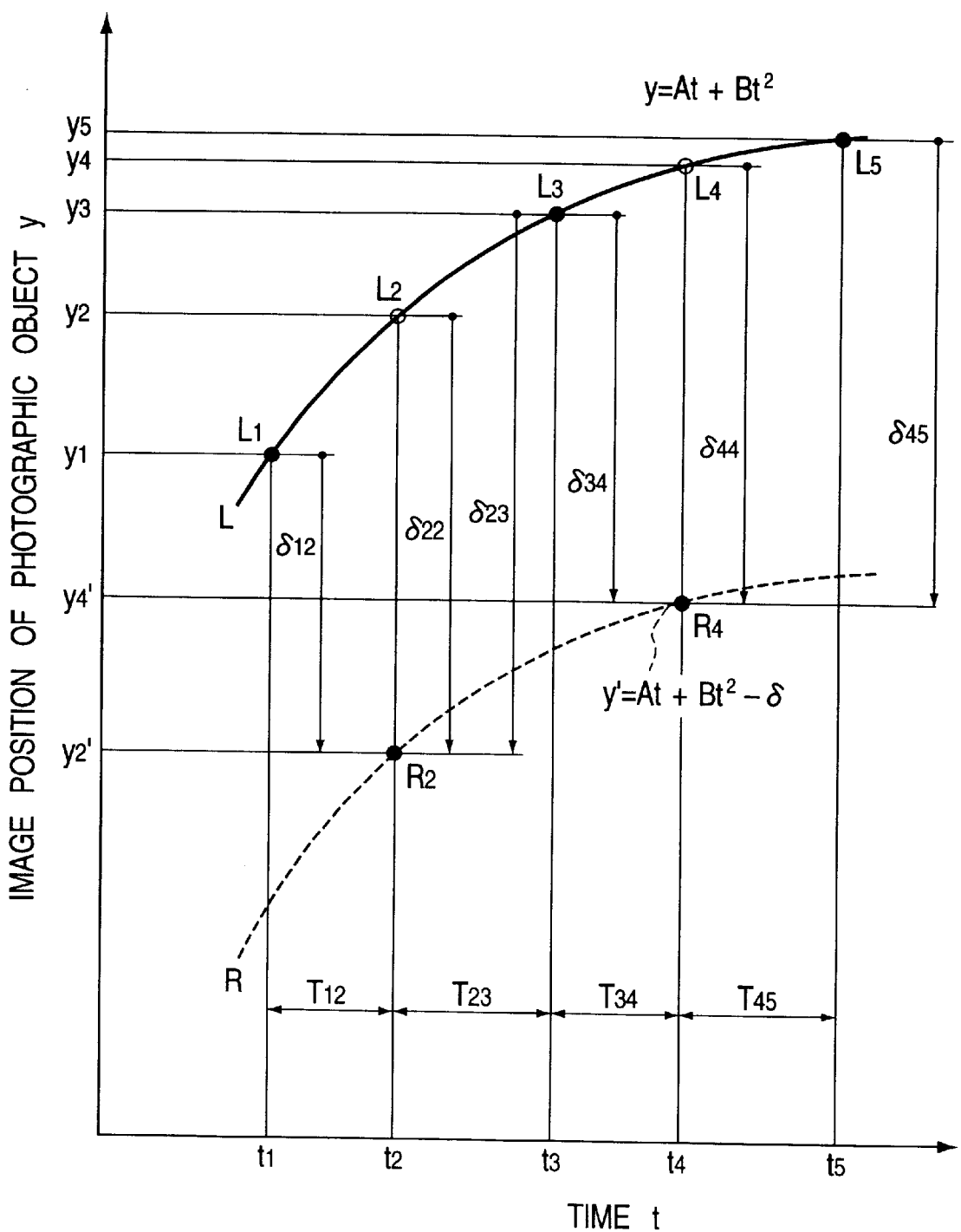
FIG. 40 is a chart showing the method for detecting the hand vibration in the camera of a fourth embodiment of the present invention.

FIG. 40 is a chart showing the error reducing method of the present fourth embodiment, wherein the object position y is represented in the ordinate, as a function of time t in the abscissa. The camera stores image signal $L_1$, $R_2$, $L_3$, $R_4$ and $L_5$ in time-sequential manner, while alternately switching the pupils. It is assumed that the movement of the object image in a period from the storage of the image signal $L_1$ to that of the image signal $L_5$ can be approximated by a second-order function. There is determined a second-order function:

$$y = At + Bt^2$$

passing through the positions of the image signals $L_1$, $L_3$ and $L_5$, then the positions of imaginary image functions $L_2$, $L_4$ are determined by an interpolation utilizing such second-order function, and the average of the phase difference between $L_2$ and $R_2$ and that between $L_4$ and $R_4$ is adopted as the final target phase difference $\delta$.

This calculation method will be explained in the following.

Assuming that the image signal $L_1$ has a position $y_1$ and a time $t_1$, the image signal $L_3$ has $y_3$ and $t_3$ and the image signal $L_5$ has $y_5$ and $t_5$, and for an initial condition of $y_1=0$ and $t_1=0$, the second-order function:

$$y = At + Bt^2$$

can be rewritten as:

$$y_3 = At_3 + Bt_3^2 \tag{21}$$

$$y_5 = At_5 + Bt_5^2 \tag{22}$$

From these two equations, the coefficients A and B can be determined as follows:

$$A = \frac{y_5 t_3^2 - y_3 t_5^2}{t_3 t_5 (t_3 - t_5)} \tag{23}$$

$$B = \frac{y_3 t_5 - y_5 t_3}{t_3 t_5 (t_3 - t_5)} \tag{24}$$

Also the positions $y_2$, $y_4$ of the imaginary image signals $L_2$, $L_4$ can be given as follows:

$$y_2 = At_2 + Bt_2^2 \tag{25}$$

$$= \frac{(y_5 t_3^2 - y_3 t_5^2) t_2}{t_3 t_5 (t_3 - t_5)} + \frac{(y_3 t_5 - y_5 t_3) t_2^2}{t_3 t_5 (t_3 - t_5)} \tag{26}$$

$$y_4 = At_4 + Bt_4^2 \tag{27}$$

$$= \frac{(y_5 t_3^2 - y_3 t_5^2) t_4}{t_3 t_5 (t_3 - t_5)} + \frac{(y_3 t_5 - y_5 t_3) t_4^2}{t_3 t_5 (t_3 - t_5)} \tag{28}$$

Thus, the phase difference $\delta_{22}$ between the imaginary image signal $L_2$ and the image signal $R_2$ is given by:

$$\delta_{22} = y_2 - y_2' \tag{29}$$

$$= \frac{(y_5 t_3^2 - y_3 t_5^2) t_2}{t_3 t_5 (t_3 - t_5)} + \frac{(y_3 t_5 - y_5 t_3) t_2^2}{t_3 t_5 (t_3 - t_5)} - y_2' \tag{30}$$

Also, the phase difference $\delta$ between the imaginary image signal $L_4$ and the image signal $R_4$ is given by:

$$\delta_{44} = y_4 - y_4' \tag{31}$$

$$= \frac{(y_5 t_3^2 - y_3 t_5^2) t_4}{t_3 t_5 (t_3 - t_5)} + \frac{(y_3 t_5 - y_5 t_3) t_4^2}{t_3 t_5 (t_3 - t_5)} - y_4' \tag{32}$$

since $$t_1 = 0, y_1 = 0 \tag{33}$$

there can be determined:

$$t_2 = T_{12}, y_2' = -\delta_{12} \tag{34}$$

$$t_3 = T_{12} + T_{23}, y_3 = -\delta_{12} + \delta_{23} \tag{35}$$

$$t_4 = T_{12} + T_{23} + T_{34}, y_4' = -\delta_{12} + \delta_{23} - \delta_{34} \tag{36}$$

$$t_5 = T_{12} + T_{23} + T_{34} + T_{45}, y_5 = -\delta_{12} + \delta_{23} - \delta_{34} + \delta_{45} \tag{3}$$

wherein $\delta_{12}$ indicates the phase difference between the image signals $L_1$ and $R_2$, $\delta_{23}$ indicates the phase difference between the image signals $R_2$ and $L_3$, $\delta_{34}$ indicates the phase difference between the image signals $L_3$ and $R_4$, and $\delta_{45}$ indicates the phase difference between the image signals $R_4$ and $L_5$.

By substituting the relations (34) to (37) into the equations (23) and (24), there are obtained:

$$A = \frac{(-\delta_{12} + \delta_{23} - \delta_{34} + \delta_{45})(T_{12} + T_{23})^2 - (-\delta_{12} + \delta_{23})(T_{12} + T_{23} + T_{34} + T_{45})^2}{(T_{12} + T_{23})(T_{12} + T_{23} + T_{34} + T_{45})(-T_{34} - T_{45})} \tag{38}$$

$$B = \frac{(-\delta_{12} + \delta_{23})(T_{12} + T_{23} + T_{34} + T_{45}) - (-\delta_{12} + \delta_{23} - \delta_{34} + \delta_{45})(T_{12} + T_{23})}{(T_{12} + T_{23})(T_{12} + T_{23} + T_{34} + T_{45})(-T_{34} - T_{45})} \tag{39}$$

Also $\delta_{22}$ and $\delta_{44}$ are given by:

$$\delta_{22} = A \cdot T_{12} + B \cdot T_{12}^2 + \delta_{12} \tag{40}$$

$$\delta_{44} = A \cdot (T_{12} + T_{23} + T_{34}) + B \cdot (T_{12} + T_{23} + T_{34})^2 + \delta_{12} - \delta_{23} + \delta_{34} \tag{41}$$

The finally desired phase difference $\delta$, being the average of $\delta_{22}$ and $\delta_{44}$, is represented by:

$$\delta = \frac{\delta_{22} + \delta_{44}}{2} \tag{42}$$

$$= \frac{A \cdot (2 \cdot T_{12} + T_{23} + T_{34}) + B \cdot (T_{12}^2 + (T_{12} + T_{23} + T_{34})^2) + 2 \cdot \delta_{12} - \delta_{23} + \delta_{34}}{2} \tag{43}$$

The foregoing shows the calculation method for the phase difference $\delta$, in case the intervals of the image signal storages constantly vary.

In case the time required for moving the focus detecting light shading board 67 in a same direction is always constant and the image accumulation times remains the same during a single focus detecting operation, there are obtained:

$$T_{12}=T_{34}, T_{23}=T_{45} \qquad (44)$$

By substituting these conditions into the equations (38), (39) and (40), there are obtained:

$$A = \frac{-3 \cdot \delta_{12} + 3 \cdot \delta_{23} + \delta_{34} - \delta_{45}}{2(T_{12} + T_{23})} \qquad (45)$$

$$B = \frac{\delta_{12} - \delta_{23} - \delta_{34} + \delta_{45}}{2(T_{12} + T_{23})^2} \qquad (46)$$

$$\delta = \frac{A \cdot (3 \cdot T_{12} + T_{23}) + B \cdot}{2} \qquad (47)$$
$$\delta = \frac{(T_{12}^2 + (2 \cdot T_{12} + T_{23})^2) + 2 \cdot \delta_{12} - \delta_{23} + \delta_{34}}{2}$$

The foregoing shows the calculation method for the phase difference δ in case the intervals of the image signal storage have regularity.

In the following there will be explained the calculation method for the phase difference δ in case the intervals of the image signal storage remain constant within a single focus detecting operation.

Under such condition, there are obtained:

$$T_{12}=T_{23}=T_{34}=T_{45} \qquad (48)$$

so that:

$$A = \frac{-3 \cdot \delta_{12} + 3 \cdot \delta_{23} + \delta_{34} - \delta_{45}}{4 \cdot T_{12}} \qquad (49)$$

$$B = \frac{\delta_{12} - \delta_{23} - \delta_{34} + \delta_{45}}{8 \cdot T_{12}^2} \qquad (50)$$

$$\delta = \frac{4 \cdot A \cdot T_{12} + 10 \cdot B \cdot T_{12}^2 + 2 \cdot \delta_{12} - \delta_{23} + \delta_{34}}{2} \qquad (51)$$

$$= \frac{4(-3 \cdot \delta_{12} + 3 \cdot \delta_{23} + \delta_{34} - \delta_{45}) +}{8} \qquad (52)$$
$$= \frac{5(\delta_{12} - \delta_{23} - \delta_{34} + \delta_{45}) + 4(2 \cdot \delta_{12} - \delta_{23} + \delta_{34})}{8}$$

$$= \frac{\delta_{12} + 3 \cdot \delta_{23} + 3 \cdot \delta_{34} + \delta_{45}}{8} \qquad (53)$$

Thus the calculation formulas can be significantly simplified by giving regularity to the intervals of the image signal storages or selecting such intervals at a same value.

The configuration of the camera of the present fourth embodiment and the main control sequence will not be explained as they are the same as those of the foregoing second embodiment, and, in the following, there will be explained the differences from the foregoing second and third embodiments in the focus detecting operation.

Figure 41:
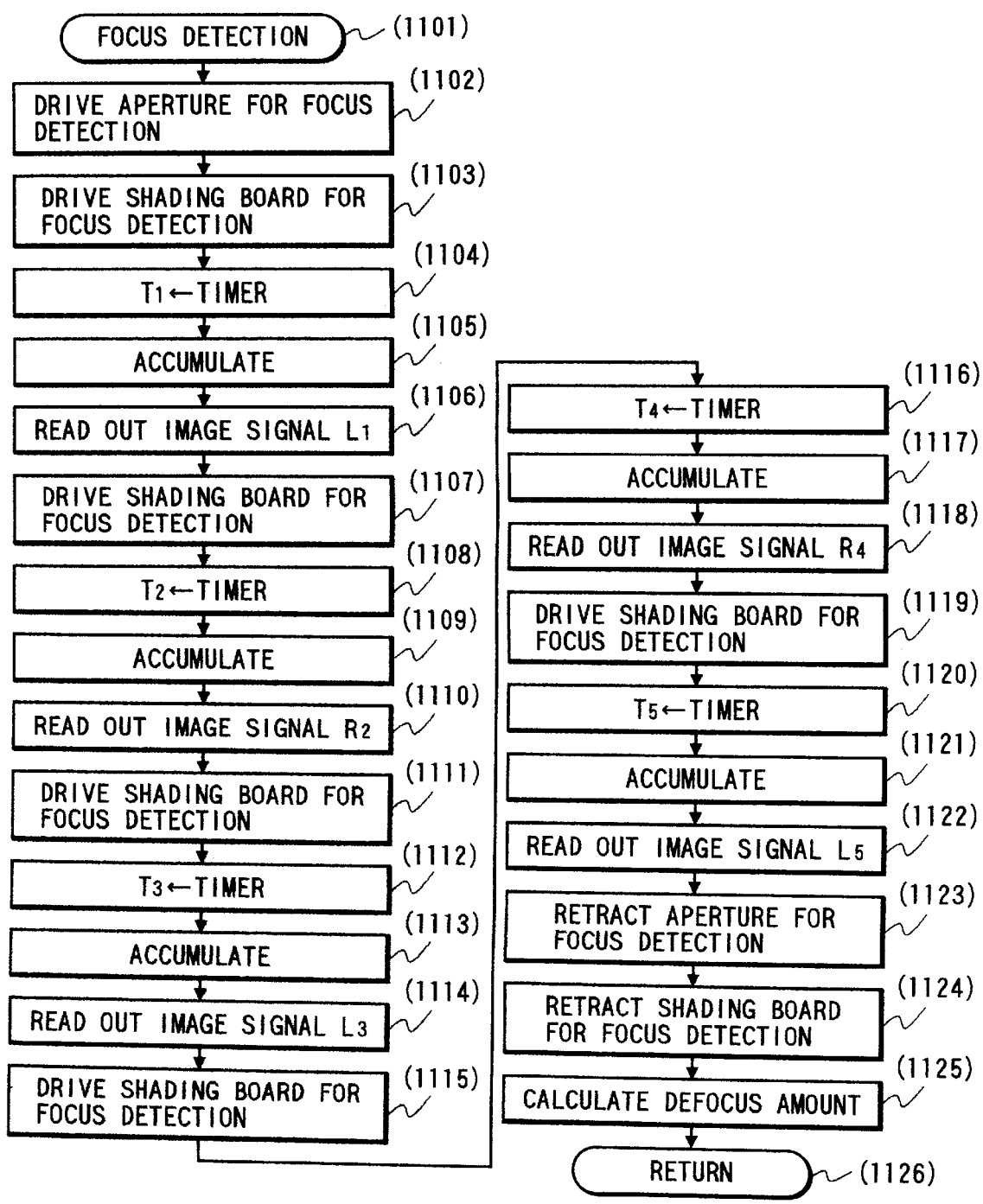
FIG. 41 is a flow chart showing an example of the focus detecting operation in the camera of the fourth embodiment of the present invention.

FIG. 41 is a flow chart showing the focus detection subroutine in case the intervals of the image signal storage vary constantly. When this subroutine is called, the sequence proceeds, through a step 1101, to a step 1102.

Steps 1102 and 1103 respectively drive the focus detecting diaphragm 65 and the focus detecting light shading board 67 to a state shown in FIG. 15B.

A next step 1104 memorizes the starting time of the charge accumulating operation for the image signal $L_1$, by storing the count TIMER of a self-running timer of the system control unit in a RAM memory area $T_1$. A next step 1105 executes the accumulation of the image signal $L_1$, and a step 1106 executes the read-out thereof.

Then a step 1107 moves the light shading board 67 to a state shown in FIG. 15C. A next step 1108 memorizes the starting time of the accumulation of the image signal $R_2$, by storing the timer count TIMER in a memory area $T_2$. Then a step 1109 executes the accumulation of the image signal $R_2$, and a step 1110 executes the read-out of the image signal $R_2$.

Then a step 1111 moves the light shading board 67 to a state shown in FIG. 15B, then a step 1112 memorizes the starting time of the accumulation of the image signal $L_3$, by storing the timer count TIMER in a memory area $T_3$, a step 1113 executes the accumulation of the image signal $L_3$, and a step 1114 executes the read-out of the image signal $L_3$.

Then a step 1115 moves the light shading board 67 to a state shown in FIG. 15C, then a step 1116 memorizes the starting time of the accumulation of the image signal $R_4$, by storing the timer count TIMER in a memory area $T_4$, a step 1117 executes the accumulation of the image signal $R_4$, and a step 1118 executes the read-out of the image signal $R_4$.

Then a step 1119 moves the light shading board 67 to a state shown in FIG. 15B, then a step 1120 memorizes the starting time of the accumulation of the image signal $L_5$, by storing the timer count TIMER in a memory area $T_5$, a step 1121 executes the accumulation of the image signal $L_5$, and a step 1122 executes the read-out of the image signal $L_5$.

Then steps 1123, 1124 drive the focus detecting diaphragm 65 and the focus detecting light shading board 67 to a state shown in FIG. 15A. A next step 1125 calculates the defocus amount, and a step 1126 terminates the present subroutine.

In the following there will be explained the calculation method for the defocus amount, with reference to FIG. 42, which shows a "defocus amount calculation" subroutine. When this subroutine is called in the step 1125 in FIG. 41, the sequence proceeds to a step 1202 through a step 1201.

Steps 1202 to 1205 calculate the intervals $T_{12}$, $T_{23}$, $T_{34}$, $T_{45}$ of the starts of accumulations of the image signals, then steps 1206 to 1209 calculate the phase differences $\delta_{12}$, $\delta_{23}$, $\delta_{34}$, $\delta_{45}$ of the image signals by correlation calculation. Then a step 1210 calculates the coefficient A of the first-order term of the second-order function, and a step 1211 calculates the coefficient B of the second-order term. A next step 1212 calculates the phase difference δ, by the approximation with the second-order function, and a step 1213 calculates the defocus amount DF of the photographing lens, based on the phase difference δ, the sensitivity K of the focus detection system, and the pixel pitch P of the CCD. Thereafter, the present subroutine is terminated by a step 1214.

In the foregoing there has been explained the go focus detecting operation in case the intervals of the start times of the image accumulations vary.

In the following there will be explained a case in which the driving time required for the focus detecting light shading board 67 is different in the different driving directions but is constant in the same driving direction, namely in a situation where the intervals of the starts of the image accumulating operations have certain regularity in such a manner the intervals $T_{12}$, $T_{34}$ from the start of accumulation of an image signal L to that of accumulation of an image signal R are same and also the intervals $T_{23}$, $T_{45}$, from the start of accumulation of an image signal R to that of accumulation of an image signal L are the same but the interval from the start of accumulation of an image signal L to that of accumulation of an image signal R is different from the interval from the start of accumulation of an image signal R to that of accumulation of an image signal L, as represented by:

$$T_{12}=T_{34}, T_{23}=T_{45}, T_{12} \neq T_{23} \qquad (54)$$

Figure 43:
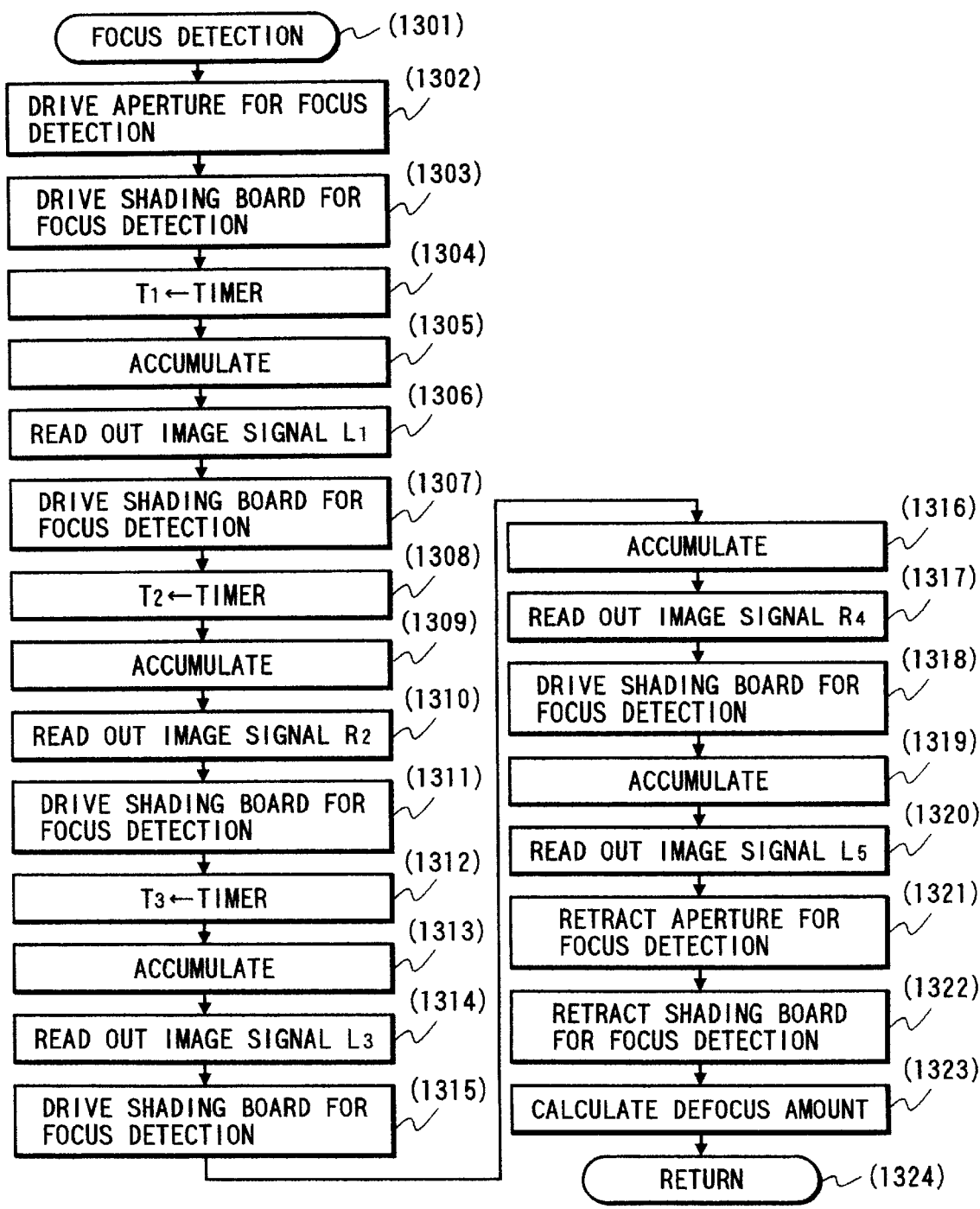
FIG. 43 is a flow chart showing another example of the focus detecting operation in the camera of the fourth embodiment of the present invention.
Figure 44:
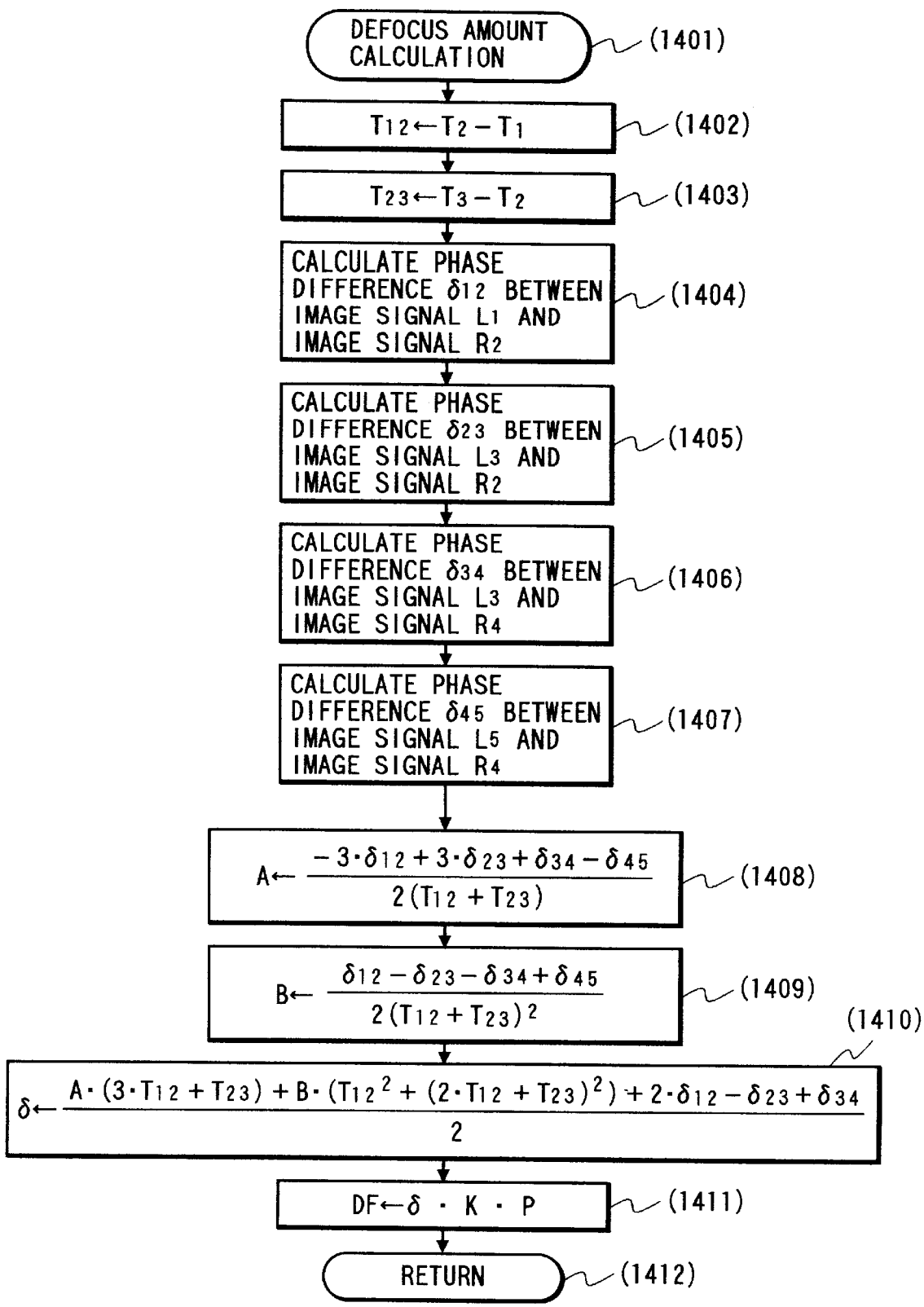
FIG. 44 is a flow chart showing another example of the defocus amount calculating operation in the camera of the fourth embodiment of the present invention.

FIG. 43 is a flow chart showing the focus detecting subroutine in case the above-explained regularity is present in the intervals of the starts of the charge accumulating operations. This flow chart will not be explained further as it is the same as the flow chart shown in FIG. 41, except that the start times $T_4$, $T_5$ for the accumulation of the image signals $R_4$, $R_5$ are unnecessary and are not, therefore, measured.

When the "defocus amount calculation" subroutine is called in a step 1324, the sequence proceeds to a step 1402 through a step 1401.

A step 1402 calculates the interval $T_{12}$ of the starts of accumulations of the image signals $L_1$ and $R_2$, and a step 1403 calculates the interval $T_{23}$ of the starts of accumulations of the image signals $R_2$ and $L_3$. Then steps 1404 to 1407 calculate the phase differences $\delta_{12}$, $\delta_{23}$, $\delta_{34}$ and $\delta_{45}$ similarly to the steps 1206 to 1209 in FIG. 42, then a step 1408 calculates the coefficient A of the first-order term of the second-order function, and a step 1409 calculates the coefficient B of the second-order term.

A step 1410 calculates the phase difference $\delta$ determined by the approximation with the second-order function, and a step 1411 calculates the defocus amount DF of the photographing lens, based on the phase difference $\delta$, the sensitivity K of the focus detection system, and the pixel pitch P of the CCD. Thereafter, the present subroutine is terminated by a step 1412.

In the foregoing, there has been explained the focus detecting operation, in case the intervals of the starts of image accumulations have certain regularity. Such regularity in the intervals allows to simplify the calculation of the phase difference $\delta$ in comparison with the case of absence of such regularity, with advantages of a reduced memory capacity and a reduced calculation time.

In the following there will be explained the focus detecting operation in case the intervals of the starts of the image accumulations are constant within a single focus detecting operation.

Figure 45:
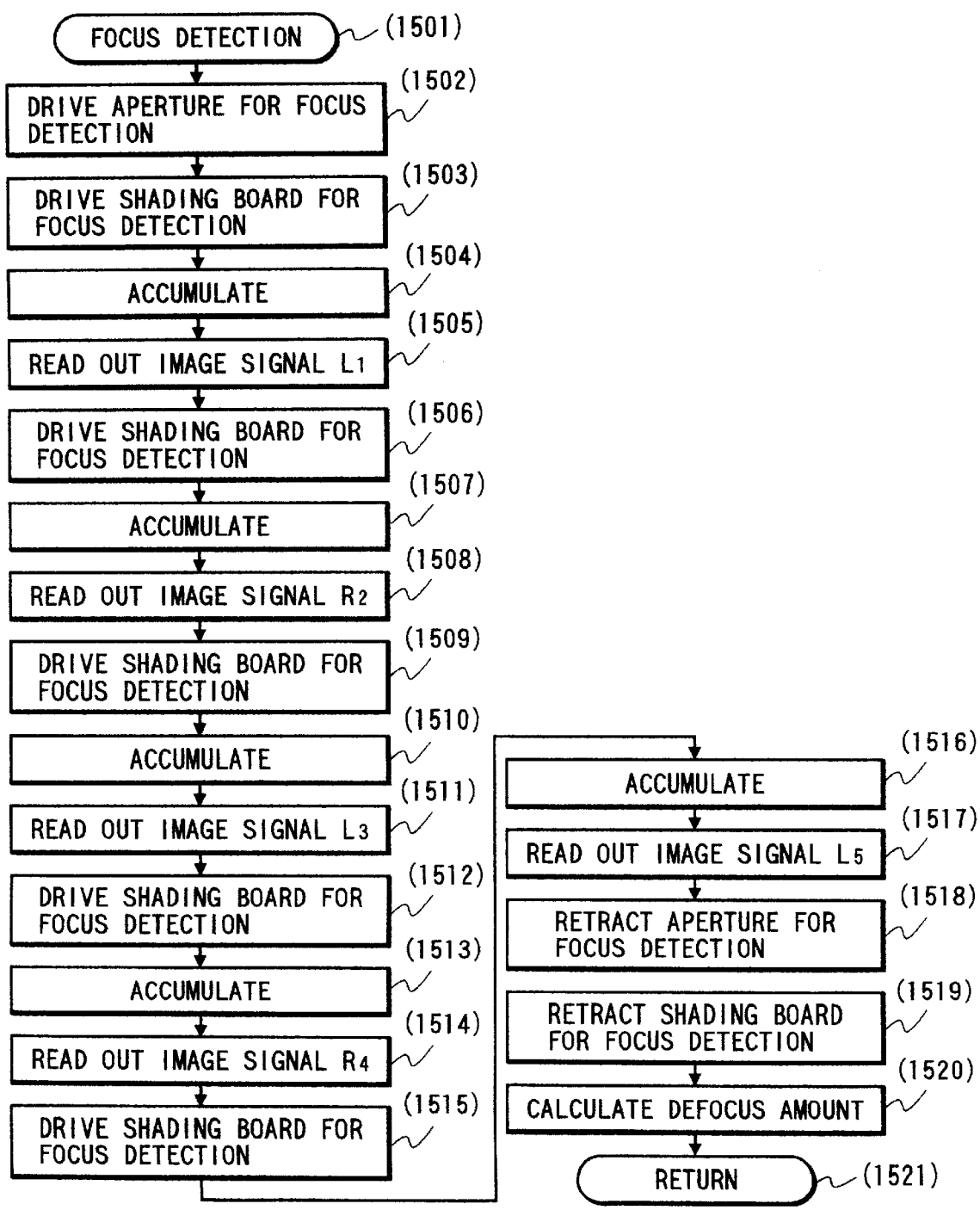
FIG. 45 is a flow chart showing another example of the focus detecting operation in the camera of the fourth embodiment of the present invention.
Figure 46:
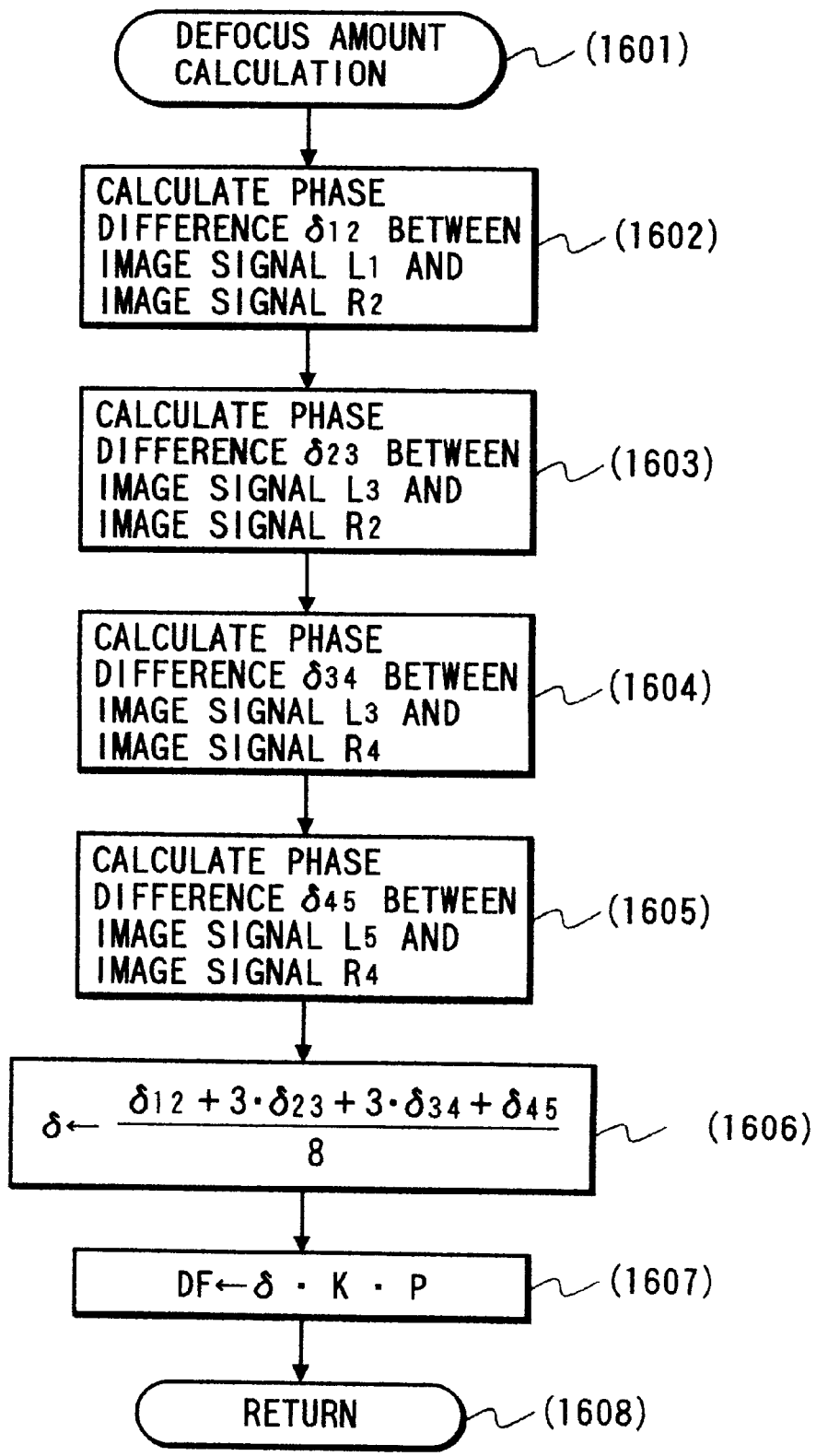
FIG. 46 is a flow chart showing another example of the defocus amount calculating operation in the camera of the fourth embodiment of the present invention.

FIG. 45 is a flow chart of the focus detection subroutine in case the intervals of the starts of the charge accumulations are constant. This flow chart will not be explained in detail, since it is similar to that shown in FIG. 41, except that the accumulation starting times are not read because the measurement of the intervals is not necessary. In other parts, the driving of the focus detecting diaphragm 65 and the focus detecting light shading board 67 and the accumulation and read-out of the image signals $L_1$, $R_2$, $L_3$, $R_4$ and $L_5$ are executed in a similar manner as in the flow chart shown in FIG. 41.

When a "defocus amount calculation" subroutine is called in a step 1520, the sequence proceeds, through a step 1601, to a step 1602 to execute the "defocus amount calculation" subroutine.

Figure 42:
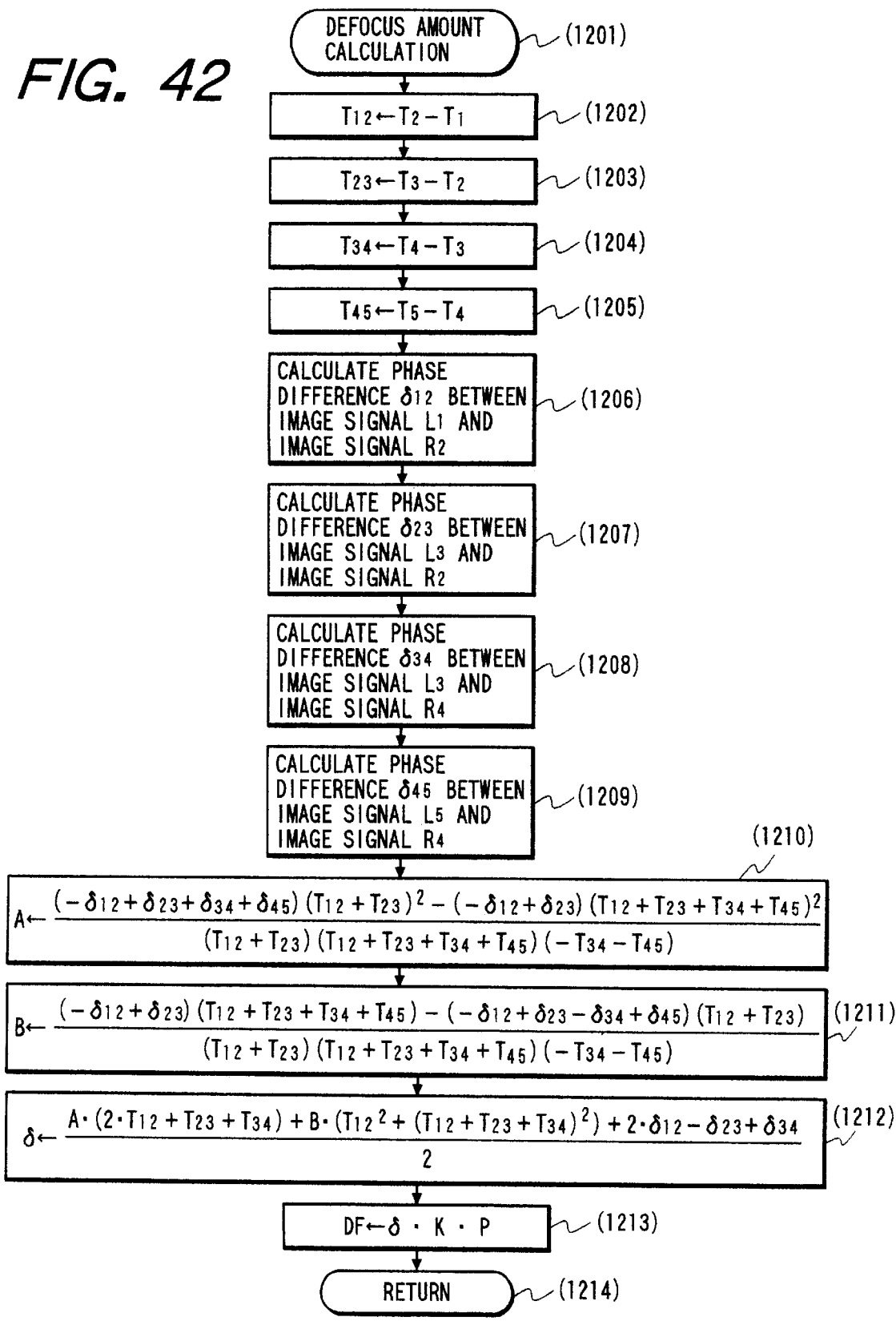
FIG. 42 is a flow chart showing an example of the defocus amount calculating operation in the camera of the fourth embodiment of the present inventions.

Steps 1602 to 1605 calculate the phase differences $\delta_{12}$, $\delta_{23}$, $\delta_{34}$ and $\delta_{45}$ by correlation calculations similar to those in the steps 1206 to 1209 in FIG. 42, then a step 1607 calculates the phase difference $\delta$ corrected by approximation with the second-order function. Then a step 1607 calculates the defocus amount DF, based on the phase difference $\delta$, the sensitivity K of the focus detection system, and the pixel pitch P of the CCD. Thereafter, the present subroutine is terminated by a step 1608.

In the foregoing, there has been explained the focus detecting operation in case the intervals of the starts of image accumulations are constant. The calculation of the phase difference $\delta$ can be further simplified by the approximation with the second-order function, with advantages of significantly reducing the memory capacity and the calculation time. The memory and the calculation time are further reduced since memorizing of the starting times of the image accumulations is unnecessary.

In case the driving time of the focus detecting light shading board 67 fluctuates by a certain level, there may be provided a stabilizing timer which starts the image accumulating operation after the lapse of a predetermined time even if the driving of the focus detecting light shading board 67 is completed within a short time, thereby easily giving regularity to the intervals of the start times of the image accumulations or maintaining such intervals constant. The expiration time of such stabilizing timer need only be longer than the maximum driving time. Also the presence of such stabilizing timer allows to dispense with detection means for detecting the completion of driving of the light shading board 67.

The foregoing embodiments utilize 3 to 5 image signals for calculating the phase difference, corrected for the object movement on the CCD, resulting from the movement of the object or from the hand vibration. For example, with a constant interval of the image accumulations, there may be utilized 6 image signals $L_1$, $R_2$, $L_3$, $R_4$, $L_5$ and $R_6$ to determine the phase differences $\delta_{12}$, $\delta_{23}$, $\delta_{34}$, $\delta_{45}$ and $\delta_{56}$ from which the phase difference $\delta$ can be calculated according to the following equation:

$$\delta=(\delta_{12}+3\delta_{23}+4\delta_{34}+3\delta_{45}+\delta_{56})/12 \qquad (55)$$

Similarly there may be employed 7 image signals $L_1$, $R_2$, $L_3$, $R_4$, $L_5$, $R_6$ and $L_7$ to determine the phase differences $\delta_{12}$, $\delta_{23}$, $\delta_{34}$, $\delta_{45}$, $\delta_{56}$ and $\delta_{67}$, from which the phase difference $\delta$ can be calculated according to the following equation:

$$\delta=(\delta_{12}+3\delta_{23}+4\delta_{34}+4\delta_{45}+3\delta_{56}+\delta_{67})/16 \qquad (56)$$

[Fifth Embodiment]

A fifth embodiment of the present invention selects the number of the image signals and the calculation method therefor, according to the focal length of the photographing lens and the intervals of the storages of the image signals.

Figure 47:
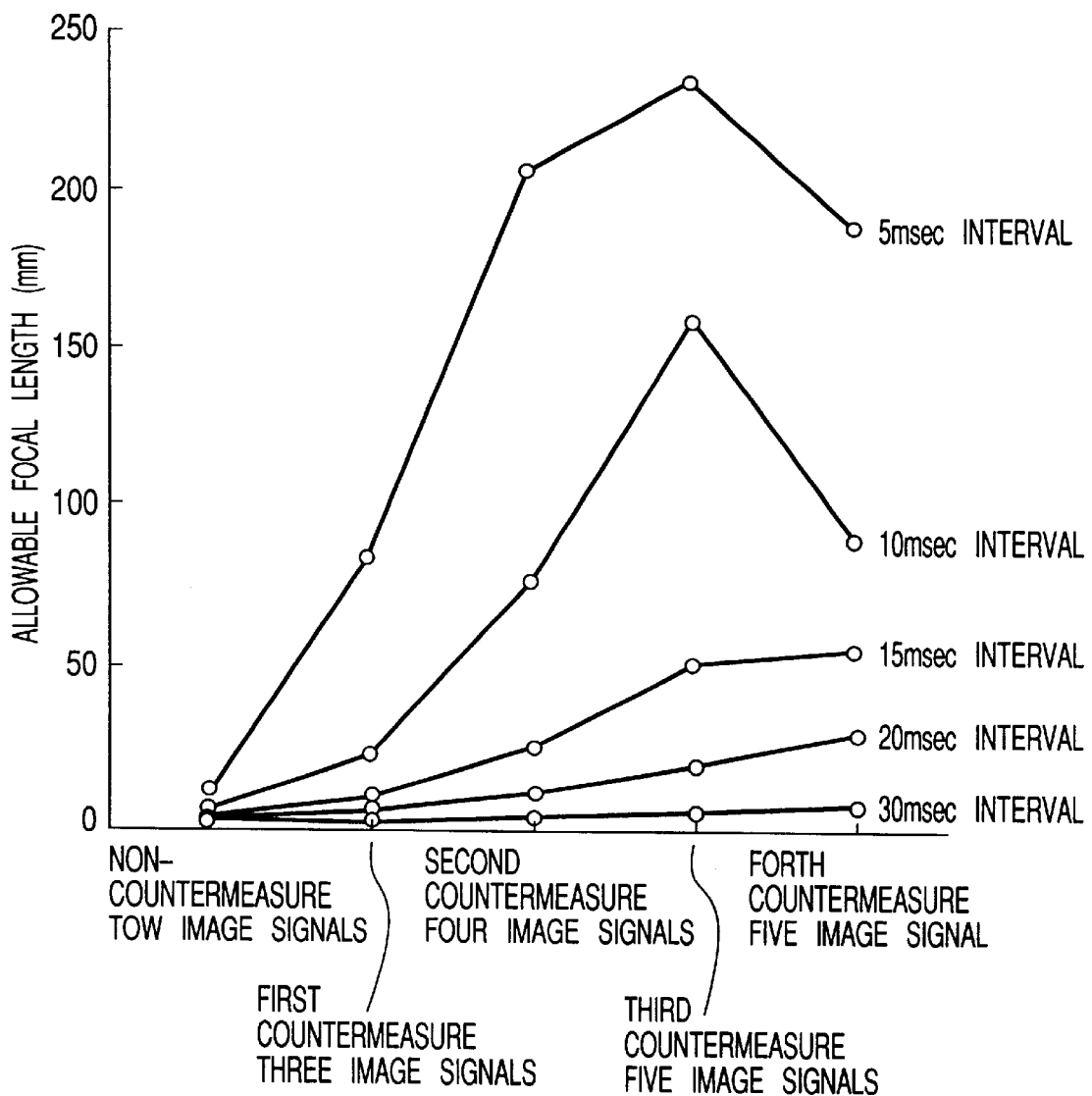
FIG. 47 is a chart showing the relationship between the time interval of the storage of the image signals and the calculation method in the camera of a fifth embodiment of the present invention.

FIG. 47 is a simulated chart showing the relationship between the interval of the image signal storages and the focal length of the photographing lens, for which the detection error caused by the hand vibration becomes equal to the permissible error (permissible focal length), in various countermeasures for reducing the influence of the hand vibration.

In the following it is assumed that the image signals $L_1$ and $R_2$ have a phase difference $\delta_{12}$, the image signals $L_3$ and $R_2$ have a phase difference $\delta_{23}$, the image signals $L_3$ and $R_4$ have a phase difference $\delta_{34}$, the image signals $L_5$ and $R_4$ have a phase difference $\delta_{45}$, and the intervals of the image signal storages are constant. In the following:

Non-countermeasure: the phase difference $\delta$ to be used in the defocus amount calculation is $\delta=\delta_{12}$.

Countermeasure 1: the phase difference $\delta$ to be used in the defocus amount calculation is $\delta=(\delta_{12}+\delta_{23})/2$.

Countermeasure 2: the phase difference $\delta$ to be used in the defocus amount calculation is represented by:

$$\delta=(\delta_{12}+2\cdot\delta_{23}+\delta_{34})/4$$

Countermeasure 3: the phase difference $\delta$ to be used in the defocus amount calculation is represented by:

$$\delta=(\delta_{12}+3\cdot\delta_{23}+3\delta_{34}+\delta_{45})/8$$

Countermeasure 4: the phase $\delta$ to be used in the defocus amount calculation is represented by:

$$\delta=(\delta_{12}+2\cdot\delta_{23}+2\delta_{34}+\delta_{45})/6$$

and the results are simulated under the condition that the intervals of the image signal storage are constant.

This chart indicates that the permissible focal length becomes larger for a shorter interval of the storage of the image signals and for a larger number of the image signals employed in a single calculation.

However, an increase in the number of the image signals employed in the calculation improves the precision of detection but increases the time required for storage the image signal, thus prolonging the time required for focus detection and deteriorating the operability.

The present embodiment is, therefore, to minimize the time required for the focus detection by selecting a minimum necessary number of the image signals required for securing the necessary precision and a matching calculation method, according to the focal length of the actually employed photographing lens, the image accumulation time and the driving time of the focus detecting light shading board 67.

Referring to FIG. 47, the countermeasure 4 is more effective, in comparison with the countermeasure 3, when the interval of the image signal storage is longer than 15 msec, but is less effective in case the interval does not exceed 15 msec. For this reason, the countermeasure 4 or 3 is employed respectively in case the storage interval is longer or shorter than 15 msec.

The configuration of the camera of the fifth embodiment and the principal functions thereof are the same as those of the foregoing second embodiment and will not, therefore, be explained, and, in the following there will be explained the focus detecting operation.

Figure 48:
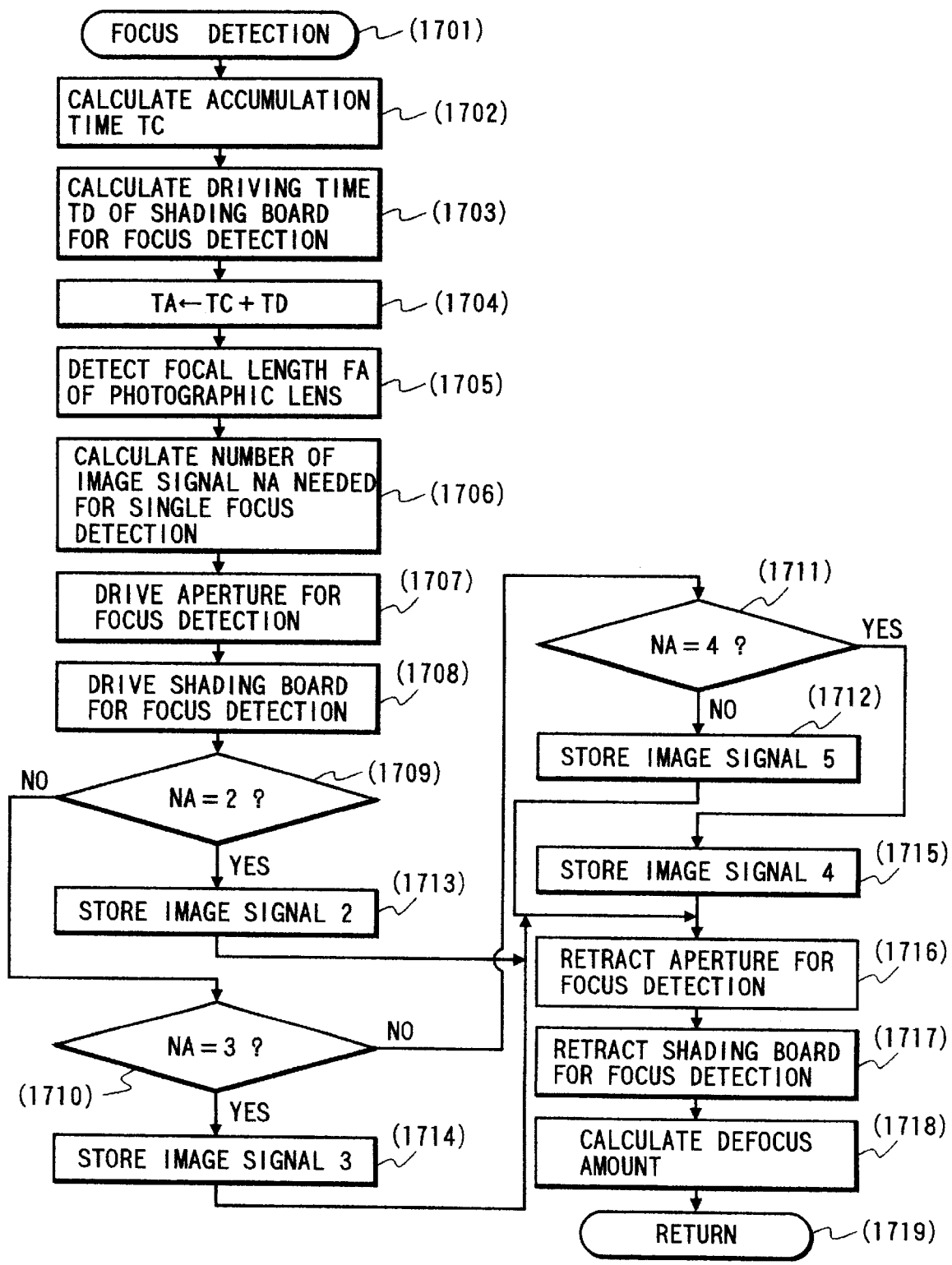
FIG. 48 is a flow chart showing the focus detecting operation in the camera of the fifth embodiment of the present invention.

FIG. 48 shows a flow chart of a "focus detection" subroutine. When it is called, the sequence proceeds to a step 1702 through a step 1701.

A step 1702 calculates the accumulation time TC and the gain at the focus detection, based on the object luminance and the aperture value of the focus detecting diaphragm 65 obtained in a light metering subroutine of the step 005 shown in FIG. 28, then a step 1703 reads the drive time TD for the focus detecting light shading board 67 for pupil switching, from the data stored in the ROM, and a step 1704 calculates the interval of the image signal storages as the sum of TC and TD.

A step 1705 detects the focal length FA of the photographing lens, by reading the zoom encoder of the zoom lens. A step 1706 calculates the number NA of the image signals required for a single focus detection, from the interval TA of the image signal storage and the focal length FA of the photographing lens. This calculation method will be explained later in more detail.

Steps 1707 and 1708 respectively drive the focus detecting diaphragm 65 and the focus detecting light shading board 67 to the state shown in FIG. 15B.

A step 1709 discriminates whether the number NA calculated in the foregoing step 1706 is 2, and, if NA=2, the sequence proceeds to a step 1713, but, if not, the sequence proceeds to a step 1710. The step 1710 discriminates if NA=3, and, if so, the sequence proceeds to a step 1714, but, if not, the sequence proceeds to a step 1711. The step 1711 discriminates whether NA=4, and, if so, the sequence proceeds to a step 1715, but, if NA≠4, NA has to be 5 and the sequence proceeds to a step 1712.

A step 1713 is an "image signal storage 2" subroutine for storage of two image signals; a step 1714 is an "image signal storage 3" subroutine for storage of three image signals; a step 1715 is an "image signal storage 2" subroutine for storage of two image signals; and a step 1712 is an "image signal storage 5" subroutine for storage of five image signals.

The subroutines in the steps 1712 to 1715 will be explained later in more details.

After any of the subroutines in the steps 1712 to 1715, the sequence proceeds to steps 1716, 1717 for respectively driving the focus detecting diaphragm 65 and the focus detecting light shading board 67 to the state shown in FIG. 15A.

A next step 1718 calculates the defocus amount of the photographing lens by a "defocus amount calculation" subroutine, and a step 1719 terminates this subroutine. The details of the "defocus amount calculation" subroutine will be explained later.

Figure 49:
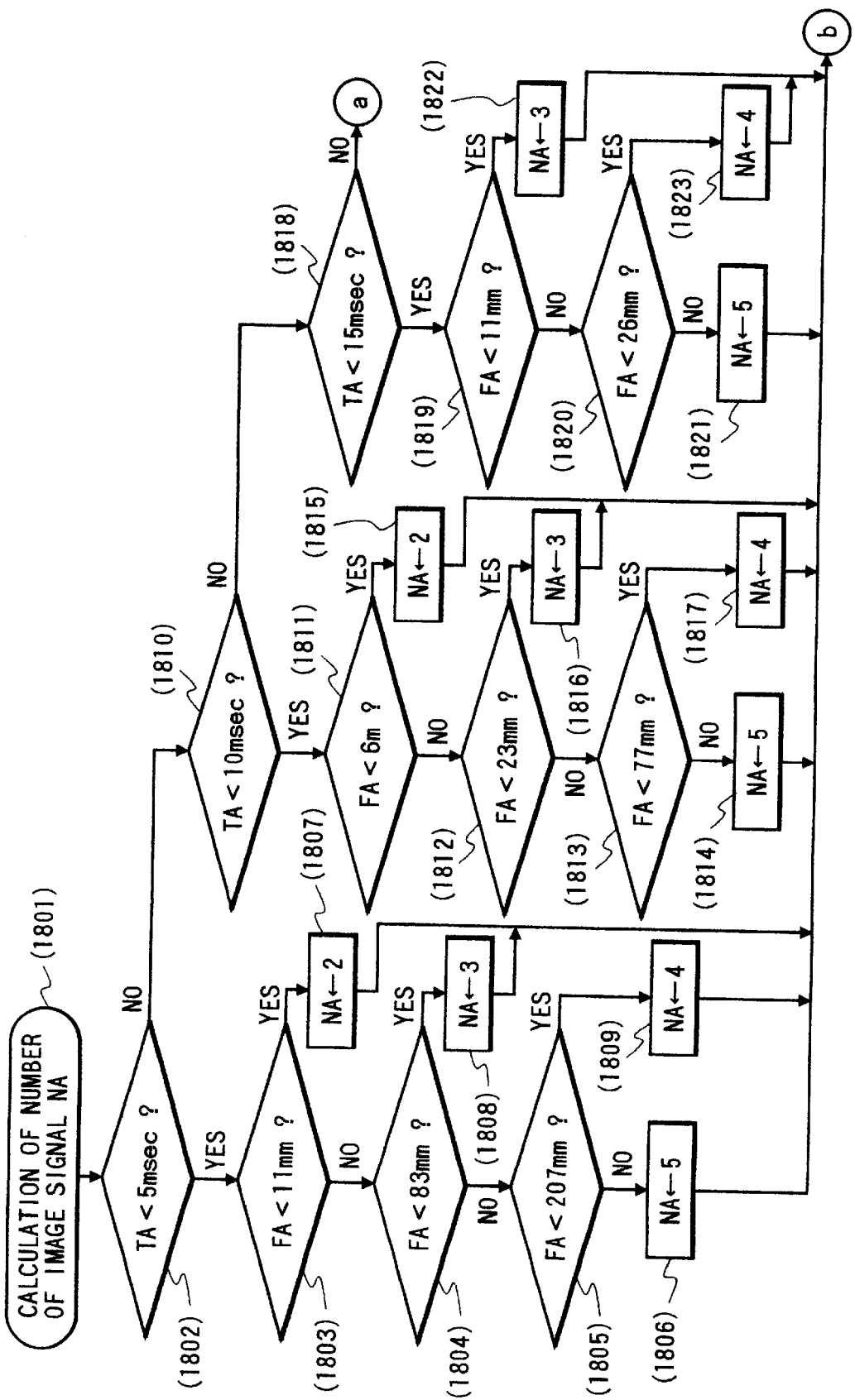
FIG. 49 is a flow chart showing a part of the control sequence for calculating the number of the image signals, in the camera of the fifth embodiment of the present invention.
Figure 50:
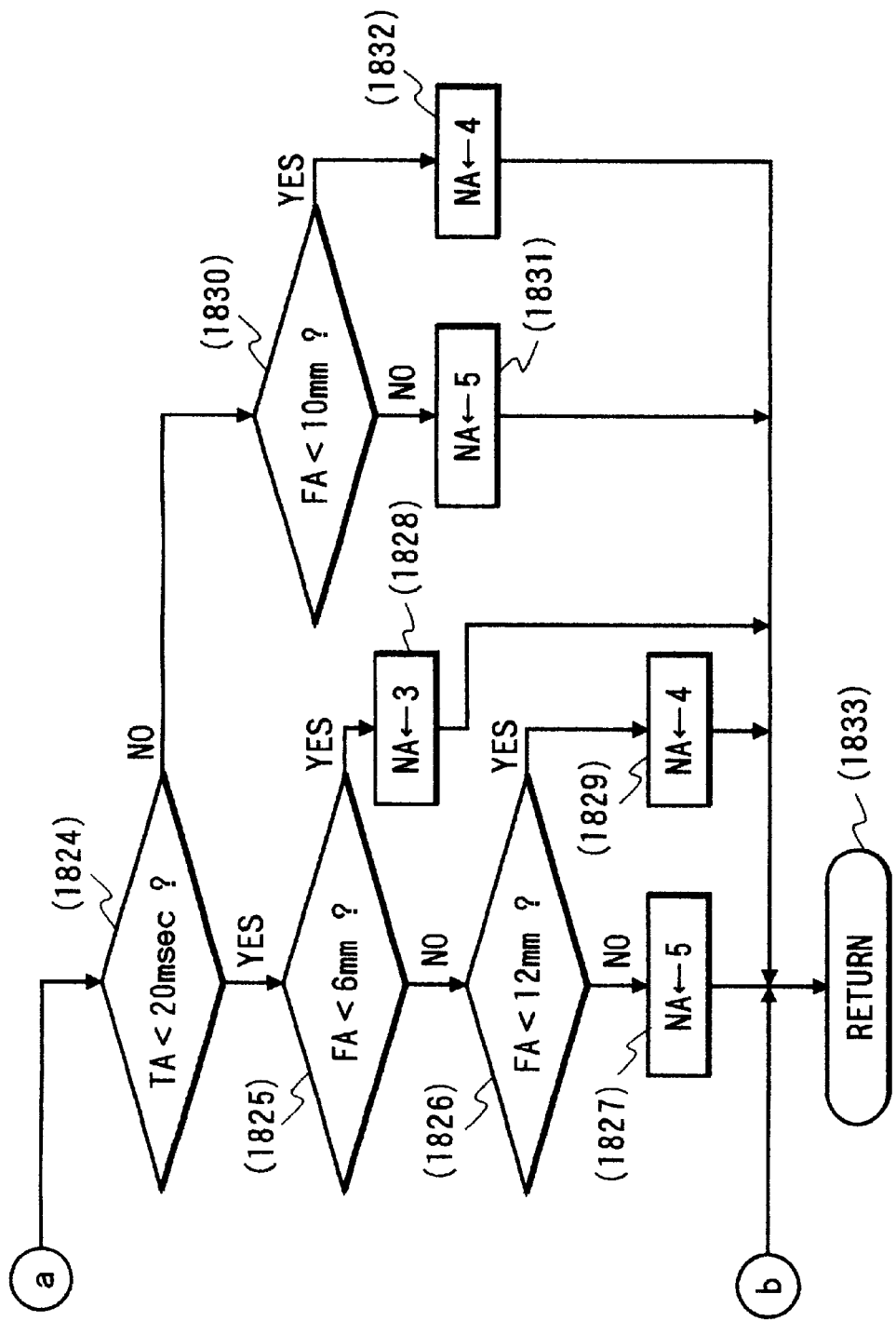
FIG. 50 is a continuation of the flow chart shown in FIG. 49.

FIGS. 49 and 50 are flow charts of the "image signal number NA calculating" subroutine. When this subroutine is called in the step 1706 shown in FIG. 48, the sequence proceeds to a step 1802 through a step 1801.

A step 1802 discriminates whether the interval TA of the image signal storage is shorter than 5 msec, and, if TA<5 msec, the sequence proceeds to a step 1803, but, if not, the sequence proceeds to a step 1810. The step 1810 discriminates whether the interval TA of the image signal storage is shorter than 10 msec, and, if TA <10 msec, the sequence proceeds to a step 1811, but, if not, the sequence proceeds to a step 1818. The step 1818 discriminates whether the interval TA of the image signal storage is shorter than 15 msec, and, if TA<15 msec, the sequence proceeds to a step 1819, but, if not, the sequence proceeds to a step 1824. The step 1824 discriminates whether the interval TA of the image signal storage is shorter than 20 msec, and, if TA<20 msec, the sequence proceeds to a step 1825, but, if not, the sequence proceeds to a step 1830.

Assuming that the upper limit value of the accumulation time TC is 20 msec and the driving time of the focus detecting light shading board 67 is, 3 msec, the sequence proceeds to the step 1803 in case of TA<5 msec, to the step 1811 in case of 5 msec≦TA<10 msec, to the step 1819 in case of 10 msec≦TA<15 msec, to the step 1825 in case of 15 msec≦TA<20 msec, or to the step 1830 in case of 20 msec≦TA<23 msec.

The step 1803 discriminates whether the focal length FA of the photographing lens is smaller than 11 mm, and, if FA<11 mm, the sequence proceeds to a step 1807, but, if not, the sequence proceeds to a step 1804. The step 1804 discriminates whether FA is smaller than 83 mm, and, if FA<83 mm, the sequence proceeds to a step 1808 for entering 3 as NA, but, if not, the sequence proceeds to a step 1805. The step 1805 discriminates whether FA is smaller than 207 mm, and, if FA<207 mm, the sequence proceeds to a step 1809 for entering 4 as NA, but, if not, the sequence proceeds to a step 1806 for entering 5 as NA.

In this manner the steps 1803 to 1809 select NA=2 if the focal length FA<11 mm; NA=3 if 11 mm≦FA <83 mm; NA=4 if 83 mm≦FA<207 mm; or NA=5 if FA≧207 mm.

Similarly steps 1811 to 1817 select NA=2 if FA<6 mm; NA=3 if 6 mm≦FA<23 mm; NA=4 if 23 mm≦FA<77 mm; or NA=5 if FA≧77 mm.

Similarly steps 1819 to 1823 select NA=3 if FA<11 mm; NA=4 if 11 mm≦FA<26 mm; or NA=5 if FA≧26 mm.

Similarly steps 1825 to 1829 select NA=3 if FA<6 mm; NA=4 if 6 mm≦FA<12 mm; or NA=5 if FA≧12 mm. Also steps 1830 to 1832 select NA=4 if FA<10 mm; or NA=5 if FA≧10 mm.

After the number NA of the image signals to be employed in a single focus detection is determined from the interval TA of the image signal storage and the focal length FA of the photographing lens, a step 1833 terminates this subroutine.

FIG. 51 shows a flow chart of the "image signal storage 2" subroutine for storage of two image signals $L_1$ and $R_2$.

When this subroutine is called in the step 1713 shown in FIG. 48, the sequence proceeds to a step 1902 through a step 1901.

A step 1902 executes accumulation of the image signal $L_1$, and a next step 1903 executes read-out thereof. A step 1904 drives the focus detecting light shading board 67 to the state shown in FIG. 15C, then a step 1905 executes accumulation of the image signal $R_2$, a step 1906 executes read-out thereof, and a step 1907 terminates this subroutine.

FIG. 52 shows a flow chart of the "image signal storage 3" subroutine for storage of three image signals $L_1$, $R_2$ and $L_3$. In the present case, it is assumed that the interval of the image signal storage is constant, namely the drive time TD of the focus detecting light shading board 67 and the accumulation time TC are constant. Consequently the measurement of the interval is unnecessary and is not, therefore, conducted.

When the "image signal storage 3" subroutine is called in the step 1714 shown in FIG. 48, the sequence proceeds to a step 2002 through a step 2001.

A step 2002 executes accumulation of the image signal $L_1$, and a next step 2003 executes read-out thereof. A step 2004 drives the focus detecting light shading board 67 to the state shown in FIG. 15C, and steps 2005 and 2006 execute accumulation and read-out of the image signal $R_2$. A step 2007 drives again the focus detecting light shading board 67 to the state shown in FIG. 15B, and steps 2008 and 2009 execute accumulation and read-out of the image signal $L_3$. Then a step 2010 terminates this subroutine.

Figure 53:
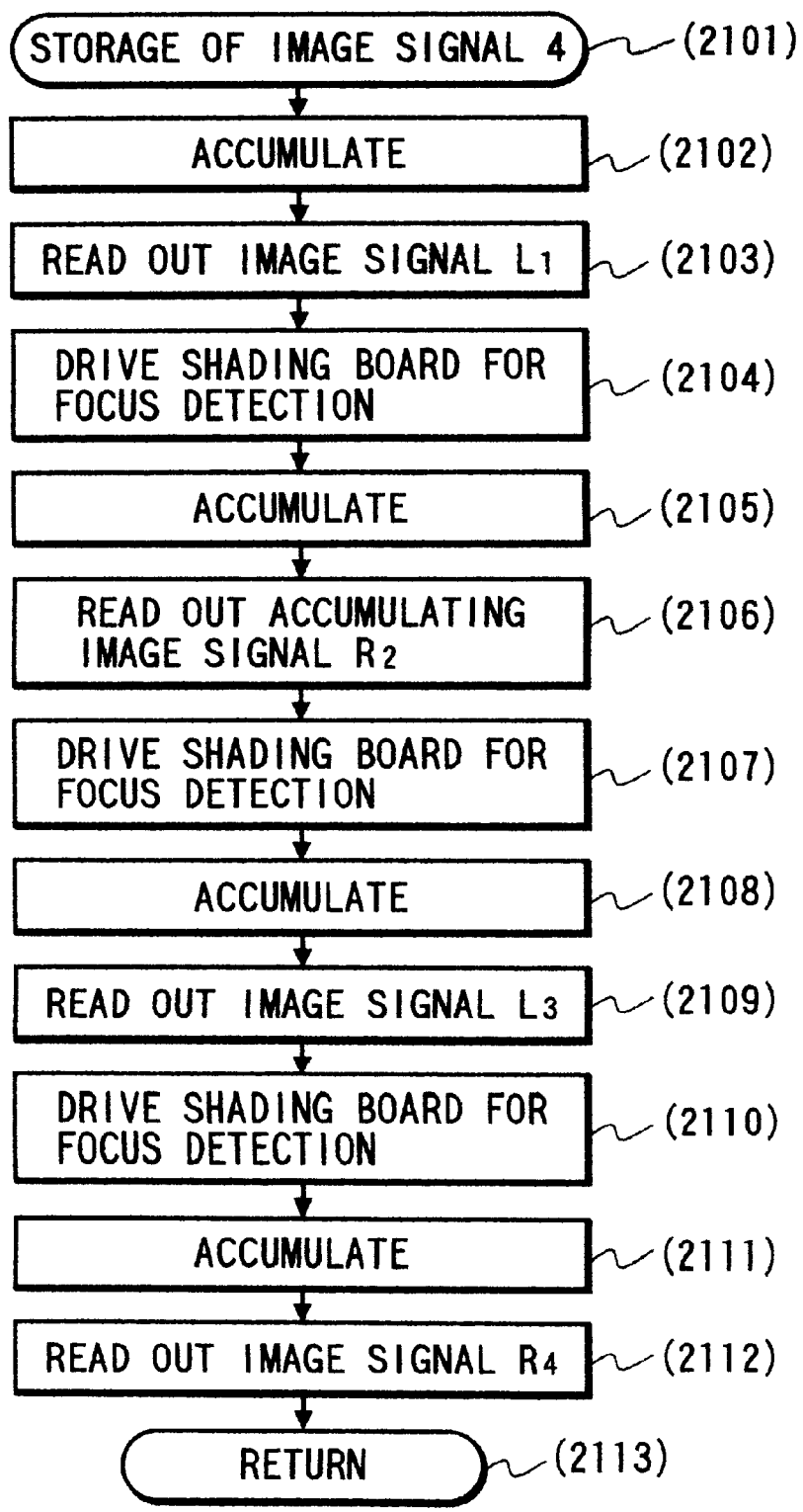
FIG. 53 is a flow chart showing the details of the operation "image signal storage 4" in FIG. 48.

FIG. 53 shows a flow chart of the "image signal storage 4" subroutine for storage of four image signals L1, $R_2$, $L_3$ and $R_4$. Also in the present case, it is assumed that the interval of the image signal storage is constant, so that the measurement of the interval is not conducted. When the "image signal storage 4" subroutine is called in the step 1715 shown in FIG. 48, the sequence proceeds to a step 2102 through a step 2101.

Steps 2102 and 2103 execute accumulation and read-out of the image signal $L_1$. A step 2104 drives the focus detecting light shading board 67 to the state shown in FIG. 15C, and steps 2105 and 2106 execute accumulation and read-out of the image signal $R_2$. A step 2107 drives again the focus detecting light shading board 67 to the state shown in FIG. 15B, and steps 2108 and 2109 execute accumulation and read-out of the image signal $L_3$. A step 2110 drives again the focus detecting light shading board 67 to the state shown in FIG. 15C, and steps 2111 and 2112 execute accumulation and read-out of the image signal $R_4$. Then a step 2113 terminates this subroutine.

Figure 54:
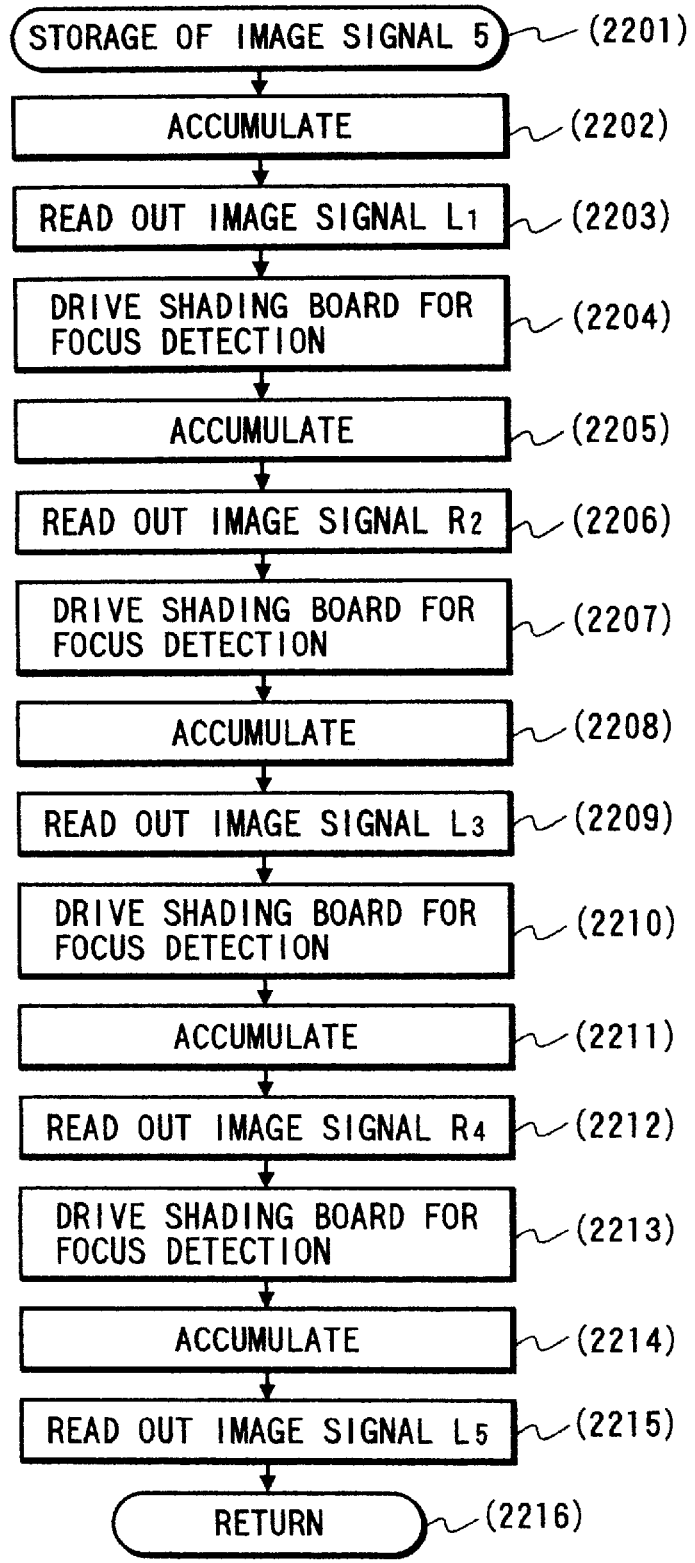
FIG. 54 is a flow chart showing the details of the operation "image signal storage 5" in FIG. 48.

FIG. 54 shows a flow chart of the "image signal storage 5" subroutine for storage of five image signals $L_1$, $R_2$, $L_3$, $R_4$ and $L_5$. Also in the present case, it is assumed that the interval of the image signal storage is constant, so that the measurement of the interval is not conducted. When the "image signal storage 5" subroutine is called in the step 1712 shown in FIG. 48, the sequence proceeds to a step 2202 through a step 2201.

Steps 2202 and 2203 execute accumulation and read-out of the image signal $L_1$. A step 2204 drives the focus detecting light shading board 67 to the state shown in FIG. 15C, and steps 2205 and 2206 execute accumulation and read-out of the image signal $R_2$. A step 2207 drives again the focus detecting light shading board 67 to the state shown in FIG. 15B, and steps 2208 and 2209 execute accumulation and read-out of the image signal $L_3$. A step 2210 drives again the focus detecting light shading board 67 to the state shown in FIG. 15C, and steps 2211 and 2212 execute accumulation and read-out of the image signal $R_4$. A step 2213 drives again the focus detecting light shading board 67 to the state shown in FIG. 15B, and steps 2214 and 2215 execute accumulation and read-out of the image signal $L_5$. Then a step 2216 terminates this subroutine.

Figure 55:
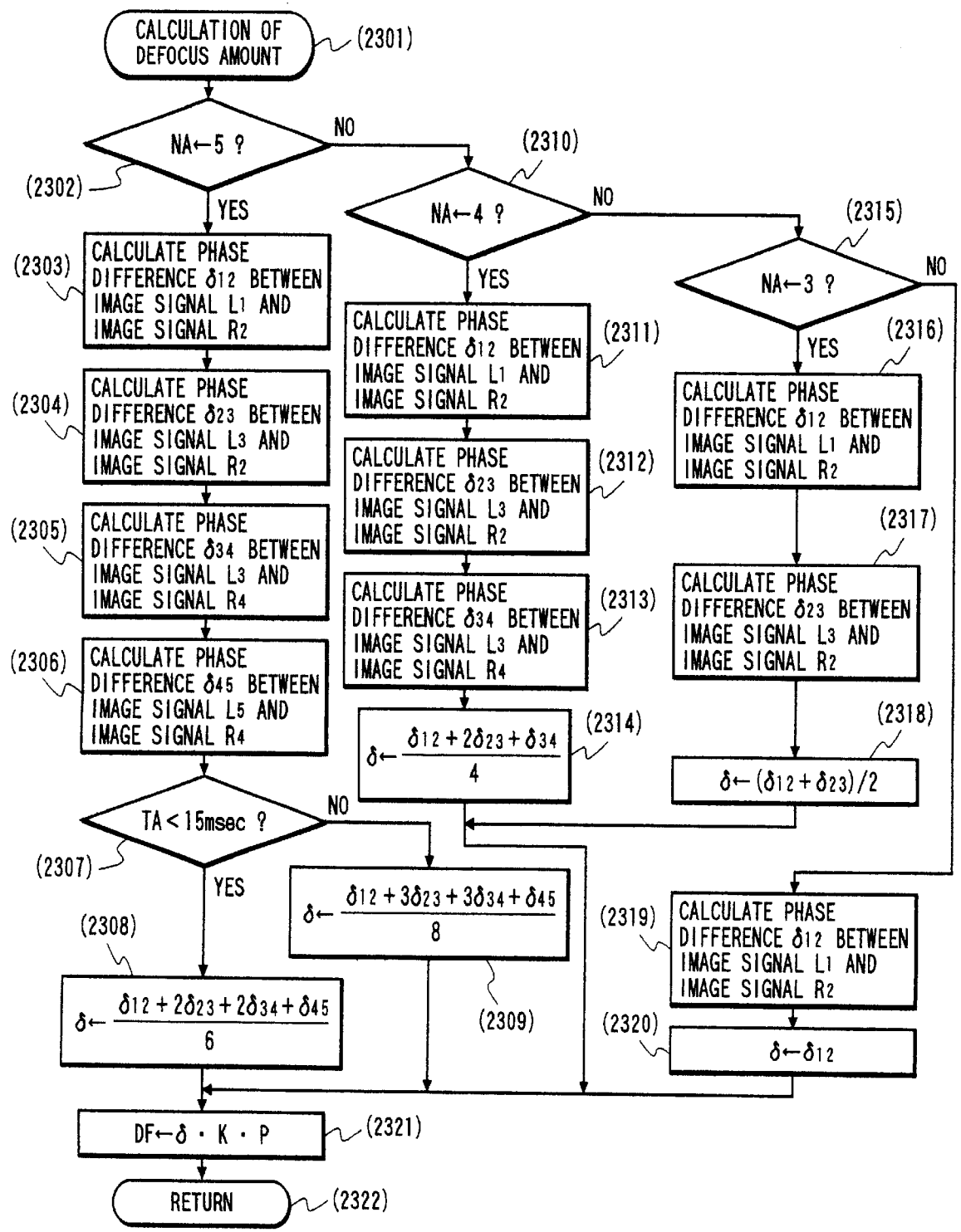
FIG. 55 is a flow chart showing the defocus amount calculating operation of the camera of the fifth embodiment of the present invention.
Figure 56:
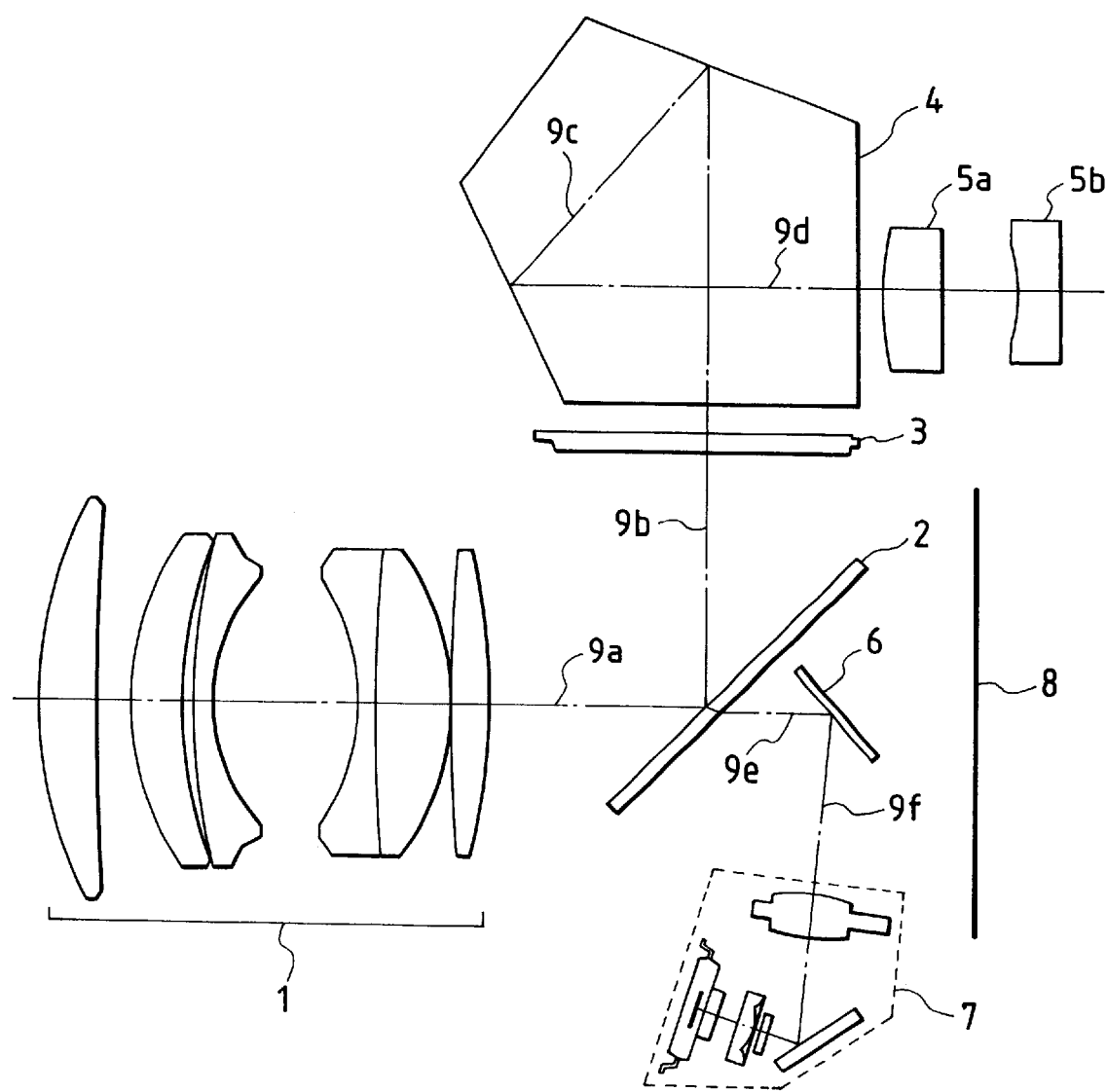
FIG. 56 is a view showing the arrangement of the optical system in an ordinary single lens reflex camera.
Figure 57A:
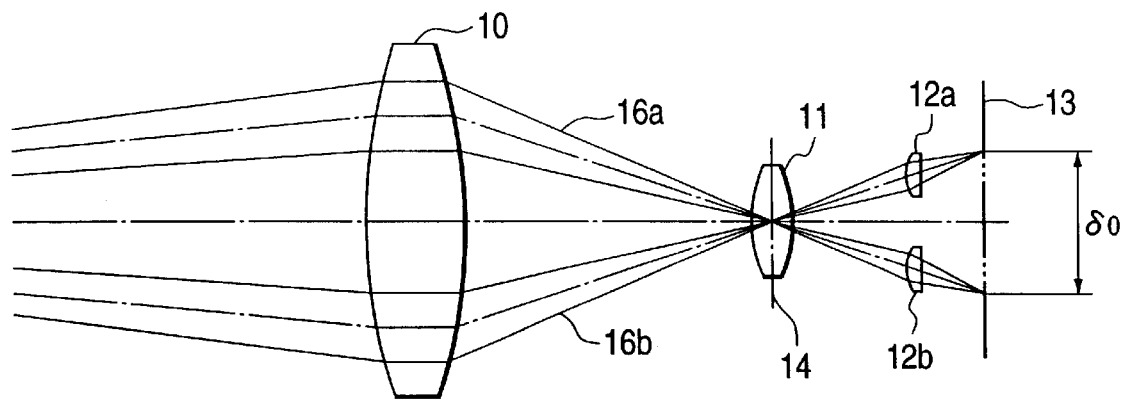
FIGS. 57A, 57B and 57C are views showing the principle of focus detection in single lens reflex camera of the configuration shown in FIG. 48.
Figure 57B:
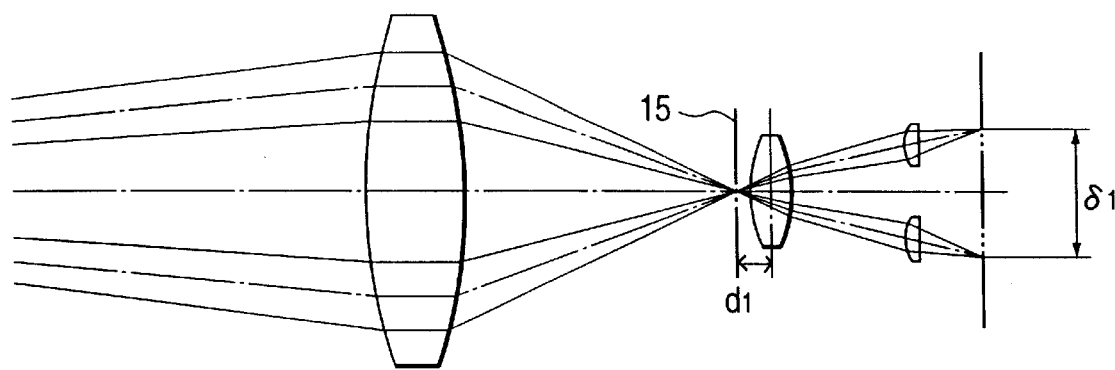
Figure 57C:
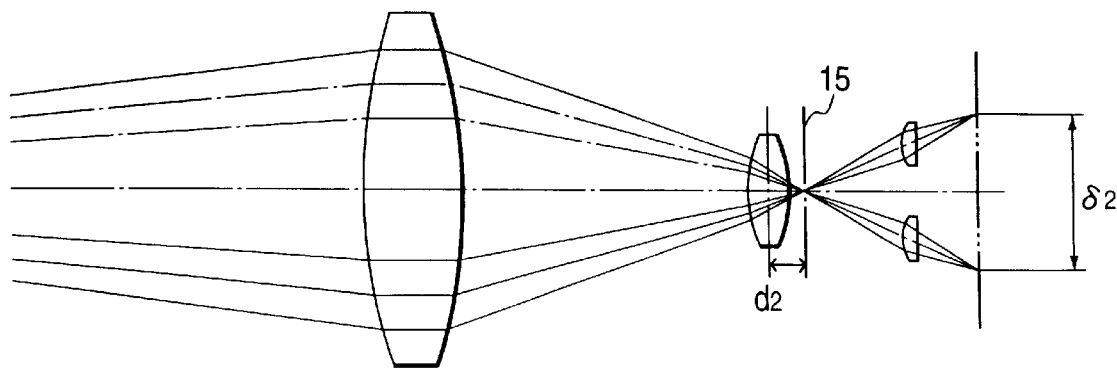
Figure 58A:
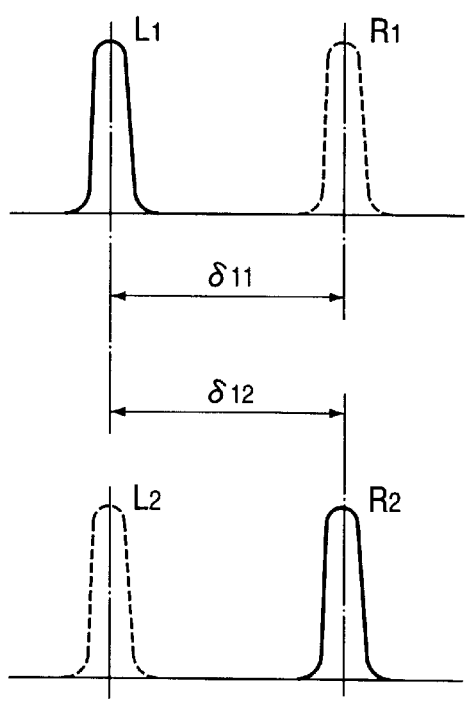
FIGS. 58A and 58B are views showing the drawbacks in a conventional focus detecting device which time-sequentially divides the photographing light beam into two areas and detects the focus state by the phase difference of the obtained image signals.
Figure 58B:
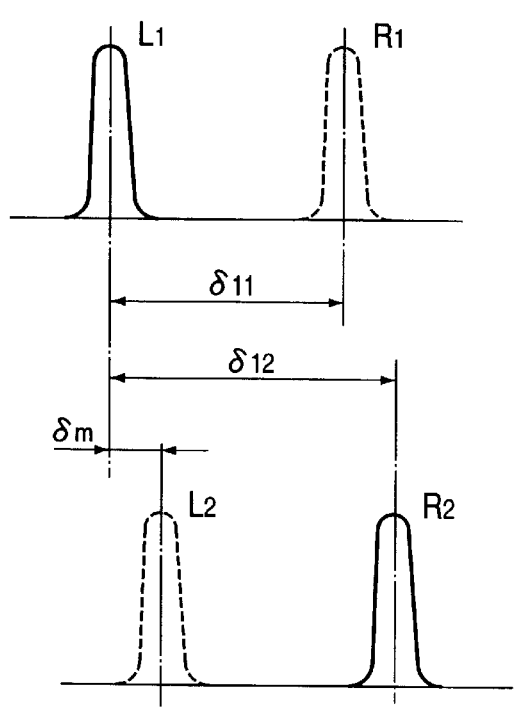

FIG. 55 shows a "defocus amount calculation" subroutine, which switches the calculation formula according to the photographing conditions, in order to secure the necessary precision of detection.

When this subroutine is called in a step 1718 shown in FIG. 48, the sequence proceeds to a step 2302 through a step 2301.

A step 2302 discriminates whether NA is 5, and, if NA=5, a step 2303 executes a calculation process utilizing 5 image signals, but, if NA=5, the sequence proceeds to a step 2310. The step 2310 discriminates whether NA is 4, and, if NA=4, a step 2311 executes a calculation process utilizing 4 image signals, but, if NA=4, the sequence proceeds to a step 2315. The step 2315 discriminates whether NA is 3, and, if NA=3, a step 2316 executes a calculation process utilizing 3 image signals, but, if NA=3, the sequence proceeds to a step 2319 for executing a calculation process utilizing 2 image signals.

The step 2303 calculates the phase difference $\delta_{12}$ of the image signals $L_1$ and $R_2$ by correlation calculation, then a step 2304 calculates the phase difference $\delta_{23}$ of the image signals $R_2$ and $L_3$, a step 2305 calculates the phase difference 634 of the image signals $L_3$ and $R_4$, and a step 2306 calculates the phase difference $\delta_{45}$ of the image signals $R_4$ and $L_5$.

A next step 2307 discriminates whether the interval TA of the image signal storage is longer than 15 msec, and if TA>15 msec, the sequence proceeds to a step 2308, but, if not, the sequence proceeds to a step 2309. This is because, as shown in FIG. 47, the permissible focal length is larger in the countermeasure 4 than in the countermeasure 3 in case the interval of the image signal storage is longer than 15 msec. Thus, in case the interval TA is longer than 15 msec, the sequence proceeds to the step 2308 to execute the calculation according to the countermeasure 4, but, in case the interval TA is shorter than 15 msec, the sequence proceeds to the step 2309 to execute the calculation according to the countermeasure 4, thereby calculating the phase difference δ to be employed in the calculation of the defocus amount.

A step 2311 calculates the phase difference $\delta_{12}$ of the image signals $L_1$ and $R_2$, then a step 2312 calculates the phase difference $\delta_{23}$ of the image signals $R_2$ and $L_3$, and a step 2313 calculates the phase difference $\delta_{34}$ of the image signals $L_3$ and $R_4$. A next step 2314 calculates the phase difference 6 to be employed in the calculation of the defocus amount, according to the calculation process of the countermeasure 2.

A step 2316 calculates the phase difference $\delta_{12}$ of the image signals $L_1$ and $R_2$, and a step 2317 calculates the phase difference $\delta_{23}$ of the image signals $R_2$ and $L_3$. A next step 2318 calculates the phase difference δ to be employed in the calculation of the defocus amount, according to the calculation process of the countermeasure 1.

A step 2319 calculates the phase difference $\delta_{12}$ of the image signals $L_1$ and $R_2$. and a step 2320 enters $\delta_{12}$ as the phase difference δ to be employed in the calculation of the defocus amount.

After the calculation of the phase difference δ by the step 2308, 2309, 2314, 2318 or 2320, the sequence proceeds to a step 2321 for calculating the defocus amount DF according the phase difference δ, the sensitivity K of the focus detecting system and the pixel pitch P of the CCD, and a step 2322 terminates this subroutine.

The foregoing embodiment, capable of selecting the minimum number of the image signals and the calculation method capable of securing the necessary precision of detection, according to the photographing conditions (focal length of photographing lens, and interval of image signal storage, can dispense with the storage operation for the unnecessary image signals, thereby reducing the time required for focus detection and also reducing the electric power consumption.

The foregoing embodiments employ a CCD as the solid-state image pickup device, and such CCD is not limited to an area sensor but can also be composed of a line sensor. Also the means for changing the shape of the pupil is composed of the focus detecting diaphragm 65, but it may also be composed of a diaphragm utilizing physical property such as a diaphragm composed of an LCD.

The entry and retraction of the focus detecting light shading board 67 into and from the photographing optical path are executed by a motor; but an actuator such as a plunger may also be used for this purpose.

In the foregoing there has been considered a camera with two pupil areas, but there can be provided three or more pupil areas. Also these pupil areas are so arranged that they are in the horizontal direction (together with the direction of lines of the CCD) when the camera is held in the normal position, but such arrangement is not restrictive and the pupil areas may be so arranged as to be in the vertical direction when the camera is held in the normal position.

Also the moving amount detection range, for detecting the moving amount of the object in the vertical direction (perpendicular to the direction of arrangement of the pupil areas), is determined, as explained with reference to FIG. 25, in consideration of the focal length of the photographing lens, the interval of the image signal storage, the image signal accumulating time and the driving time of the focus detecting light shading board 67 (means for changing the pupil shape), but the effect of a ceratin level can be obtained by considering at least one of these values. Particularly, in case the entry and retraction of the focus detecting light shading board 67 into and from the photographing optical path are executed by a motor as in the foregoing embodiments, the driving time of the light shading board is almost constant and this value is therefore almost negligible.

Also the number of the image signals to be employed for detecting the moving amount of the object in the vertical direction (perpendicular to the direction of arrangement of the pupil areas), is determined, as explained with reference to FIGS. 49 and 50, in consideration of the focal length of the photographing lens, the interval of the image signal storage, the image signal accumulating time and the driving time of the focus detecting light shading board 67 (means for changing the pupil shape), but the effect of a ceratin level can be obtained by considering at least one of these values.

Also the foregoing embodiments intend to reduce the error in the focus detection, resulting from the hand vibration or from the movement of the object, for example by storage the image signals $L_1$, $R_2$, $L_3$, $R_4$ and $L_5$ and utilizing the phase differences between the image signals $L_1$ and $R_2$, between $R_2$ and $L_3$, between $L_3$ and $R_4$ and between $R_4$ and $L_5$, but such reduction in the error of focus detection can also be attained by such calculations plural times and taking the average or the weighted average of the obtained results.

Furthermore, though the present invention has been explained by its application to a digital camera, it is likewise applicable also to a video camera of a conventional camera utilizing a silver halide-based film.

What is claimed is:

1. A focus detecting device provided with an image pickup portion, a focusing optical system, a pupil shape varying portion for time-sequentially dividing a light beam passing through said optical system into at least two different areas and projecting on said image pickup portion, and a calculation circuit for calculating the focus state of said optical system by converting optical images projected time-sequentially on said image pickup portion through said respective areas into image signals and detecting the phase difference of said image signals, wherein said calculation circuit includes a correction calculation portion for correcting the influence caused by the movement of the optical image resulting from a relative positional change between the object and a camera in the phase difference of two image signals formed through said different areas, utilizing the phase differences of three or more image signals, said calculation circuit is adapted to detect the phase difference of the two images formed through said different areas, after correction of the influence caused by the movement of the optical image resulting from the relative positional change between the object and the camera, and wherein said correction calculation portion has plural different calculation process modes and includes selecting means for selecting one of said plural modes according to the photographing condition.

2. A focus detecting device according to claim 1, wherein said plural modes utilize respectively different numbers of image signals for the process.

3. A focus detecting device according to claim 1, wherein said selecting means is adapted to select one of said plural modes, based on at least one of the focal length of the photographing lens, the interval of storage of the image signals, a time for driving the pupil shape varying portion and a time for accumulating the optical image.

* * * * *

UNITED STATES PATENT AND TRADEMARK OFFICE
CERTIFICATE OF CORRECTION

PATENT NO. : 6,473,126 B1
DATED : October 29, 2002
INVENTOR(S) : Masaki Higashihara et al.

It is certified that error appears in the above-identified patent and that said Letters Patent is hereby corrected as shown below:

Column 1,
Line 25, "9 a" should read -- 9a --.
Line 60, "form" should read -- from --.

Column 7,
Line 29, "light;" should read -- light --.
Line 40, "Executed" should read -- executed --.
Line 67, "in-succession" should read -- in succession --.

Column 11,
Line 6, "23 a" should read -- 23a --.
Line 25, "between." should read -- between --.

Column 14,
Line 2, "the." should read -- the --.
Line 54, "sat" should be deleted.

Column 15,
Line 25, "2i=1 to n" should read -- 2  i=1 to n --.
Line 49, "f" should read -- of --.

Column 16,
Line 23, "t o a" should read -- to a --.

Column 17,
Line 34, "respective" should read -- respectively --.

Column 19,
Line 61, "Photographing" should read -- photographing --.

Column 21,
Line 55, "$\delta_{d1}\delta_{d2}$" should read -- $\delta_{d1} = \delta_{d2}$ --.
Line 56, "6" should read -- $\delta$ --.

Column 25,
Line 54, "$L_2$." should read -- $L_2$, --.

Column 26,
Line 9, "$\delta$" should read -- $\delta_{44}$ --.

UNITED STATES PATENT AND TRADEMARK OFFICE
CERTIFICATE OF CORRECTION

PATENT NO. : 6,473,126 B1
DATED : October 29, 2002
INVENTOR(S) : Masaki Higashihara et al.

It is certified that error appears in the above-identified patent and that said Letters Patent is hereby corrected as shown below:

Column 28,
Line 8, "$L_3$." should read -- $L_3$, --.
Line 45, "go" should be deleted.

Column 29,
Line 26, "foregoing,-there" should read -- foregoing, there --.

Column 30,
Line 44, "for-reducing" should read -- for reducing --.

Column 34,
Line 15, "NA=5" should read -- NA $\neq$ 5 --.
Line 18, "NA=4" should read -- NA $\neq$ 4 --.
Line 21, "NA=3" should read -- NA $\neq$ 3 --.
Line 27, "634" should read -- $\delta_{34}$ --.
Line 49, "6" should read -- $\delta$ --.

Column 35,
Line 19, "motor;" should read -- motor, --.

Signed and Sealed this

Eighth Day of April, 2003

JAMES E. ROGAN
*Director of the United States Patent and Trademark Office*